(12) United States Patent
Inoue et al.

(10) Patent No.: US 6,330,870 B1
(45) Date of Patent: Dec. 18, 2001

(54) VARIABLE VALVE TIMING CONTROL SYSTEM

(75) Inventors: Masaomi Inoue; Osamu Sato; Michio Adachi, all of Kariya (JP)

(73) Assignee: Denso Corporation, Kariya (JP)

(*) Notice: Subject to any disclaimer, the term of this patent is extended or adjusted under 35 U.S.C. 154(b) by 0 days.

(21) Appl. No.: 09/639,235

(22) Filed: Aug. 16, 2000

(30) Foreign Application Priority Data

| Aug. 17, 1999 | (JP) | 11-230431 |
|---|---|---|
| Nov. 25, 1999 | (JP) | 11-334996 |
| Nov. 25, 1999 | (JP) | 11-334997 |
| Dec. 2, 1999 | (JP) | 11-343125 |
| Dec. 6, 1999 | (JP) | 11-345638 |

(51) Int. Cl.[7] ................................... F01L 1/34
(52) U.S. Cl. ............................. 123/90.17; 123/90.15; 123/90.31; 123/90.12
(58) Field of Search ................ 123/90.17, 90.15, 123/90.16, 90.12, 90.6, 90.31, 90.18

(56) References Cited

U.S. PATENT DOCUMENTS

| 5,117,785 | 6/1992 | Suga et al. |
|---|---|---|
| 5,381,764 | * 1/1995 | Fukuma et al. ............... 123/90.17 |
| 5,738,056 | * 4/1998 | Mikame et al. ............... 123/90.17 |
| 5,797,361 | * 8/1998 | Mikame et al. ............... 123/90.17 |
| 5,797,363 | * 8/1998 | Nakamura ..................... 123/90.17 |
| 5,816,204 | * 10/1998 | Moriya et al. ................ 123/90.17 |
| 5,979,380 | * 11/1999 | Nakadouzono et al. ........ 123/90.17 |
| 6,006,708 | * 12/1999 | Ken et al. ..................... 123/90.17 |
| 6,035,819 | 3/2000 | Nakayoshi et al. |
| 6,170,448 | * 1/2001 | Asakura ........................ 123/90.18 |
| 6,244,230 | * 6/2001 | Mikame ........................ 123/90.17 |
| 6,263,843 | * 7/2001 | Todo et al. .................... 123/90.17 |

FOREIGN PATENT DOCUMENTS

| 0799977 A1 | 10/1997 | (EP) |
|---|---|---|
| 0848140 A1 | 6/1998 | (EP) |
| 2302391 A | 1/1997 | (GB) |
| 9-324613 | 12/1997 | (JP) |
| 11-62521 | 3/1999 | (JP) |
| 11-210424 | 8/1999 | (JP) |
| 11-241608 | 9/1999 | (JP) |

* cited by examiner

Primary Examiner—Teresa Walberg
Assistant Examiner—Fadi H. Dahbour
(74) Attorney, Agent, or Firm—Nixon & Vanderhye P.C.

(57) ABSTRACT

A variable valve timing adjuster with an intermediate lock mechanism learns a lock position and a lock release control. During a lock control, a learning of the lock position from a real camshaft phase is repeated to update the learned value, and the learning is ended when it is judged that the learned values have converged. At this time, when the learned values of the lock position do not converge even if the number of learning of the lock position exceeds a predetermined value, an insufficient lock state is judged, and the learned value of the lock position is set to an initial value or the learned value at the previous lock control thereby to make a lock release control. During the lock release control, on the other hand, the control (or the lock release control) of a hydraulic control valve is learned. When the lock cannot be released during the lock release control, the lock release control (or the learned value) is corrected in a direction to facilitate the lock release. When the correction of the lock release control is repeated a predetermined or more number of times or when the lock release control goes outside a predetermined range, the lock release failure is judged.

41 Claims, 40 Drawing Sheets

LOCKED

UNLOCKED

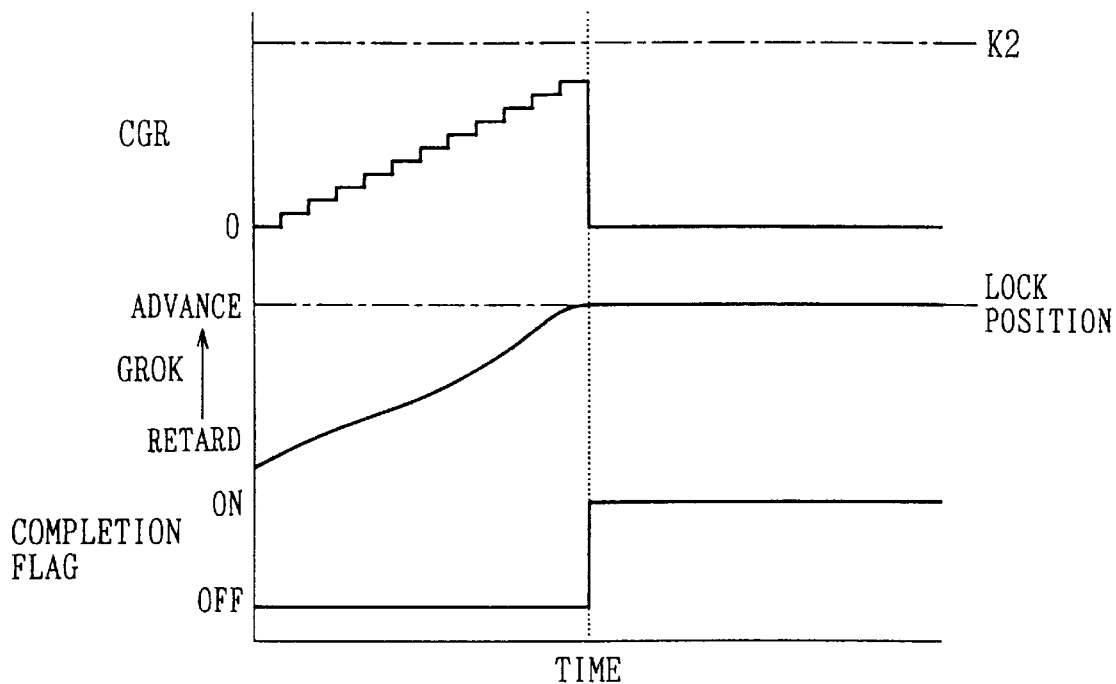
FIG. 9  LOCK POSITION LEARNING DURING NORMAL CONDITION
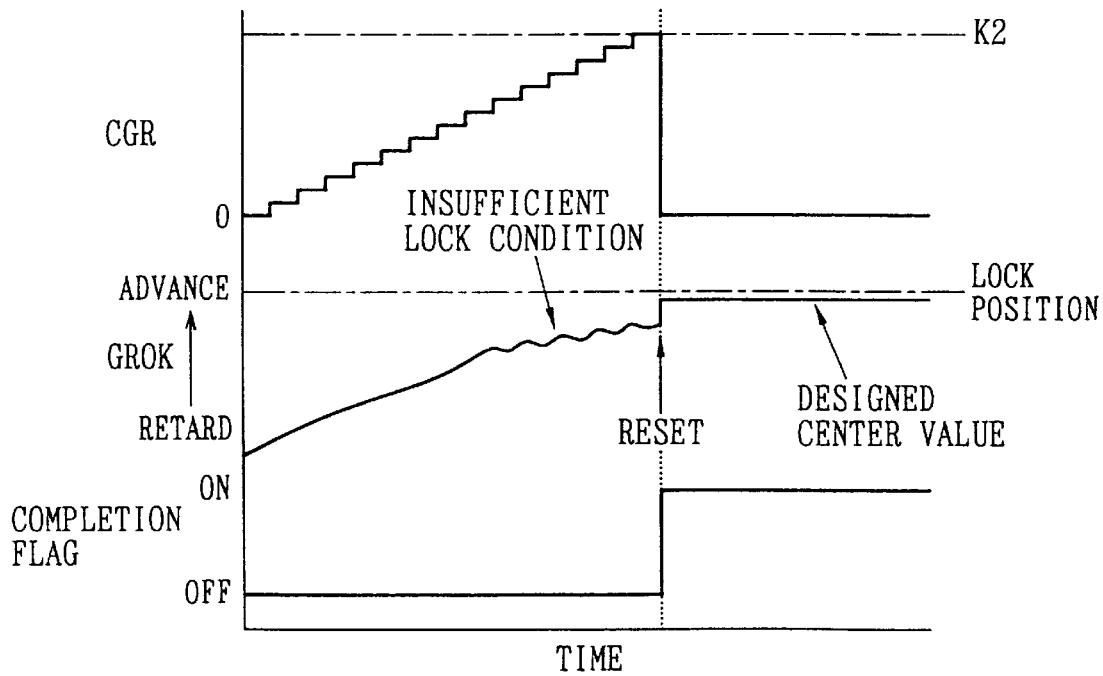
FIG. 10  LOCK POSITION LEARNING DURING ABNORMAL CONDITION

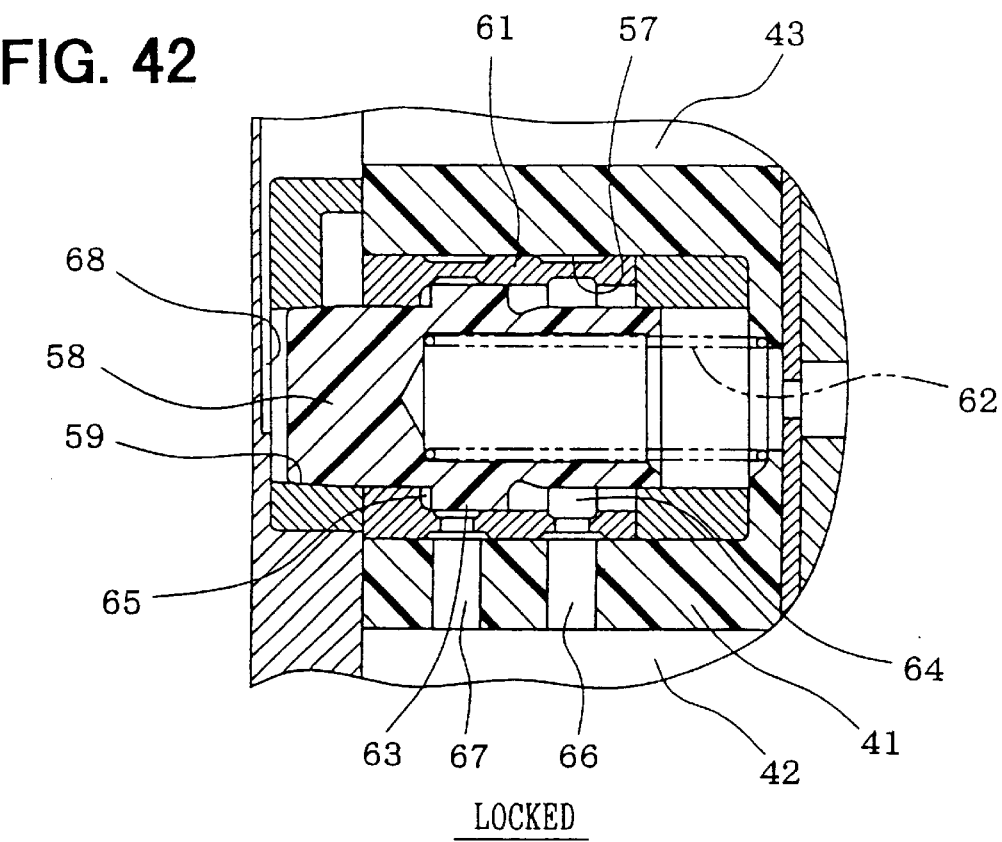
FIG. 42 LOCKED
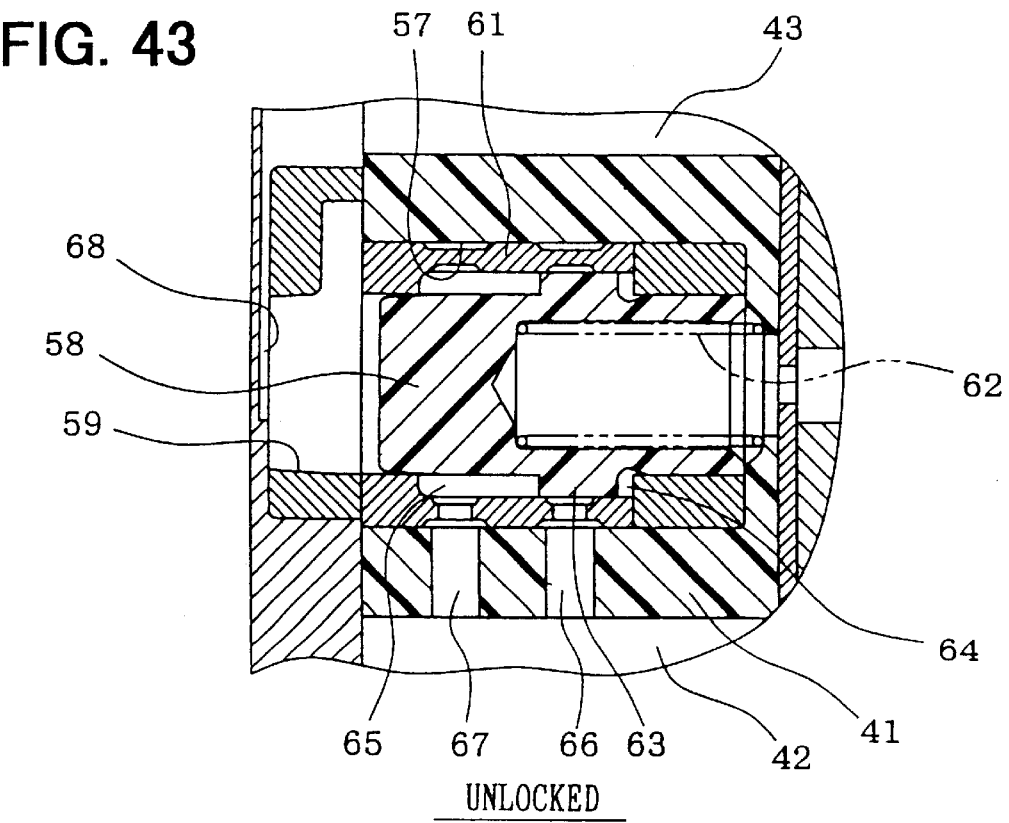
FIG. 43 UNLOCKED

VARIABLE VALVE TIMING CONTROL SYSTEM

CROSS REFERENCE TO RELATED APPLICATION

This application is based upon Japanese Patent Application Nos. Hei. 11-230431 filed on Aug. 17, 1999, Hei. 11-334996 filed on Nov. 25, 1999, Hei. 11-334997 filed on Nov. 25, 1999, Hei. 11-343125 filed on Dec. 2, 1999, and Hei. 11-345638 filed on Dec. 6, 1999, the contents of which are incorporated herein by reference.

BACKGROUND OF THE INVENTION

1. Field of the Invention

The present invention relates to variable valve timing control systems for internal combustion engines, and particularly to a variable valve timing control system for an internal combustion engine having a variable valve timing adjuster, which system is provided with a lock mechanism for locking the rotational phase (as will be called the "camshaft phase") of a camshaft with respect to the crankshaft at a lock position substantially intermediate of its adjustable range.

On the other hand, the invention relates to a variable valve timing control system for an internal combustion engine, in which at least one of the intake valve and the exhaust valve of the internal combustion engine is provided with a variable valve timing adjuster having a lock mechanism.

2. Related Art

In recent years, more and more internal combustion engines to be mounted on vehicles have adopted a variable valve timing control system with a view to improving the output power, lowering the fuel consumption and reducing the exhaust emission. In a basic construction of a vane type variable valve timing control system, for example, there are coaxially arranged a housing 1 made rotatable in synchronism with the crankshaft of the engine a rotor 2 connected to the camshaft of an intake (or exhaust) valve, as shown in FIG. 15, and fluid chambers 3 formed in the housing 1 are defined into advance angle chambers 5 and retard angle chambers 6 by vanes 4 provided on the rotor 2. Moreover, the oil pressures in the advance angle chambers 5 and the retard angle chambers 6 are controlled by a hydraulic control valve to change the rotational phase (or the camshaft phase) of the camshaft with respect to the crankshaft thereby to control the valve timings variably.

In the vane type variable valve timing control system of the related art, when the engine stops (or when the oil pressure falls), the relative rotations of the housing 1 and the rotor 2 (or the vanes 4) are locked by a lock pin 7 at the most retard angle phase of the camshaft phase (or the valve timing of the intake valve), so as to prevent the noise by the vibrations of the vanes 4 at the starting time. As a result, the start is made in the most retard angle phase so that the most retard angle phase is set to a phase suited for the start.

With this construction, however, the most retard angle phase is restricted by the phase (or the lock position) at the start so that the adjustable range of the valve timing (or the camshaft phase) is restricted by the lock position to raise a defect that the adjustable range of the valve timing is narrow.

As disclosed in Unexamined Published Japanese Patent Application No. 9-324613, therefore, it has been proposed to widen the adjustable range of the valve timing by setting the lock phase at the engine stop at a substantially intermediate position of the adjustable range of the valve timing. According to this construction, at the engine start, the valve timing is locked in the intermediate lock phase. As the oil pressure rises with the subsequent increase in the engine speed (or the oil pump speed), the oil pressures in the advance angle chambers 5 and the retard angle chambers 6 rise to push the lock pin 7 out of the lock hole thereby to unlock the lock pin 7. After this lock release, the variable valve timing control can be made so that the hydraulic control valve is subjected to a feedback control to adjust the real valve timing to the target valve timing.

However, the lock position is given individual differences (or dispersion) by the manufacture errors or the like. When whether or not the normal lock state is to be judged, therefore, the range for the normal judgment has to be widened to consider the manufacture dispersion of the lock position. As a result, a fixture at a position other than the lock position may be judged as the normal lock state, or the detection of the lock release during the lock release control may be delayed.

During the lock release control, on the other hand, the oil pressure in the lock releasing direction is applied to the lock pin 7 but is not always suited for the lock release due to the manufacture dispersions of the lock position or the hydraulic control valve. This raises a problem that the lock release is delayed to affect the control of the valve timing adversely.

Here, the lock pin 7 for locking the camshaft phase at the lock position is biased in the lock direction by a spring and is held at the lock release position by the oil pressure while the engine is running. This oil pressure is raised by the oil pump driven by the power of the engine. When the engine stops, therefore, the oil pressure falls so that the lock pin 7 is inserted into the lock hole by the spring to lock the camshaft phase at the lock position. In order that the lock pin 7 may come into the lock hole, however, these two have to be aligned. As disclosed in the Specification of Japanese Patent Application No. 11-222031, therefore, we have applied such an invention for patent that the oil pressure is controlled to move the camshaft phase to the lock position when the engine is to be stopped.

When the engine stops, however, the rotating speed of the oil pump goes down to lower the oil pressure. If the variable valve timing adjuster has a poor movement, it cannot bring the camshaft phase to the lock position till the engine stop and may not lock the camshaft phase. If the camshaft phase cannot be locked at the lock position when the engine stops, the valve timing (or the camshaft phase) cannot be controlled at the next starting time to the target value (in the vicinity of the lock position) before the engine speed (or the oil pump speed) goes up to raise the oil pressure. As a result, the start is made at a valve timing outside of the target value so that the startability is deteriorated to elongate the engine starting time. If the engine is started without the camshaft phase being locked, moreover, the position of the vanes 4 is not fixed till the oil pressure rises, thereby to cause a problem that the vanes 4 collide against the housing 1 to generate a noise.

Here, the variable valve timing adjuster employs the discharge oil pressure of the oil pump driven by the engine as its drive source so that the valve timing cannot be hydraulically held in a constant phase till the oil pressure rises to some level after the engine start. In the related art, therefore, the variable valve timing adjuster is provided with a lock mechanism, and the engine is started with the valve timing being mechanically locked at a constant phase by the lock mechanism. When the oil pressure rises to a level after the start, it is applied to the lock mechanism in the unlocking direction. After this, the valve timing is variably controlled by controlling the oil pressure.

Even with the lock release control, however, the lock mechanism cannot be unlocked for some cause. In this case, therefore, it is conceivable to repeat the lock release control. Then, the lock can be released by the repeated lock release control, if the lock release failure is caused temporarily because the lock mechanism bits a foreign substance. However, the cause for the lock release failure is thought to come not only from the failure of the lock mechanism but also from the failure of the hydraulic control valve. In the case of this failure of the hydraulic control valve, this valve will not operate normally even if a signal for the lock release control is outputted thereto. Therefore, the lock mechanism itself cannot be unlocked even if it is normal.

On the other hand, the lock pin 7 for locking the camshaft phase is biased in the locking direction by the spring, and the lock release is effected by applying the oil pressures of both the advance angle chambers 5 and the retard angle chambers 6 to the lock pin 7 in the lock releasing direction. During the engine stop, the oil pressure falls so that the lock pin 7 is inserted into the lock hole by the spring force to hold the camshaft phase in the locked state at the intermediate lock position. Therefore, the engine is started with the camshaft phase being locked at the intermediate lock position. As the oil pressure rises according to the subsequent increase in the engine speed (or the oil pump speed), the oil pressures in the advance angle chambers 5 and the retard angle chambers 6 rise to push the lock pin 7 out of the lock hole so that the lock pin 7 is unlocked. After this lock release, the valve timing control can be made so that the hydraulic control valve is feedback-controlled to adjust the real valve timing (or the real advance angle position) to the target valve timing (or the target advance angle position).

However, the construction of the related art does not have the function to detect the lock release of the lock pin 7. Therefore, the feedback control is started before the end of the lock release, and the hydraulic control valve is feedback-controlled to adjust the real advance angle position of the camshaft phase to the target advance angle position. Just after the start, the target advance angle position is usually set in the vicinity of the intermediate lock position, but frequently goes apart from the intermediate lock position as the time elapses. If the timing for the lock release is delayed for some cause, therefore, the deviation between the real advance angle position and the target advance angle position increases to make such a feedback control as to raise the oil pressure of one of the advance angle chambers 5 and the retard angle chambers 6 but lower the oil pressure of the other. The result is to enlarge the unbalance between the pressures of the two chambers 5 and 6. In this unbalanced oil pressure state, the lock pin 7 is strongly pushed by the oil pressure onto the inner side face of the lock hole so that it is bitten by the lock hole. This establishes a vicious cycle to retard the timing of the lock release more and more. As a result, the valve timing control is not made normally to cause problems to invite problems in the reduction of the drivability, the deterioration of the fuel economy, and the deterioration in the exhaust emission.

On the other hand, most variable valve timing systems now in practice advance the angle of the valve timing of the intake valve in dependence on the engine running state. In recent years, however, there has been developed a variable valve timing system which is provided the variable valve timing adjusters at both the intake valve and the exhaust valve so as to enhance the variable valve timing control performance. With this construction, when the lock mechanism for locking the valve timing fails operationally so that the variable valve timing control is made in an unlocked state, only the variable valve timing in the normal state operates as usual. As a result, the valve overlap of the intake and exhaust valves may become abnormal to make the exhaust residual ratio (or the internal EGR) in the cylinder of the engine. Then, the combustion state of the engine may be deteriorated to cause a misfire or to deteriorate the drivability or the exhaust emission.

SUMMARY OF THE INVENTION

The present invention has been conceived considering the background thus far described, and has a first object to make it possible to judge the lock/unlock stably without being influenced by the manufacture dispersion of the lock position.

A second object to make it possible to perform the lock release quickly by optimizing the control during the lock release control of the hydraulic control valve.

A third object is to provide a variable valve timing control system for an internal combustion engine, which can avoid in advance a situation that the camshaft phase cannot be locked in the lock position when the internal combustion engine stops, and which can avoid the problems of the deteriorated startability and the noise due to the lock failure.

A fourth object is to provide a variable valve timing control system for an internal combustion engine, which can reduce the percentage of the lock release failure of the lock mechanism of the variable valve timing adjuster and which can improve the reliability of the variable valve timing control.

A fifth object is to make it possible to avoid the situation that the lock release of lock means is obstructed, by the feedback control before the lock release.

A sixth embodiment is to affect a proper fail-safe by detecting the lock failure or the lock release failure of the lock means early.

A seventh object is to provide a control system for an internal combustion engine, which can reduce the deterioration in the combustion state of the internal combustion engine, even when the lock mechanism for locking the valve timing in the intermediate lock phase comes into an operational failure, to improve the drivability and the exhaust emission and to prevent the engine stall.

In order to achieve the first object, according to a first aspect of the present invention, there is provided a variable valve timing control system for an internal combustion engine, in which the lock position is learned by lock position learning means on the basis of the camshaft phase detected during the lock control. Even if the manufacture dispersion of the lock position is wide, the actual lock position can be learned so that the lock/unlock can be judged on the basis of the learned value. The judgment of the lock/unlock can be performed highly accurately without being influenced by the manufacture dispersion of the lock position.

According to a second aspect of the present invention, during the lock release control, the control (as will be called the "lock release control") of the hydraulic control valve may be learned by the lock release learning means. Then, even with a large manufacture dispersion of the lock position or the hydraulic control valve, the lock release control of the hydraulic control valve can be optimized for the characteristics of the individual systems so that the lock releasing performance can be improved.

According to a third aspect of the present invention, there is provided a variable valve timing control system which is provided with the lock release detection means for detecting the lock release of the lock means so that the feedback control of the valve timing may be started after the lock release is detected by the lock release detection means. Then, the feedback control is not made till the lock release is ended. As a result, it is possible to avoid the situation in which the lock release of the lock means is obstructed by the feedback control. Thus, the lock can be quickly released to transfer to the feedback control thereby to improve the drivability, the fuel consumption and the exhaust emission better than the related art.

According to a fourth aspect of the present invention, on the basis of at least one of the magnitude of the dispersion of the advance angles of the plurality of cam angle signals with respect to the crank angle signals and the real advance angle position of the camshaft phase, at least one of the lock failure and the lock release failure of the lock means may be detected by the failure detection means. Then, the lock failure and the lock release failure can be detected to satisfy the demand for the lower cost without adding any new sensor.

According to a fifth aspect of the present invention, whether or not the lock of the lock means is released may be judged from the magnitude of the dispersion of the advance angles of the plurality of cam angle signals with respect to the crank angle signals. In other words, it may be judged that the lock means is in the lock state, if the dispersion of the advance angles of the plurality of cam angle signals is small, and that the lock is released, if the dispersion of the advance angles of the plurality of cam angle signals grows wide. In this case, the lock release can be detected by using the crank angle signals and the cam angle signals to be used for discriminating the cylinder of the internal combustion engine and for detecting the engine speed, thereby to satisfy the demand for the lower cost while requiring no new sensor.

According to a sixth aspect of the present invention, there is provided a variable valve timing control system for an internal combustion engine, the hydraulic control valve is controlled by the lock failure prevention means, when the movement of the variable valve timing adjuster is poor, such that the camshaft phase is positioned at or in the vicinity of the lock position. Thus, when the movement of the variable valve timing adjuster is poor, the camshaft phase remains at or in the vicinity of the lock position. Even if the movement of the variable valve timing adjuster is poor when the internal combustion engine is to be stopped, the camshaft phase can be reliably locked at the lock position. As a result, at a next start, the engine can be started reliably with the cam shaft phase being locked, to avoid the problems of the poor startability or the noise due to the lock failure.

According to a seventh aspect of the present invention, on the other hand, when the movement of the variable valve timing adjuster is poor, the hydraulic control valve may be controlled such that the camshaft phase is locked at the lock position. Then, when the movement of the variable valve timing adjuster is poor, the camshaft phase is locked at the lock position (or the engine is run in the lock state without being unlocked after the start). As a result, even if the movement of the variable valve timing adjuster is poor, the internal combustion engine can be stopped with the camshaft phase being reliably locked. As a result, the next start can be reliably made with the camshaft phase being locked, to avoid the problems of the poor startability or the noise due to the lock failure.

In this case, the movement of the variable valve timing adjuster changes with the viscosity of the oil in the hydraulic circuit. When the oil temperature is lower than a proper temperature range, for example, the oil viscosity exceeds the proper viscosity range to delay the rise of the oil pressure so that the movement of the variable valve timing adjuster is deteriorated. When the oil temperature is higher than the proper temperature range, on the other hand, the oil viscosity becomes lower than the proper viscosity range so that the oil pressure easily leaks from the small clearance in the variable valve timing adjuster. As a result, the effective oil pressure drops to make the variable valve timing adjuster poor.

According to an eighth aspect of the present invention, there is provided a variable valve timing control system for an internal combustion engine, in which the hydraulic control valve is controlled during lock release control by the lock release control means such that the oil pressure is applied to the lock mechanism in the lock releasing direction and in which whether or not the lock of the lock mechanism is released is then judged by the lock release judgment means. As a result, when the lock release is not judged, the hydraulic control valve is driven by the drive pattern for the failure condition cancel control, and the lock release control is then made again.

Thus, according to the invention, the hydraulic control valve is driven in the drive pattern of the abnormal condition cancel control before the repeated lock release control. If the failure is temporary due to the foreign substance bitten by the hydraulic control valve, therefore, the repeated lock condition cancel control can be made after the hydraulic control valve is returned to the state for the normal operation by the abnormal condition cancel control. If the lock mechanism is normal, therefore, the lock can be released by the repeated lock condition cancel control so that the percentage of the lock release failure can be made lower than the related art to improve the reliability of the variable valve timing control.

According to a ninth aspect of the present invention, there is provided a control system for an internal combustion engine which is provided with variable valve timing adjusters individually at the intake valve and the exhaust valve. Whether or not the lock mechanism for locking the valve timing at the intermediate lock phase fails is judged by lock failure judgment means. When the failure of the lock mechanism is judged, the variable valve timing adjuster in the normal operation is so controlled by the abnormal condition control means as to reduce the exhaust residual ratio (or the internal EGR) in the cylinder. Then, the increase in the exhaust residual ratio in the cylinder due to the failure of the lock mechanism can be suppressed to reduce the deterioration in the combustion state of the internal combustion engine at the failure of the lock mechanism so that the misfire can be prevented to improve the drivability and the exhaust emission and to prevent the engine stall.

According to a tenth aspect of the present invention, the failure of the lock mechanism may be remedied exclusively by the control to reduce the external EGR. In this case, too, it is possible to reduce the deterioration of the combustion state of the internal combustion engine.

BRIEF DESCRIPTION OF THE DRAWINGS

These and another objects, features and characteristics of the present invention will be appreciated from a study of the following detailed description, the appended claims, and drawings, all of which form parts of this application. In the drawings, same portions or corresponding portions are put the same numerals each other to eliminate redundant explanation. In the drawings:

FIG. 9 is a time chart showing illustrating the behaviors of the lock position learning procedure during the normal condition;

FIG. 10 is a time chart showing illustrating the behaviors of the lock position learning procedure during the abnormal condition;

FIG. 42 is a partially enlarged section showing a locked state of a lock pin;

FIG. 43 is a partially enlarged section showing an unlocked state of the lock pin;

DESCRIPTION OF THE PREFERRED EMBODIMENTS

[First Embodiment]

Figure 1:
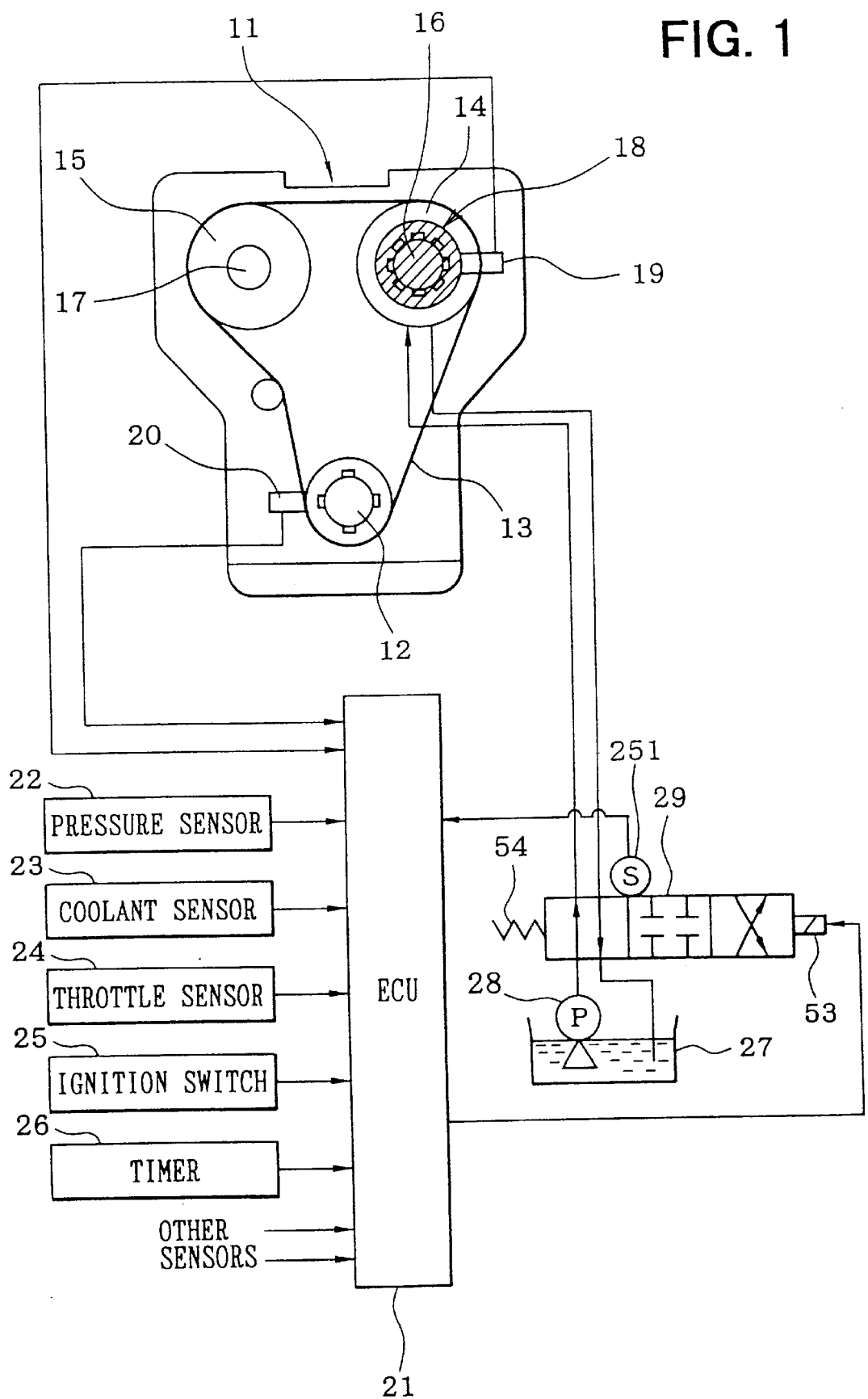
FIG. 1 is a schematic construction diagram showing a whole control system according to First Embodiment of the invention.

With reference to FIGS. 1 to 13, here will be described First Embodiment, in which the invention is applied to a variable valve timing control system of an intake valve. As shown in FIG. 1, internal combustion engine or a DOHC engine 11 is constructed such that a power from a crankshaft 12 is transmitted by a timing chain 13 through sprockets 14 and 15, respectively, to an intake camshaft 16 and an exhaust camshaft 17. Here, the in take camshaft 16 is equipped with a valve timing adjustor 18 for adjusting the advance angle of the intake camshaft 16 with respect to the crankshaft 12.

Figure 16:
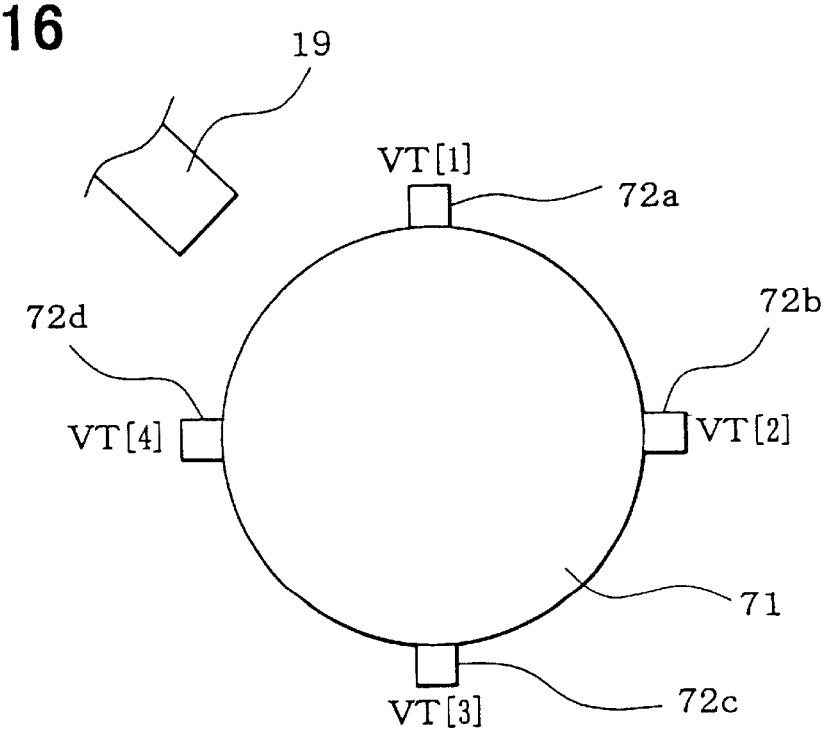
FIG. 16 is a diagram for explaining the structure of a cam angle sensor.
Figure 17:
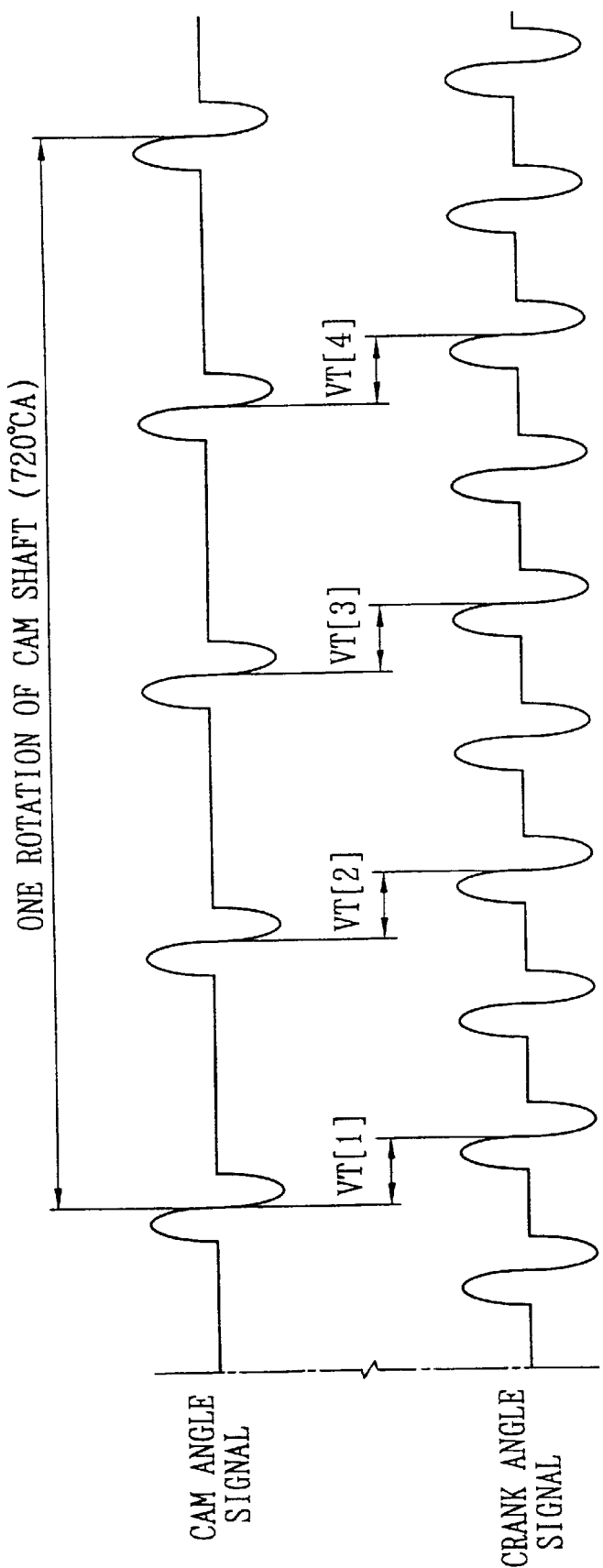
FIG. 17 is a time chart for explaining the relation between a cam angle signal and a crank angle signal of First Embodiment.

On the other hand, a cam angle sensor 19 (or cam angle detecting means) is disposed on the outer circumference of the intake camshaft 16, whereas a crank angle sensor 20 (or crank angle detecting means) is disposed on the outer circumference of the crankshaft 12. As illustrated in FIG. 17, the crank angle sensor 20 outputs a crank angle signal at every predetermined crank angle, and the engine speed is detected from the frequency of the crank angle signal. On the other hand, the cam angle sensor 19 outputs a cam angle signal at a plurality of cam angles for cylinder discriminations. FIG. 17 illustrated one example of the crank angle signal and the cam angle signal of a four-cylinder engine, in which the crank angle signal is outputted at every 90 degrees CA, for example, whereas the cam angle signal is outputted at every 90 degrees (i.e., 180 degrees CA), for example, in terms of the cam angle. As shown in FIG. 16, more specifically, four projections 72a to 72d are formed at an interval of 90 degrees on the outer circumference of a signal rotor 71 of the camshaft 16, and the cam angle sensor 19 is arranged to confront the outer circumference of the signal rotor 71 so that the cam angle signal is outputted as pulses from the cam angle sensor 19 at each time when each of the projections 72a to 72d of the signal rotor 71 confronts the cam angle sensor 19 as the signal rotor 71 (or the intake camshaft 16) rotates.

The output signals of those cam angle sensor 19 and crank angle sensor 20 are inputted to an engine control circuit 21, by which the real valve timing of the intake valve is calculated and by which the engine speed is calculated from the frequency of the output pulses of the crank angle sensor 20. To the engine control circuit 21, on the other hand, there are also inputted the output signals of various sensors (including an intake pressure sensor 22, a water temperature sensor 23 and a throttle sensor 24) for detecting the engine running state, and the output signals of an ignition switch 25 and a timer 26.

On these various input signals, the engine control circuit 21 performs not only the fuel injection control and the ignition control but also the later-described variable valve timing control, and feedback-controls the valve timing adjustor 18 so that the real valve timing of the intake valve (i.e., the real advance angle or the real camshaft phase of the intake camshaft 16) of the intake valve may coincide with the target valve timing (or the target advance angle) or the target camshaft phase. The valve timing adjustor 18 is fed at its hydraulic circuit with the oil in an oil pan 27 by an oil pump 28 through a hydraulic control valve 29, by which the oil pressure is controlled to control the real advance angle (or the real valve timing) of the intake camshaft 16.

With reference to FIGS. 2 to 7, here will be described the construction of the valve timing adjustor 18. A housing 31 of the valve timing adjustor 18 is fastened and fixed on the sprocket 14 which is rotatably supported on the outer circumference of the intake camshaft 16, by bolts 32. As a result, the rotation of the crankshaft 12 is transmitted through the timing chain 13 to the sprocket 14 and the housing 31 so that the sprocket 14 and the housing 31 rotate in synchronism with the crankshaft 12.

On the other hand, the intake camshaft 16 is rotatably supported by a cylinder head 33 and a bearing cap 34, and a rotor 35 is fastened and fixed on one end portion of the intake camshaft 16 through a stopper 36 by bolts 37. The rotor 35 is relatively rotatably accommodated in the housing 31.

Figure 2:
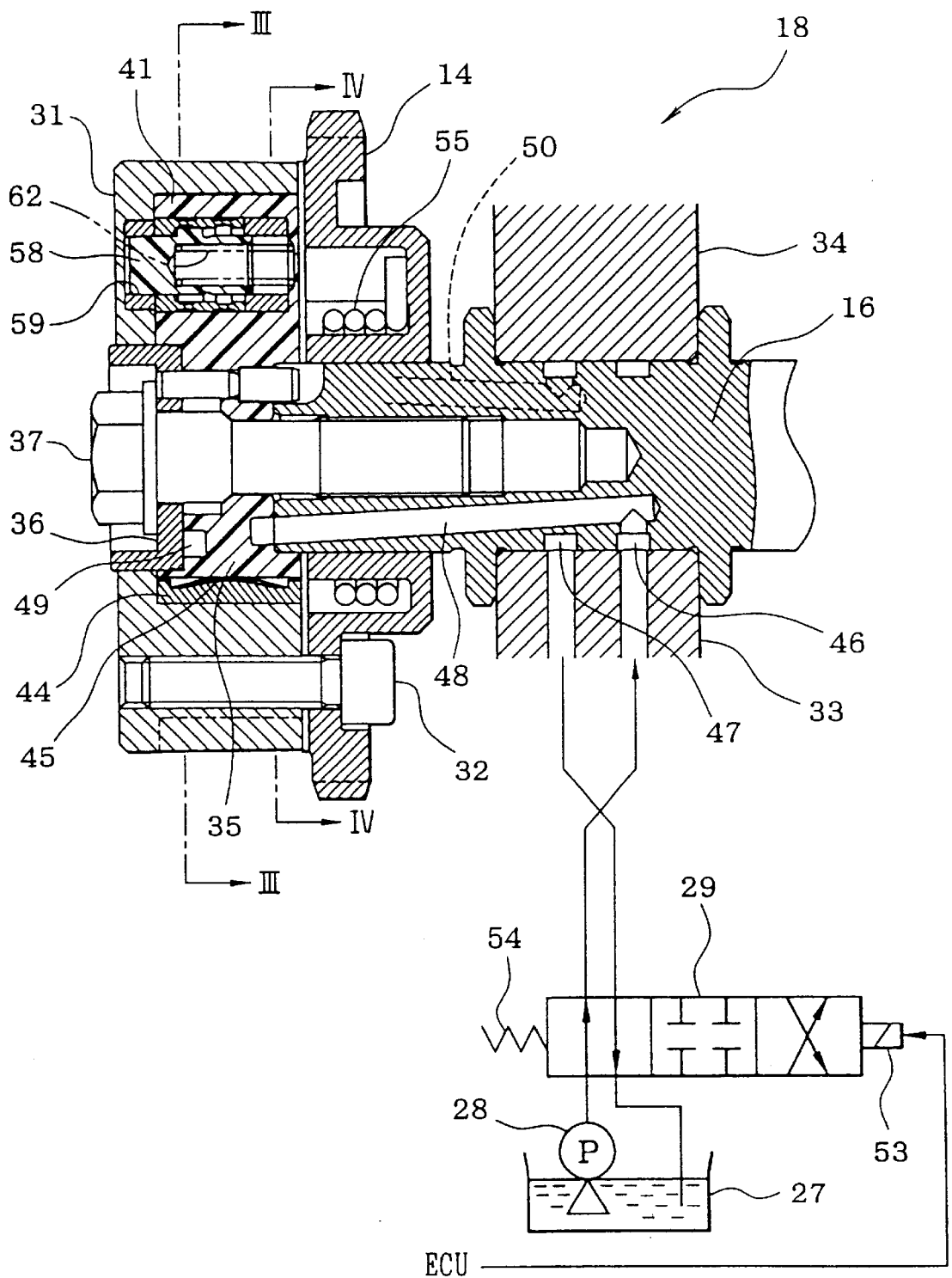
FIG. 2 is a longitudinal section showing a variable valve timing device.
Figure 3:
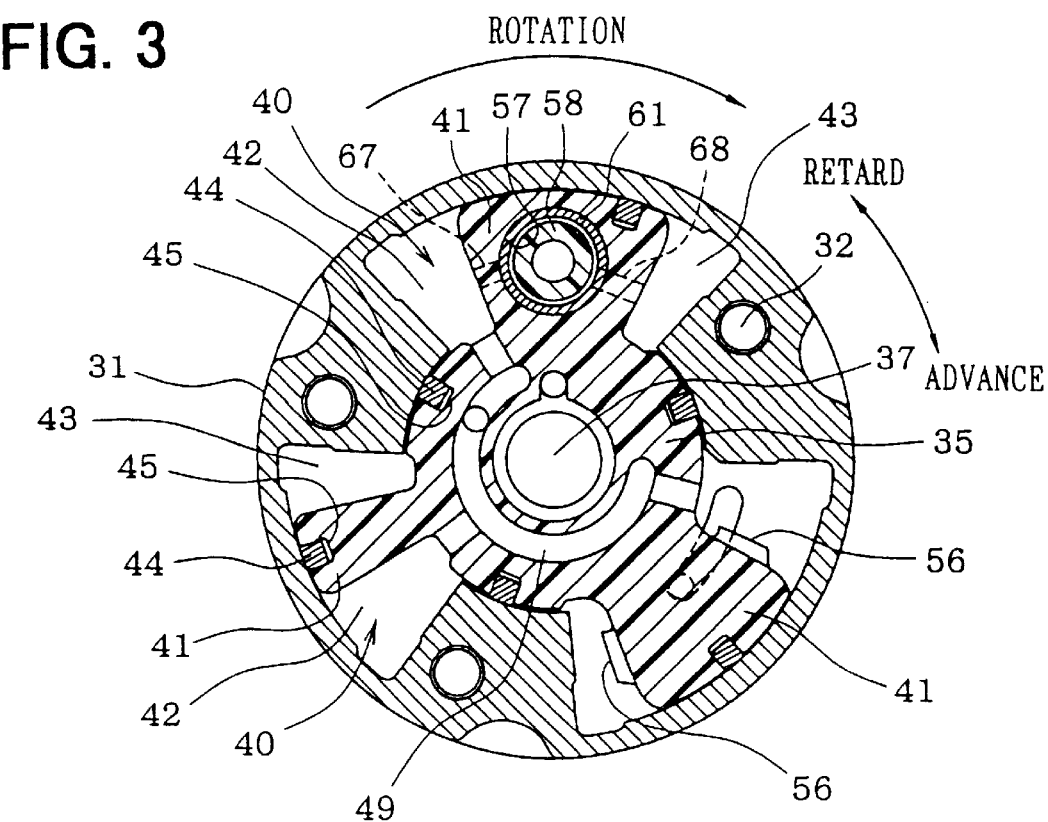
FIG. 3 is a section taken along line III—III of FIG. 2.
Figure 4:
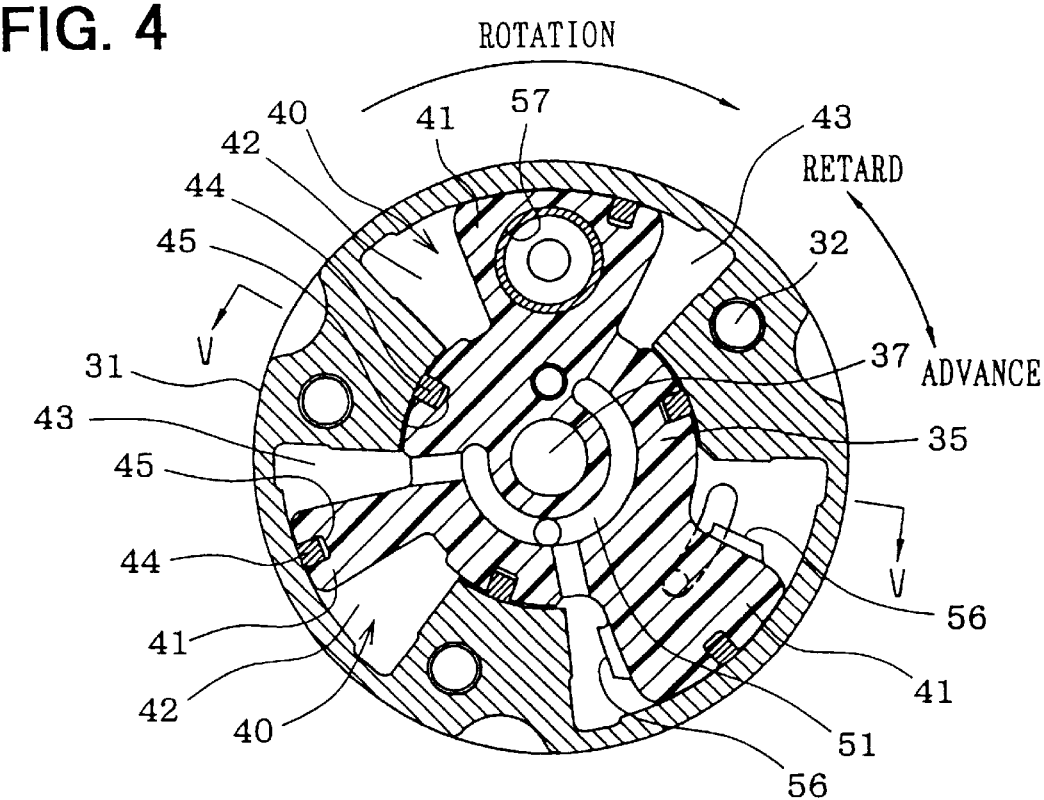
FIG. 4 is a section taken along line IV—IV of FIG. 2.
Figure 5:
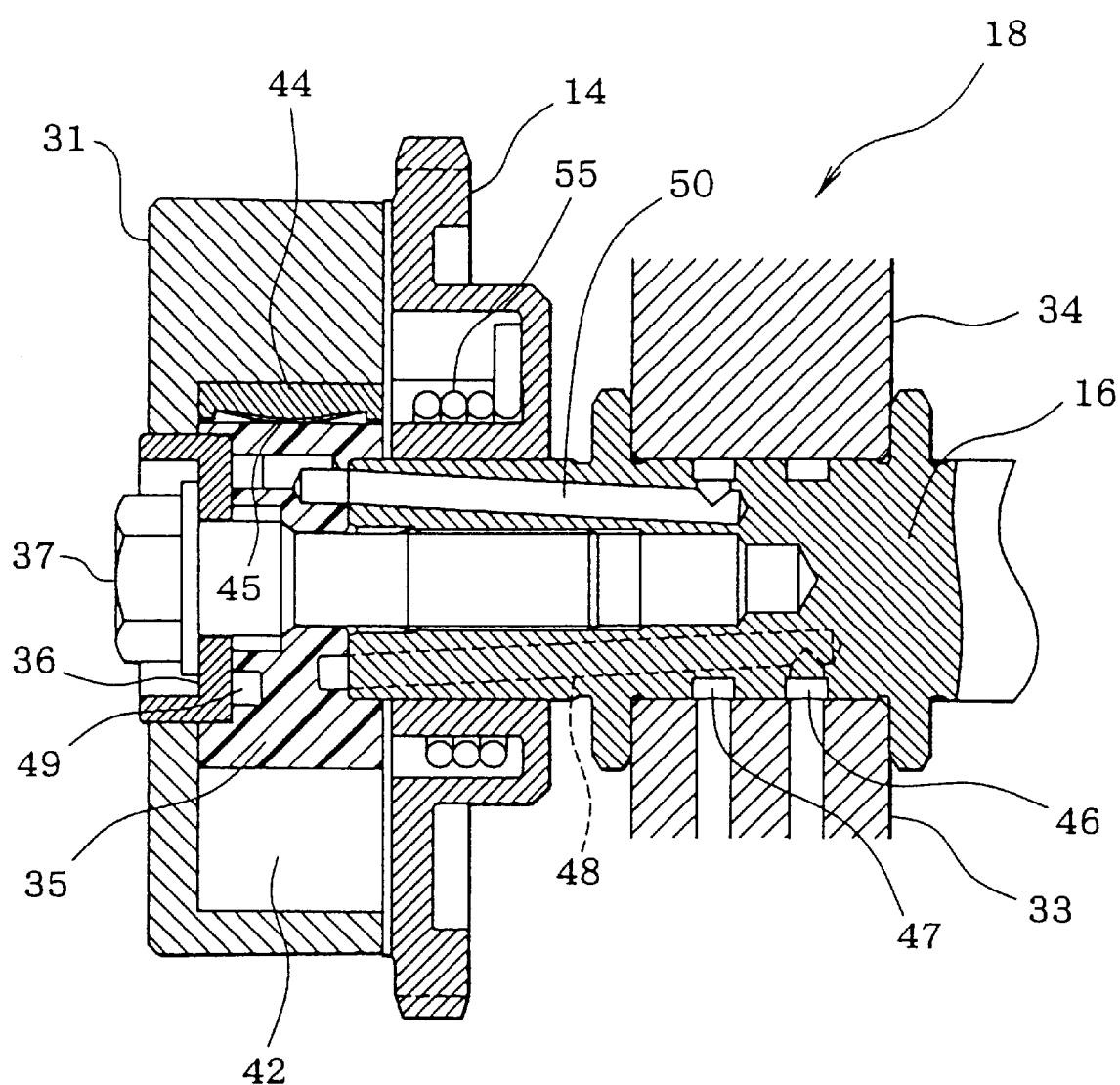
FIG. 5 is a section taken along line V—V of FIG. 4.

In the housing 31, as shown in FIGS. 3 and 4, there are formed a plurality of fluid chambers 40, each of which is defined into an advance angle chamber 42 and a retard angle chamber 43 by vanes 41 formed in the outer circumferential portion of the rotor 35. On the outer circumference portion of the rotor 35 and the outer circumferential portions of the vanes, moreover, there are individually mounted seal members 44 which are biased radially outward by leaf springs 45 (as referred to FIG. 2). As a result, the clearance between the outer circumference of the rotor 35 and the inner circumference of the housing 31 and the clearance between the outer circumference of the vanes 41 and the inner circumference of the fluid chambers 40 are sealed with the seal members 44.

As shown in FIG. 2, an annular advance angle groove 46 and an annular retard angle groove 47 formed in the outer circumference of the intake camshaft 16 are individually connected with predetermined ports of the hydraulic control valve 29 so that the oil scooped out of the oil pan 27 is fed through the hydraulic control valve 29 to the advance angle groove 46 and the retard angle groove 47 as the oil pump 28 is driven by the power of the engine 11. An advance angle oil passage 48, as connected with the advance angle groove 46, is formed to extend through the inside of the intake camshaft 16 and to communicate with an arcuate advance angle oil passage 49 (as referred to FIG. 3), which is so formed in the left-hand side face of the rotor 35 as to communicate with the individual advance angle chambers 42. On the other hand, a retard angle oil passage 50, as connected with the retard angle groove 47, is formed to extent through the inside of the intake camshaft 16 and to communication with an arcuate retard angle oil passage 51 (as refereed to FIG. 4), which is so formed in the right-hand side face of the rotor 35 as to communicate with the individual retard angle chambers 43.

The hydraulic control valve 29 is a 4-port/3-position change-over valve which has a valve member driven by a solenoid 53 and a spring 54. The valve member is switched among a position to feed the oil pressure to the advance angle chambers 42, a position to feed the oil pressure to the retard angle chambers 43, and a position to feed the oil pressure to neither the advance angle chambers 42 nor the retard angle chambers 43. When the solenoid 53 is deenergized, the valve member is automatically switched by the spring 54 to the position to feed the oil pressure to the advance angle chambers 42, so that the oil pressure acts in the direction to advance the crankshaft phase. There is provided a valve stroke sensor 251 (as referred to FIG. 1) for detecting the stroke of the valve member of the hydraulic control valve 29, so that the output signal of the valve stroke sensor 251 is inputted to the engine control circuit 21.

With the advance angle chambers 42 and the retard angle chambers 43 being fed with an oil pressure at a predetermined or higher pressure, the vanes 41 are fixed by the oil pressure in the advance angle chambers 42 and the retard angle chambers 43, so that the rotation of the housing 31 by the crankshaft 12 is transmitted by means of the oil to the rotor 35 (or the vanes 41), to drive the intake camshaft 16 rotationally integrally with the rotor 35. During the running of the engine, the oil pressure in the advance angle chambers 42 and the retard angle chambers 43 is controlled by the hydraulic control valve 29 to rotate the housing 31 and the rotor 35 (or the vanes 41) so that the rotational phase (as will be called the "camshaft phase") of the intake camshaft 16 with respect to the crankshaft 12 is controlled to make the valve timing of the intake valve variable. In the sprocket 14, there is accommodated a torsion coil spring 55 (as referred to FIG. 2) for aiding the hydraulic force to rotate the rotor 35 relatively in the angle advancing direction for an angle advancing control, with its spring force.

On the two sides of any one vane 41, as shown in FIGS. 3 and 4, there are formed stopper portions 56 for regulating the relatively rotational range of the rotor 35 (or the vanes 41) relative to the housing 31 thereby to regulate the most advance angle phase and the most retard angle phase of the crankshaft phase. In a lock pin accommodating hole 57 formed in another vane 41, moreover, there is accommodated a lock pin 58 (or lock means) for locking the relative rotations between the housing 31 and the rotor 35 (or the vanes 41). When the lock pin 58 is fitted in a lock hole 59 (as referred to FIG. 2) formed in the housing 31, the camshaft phase is located at a substantially intermediate position (i.e. an intermediate lock position) of its adjustable range. This intermediate lock position is set in a phase suited for the start.

Figure 6:
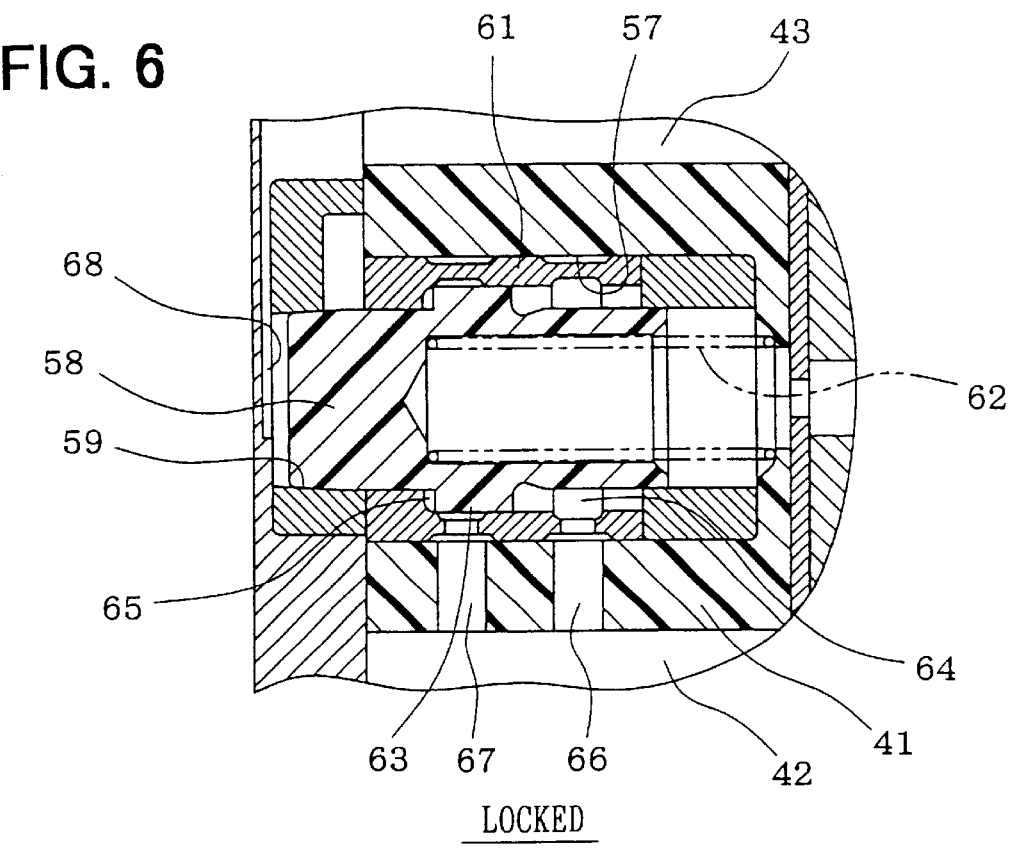
FIG. 6 is a partially enlarged section showing a locked state of a lock pin.
Figure 7:
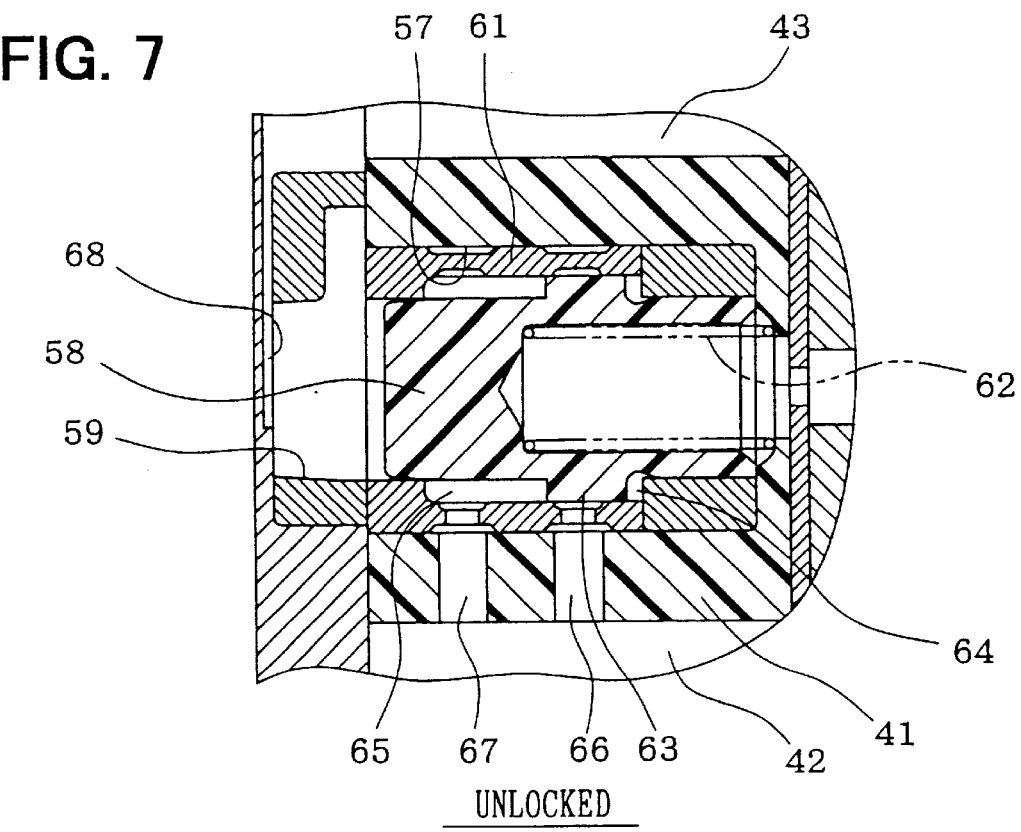
FIG. 7 is a partially enlarged section showing an unlocked state of the lock pin.

As shown in FIGS. 6 and 7, the lock pin 58 is slidably inserted in a cylindrical member 61 fitted in the inner circumference of the lock pin accommodating hole 57 and is biased in a locking direction (or in a protruding direction) by a spring 62. By a valve portion 63 formed on the outer circumference of the central portion of the lock pin 58, on the other hand, the clearance between the cylindrical member 61 and the lock pin 58 is defined into a lock hydraulic chamber 64 and a lock release holding hydraulic chamber 65. In order to feed the oil pressure from the advance angle chamber 42 to the lock hydraulic chamber 64 and the lock release holding hydraulic chamber 65, there are formed in the vanes 41 a lock oil passage 66 and a lock release holding oil passage 67 in communication with the advance angle chambers 42. In the housing 31, on the other hand, there is formed a lock release oil passage 68 for providing the communication between the lock hole 59 and the retard angle chambers 43.

At the locking time of the lock pin 58, as shown in FIG. 6, the valve portion 63 of the lock pin 58 closes the lock release holding oil passage 67 to bring the lock oil passage 66 into communication with the lock hydraulic chamber 64. As a result, the oil pressure is fed from the advance angle chambers 42 to the lock hydraulic chamber 64 to hold the lock pin 58 in the lock hole 59 together with the operation of the spring 62 so that the crankshaft phase is locked in the intermediate lock position.

During the engine stop, the oil pressure in the lock hydraulic chamber 64 (or the oil pressure in the advance angle chambers 42) falls, but the lock pin 58 is held in the lock position by the spring 62. Therefore, the engine start is affected with the lock pin 58 being held in the lock position (or in the intermediate lock position). As the oil pressure in the lock hole 59 (or in the oil pressure in the retard angle chambers 43) rises after the engine start, the lock pin 58 is unlocked by the rising oil pressure in the following manners. After the engine start, when the oil pressure (or the force in the lock releasing direction) fed from the retard angle chambers 43 via the lock release oil passage 68 to the lock hole 59 exceeds the resultant force (or the force in the locking direction) of the oil pressure in the lock hydraulic chamber 64 (or the oil pressure in the advance angle chambers 42) and the spring force of the spring 62, the lock pin 58 is pushed out of the lock hole 59 to the lock release position of FIG. 7 by the oil pressure of the lock hole 59 so that it is unlocked.

In this unlocked state, as shown in FIG. 7, the valve portion 63 of the lock pin 58 clogs the lock oil passage 66 to bring the lock release holding oil passage 67 into communication with the lock release holding hydraulic chamber 65. As a result, the oil pressure is fed from the advance angle chambers 42 to the lock release holding hydraulic chamber 65 so that the lock pin 58 is held in the lock release position by the oil pressure in the lock release holding hydraulic chamber 65 (or the oil pressure in the advance angle chambers 42) and the oil pressure in the lock hole 59 (or the oil pressure in the retard angle chambers 43) against the spring 62.

During the running of the engine, either of the oil pressures in the advance angle chambers 42 and the retard angle chambers 43 has risen to hold the lock pin 58 in the lock release position so that the housing 31 and the rotor 35 are held in the relatively rotatable state (or in the state capable of making the valve timing control).

During the running of the engine, the engine control circuit 21 calculates a real valve timing VT (i.e., the real advance angle position or the real crankshaft phase of the intake camshaft 16) of the intake valve on the basis of the output signals of the crank angle sensor 20 and the cam angle sensor 19, and calculates a target valve timing VTT (i.e., the target advance angle position or the target camshaft phase of the intake camshaft 16) of the intake valve on the basis the outputs of the various sensors for detecting the engine running state, such as the intake pressure sensor 22 or the water temperature sensor 23. Moreover, the hydraulic control valve 29 of the valve timing adjustor 18 is so feedback-controlled as to adjust the real valve timing TV of the intake valve to the target valve timing VTT. As a result, the oil pressures in the advance angle chambers 42 and the retard angle chambers 43 are controlled to rotate the housing 31 and the rotor 35 relative to each other thereby to change the crankshaft phase so that the real valve timing VT of the intake valve may coincide with the target valve timing VTT.

After this, if the engine speed goes down when the engine 11 is stopped, the discharge pressure of the oil pump 28 falls so that the oil pressures in the advance angle chambers 42 and the retard angle chambers 43 fall. When the oil pressure in the lock release holding hydraulic chamber 65 (or the oil pressure in the advance angle chambers 42) and the oil pressure in the lock hole 59 (or the oil pressure in the retard angle chambers 43) become so low that they are overcome by the spring force of the spring 62, the lock pin 58 is protruded to go into the lock hole by the spring force of the spring 62. For the lock pin 58 to be fitted in the lock hole 59, however, it is the condition that their positions are aligned, namely, that the crankshaft phase is aligned with the intermediate lock position.

When the engine 11 stops, its speed (or the rotational speed of the oil pump 28) goes down so that the oil pressure falls. As a result, the crankshaft phase is naturally changed toward the retard angle side by the load torque of the crankshaft. In this course, the lock pin 58 is inserted into the lock hole 59, as shown in FIG. 6, to lock the crankshaft phase at the lock position. If the crankshaft phase has already been on the more retard angle side than the lock position when the engine 11 stops, the lock pin 58 will not reach the lock hole 59 even if the crankshaft phase changes toward the retard angle side because of the low oil pressure, so that crankshaft phase cannot be locked at the lock position.

When it is necessary, as at the engine stop, to lock the crankshaft phase at the lock position, therefore, the engine control circuit 21 controls the hydraulic control valve 29 to advance the crankshaft phase for the lock (as will be called the "lock control"). During this lock control, the energization of the solenoid 53 of the hydraulic control valve 29 is interrupted, so that the valve member is switched to the position for feeding the oil pressure to the advance angle chambers 42 by the spring 54 of the hydraulic control valve 29, thereby to cause the oil pressure to act in the direction to advance the crankshaft phase while discharging the oil pressure of the retard angle chambers 43 to the drain. At this time, after the engine stop was instructed, the fuel injection is interrupted so that the engine speed (or the oil pump speed) goes down to lower the oil pressure. If the engine speed is in the state capable of idling, however, the advance angle control of the crankshaft phase can be made by the oil pressure with the aid of the spring force of the torsional coil spring 55 in the advancing direction. Here, at the time of starting the lock control, when the crankshaft phase has already been on the more advance angle side from the lock position, it is arbitrary to undo the advance angle control of the crankshaft phase.

Figure 8:
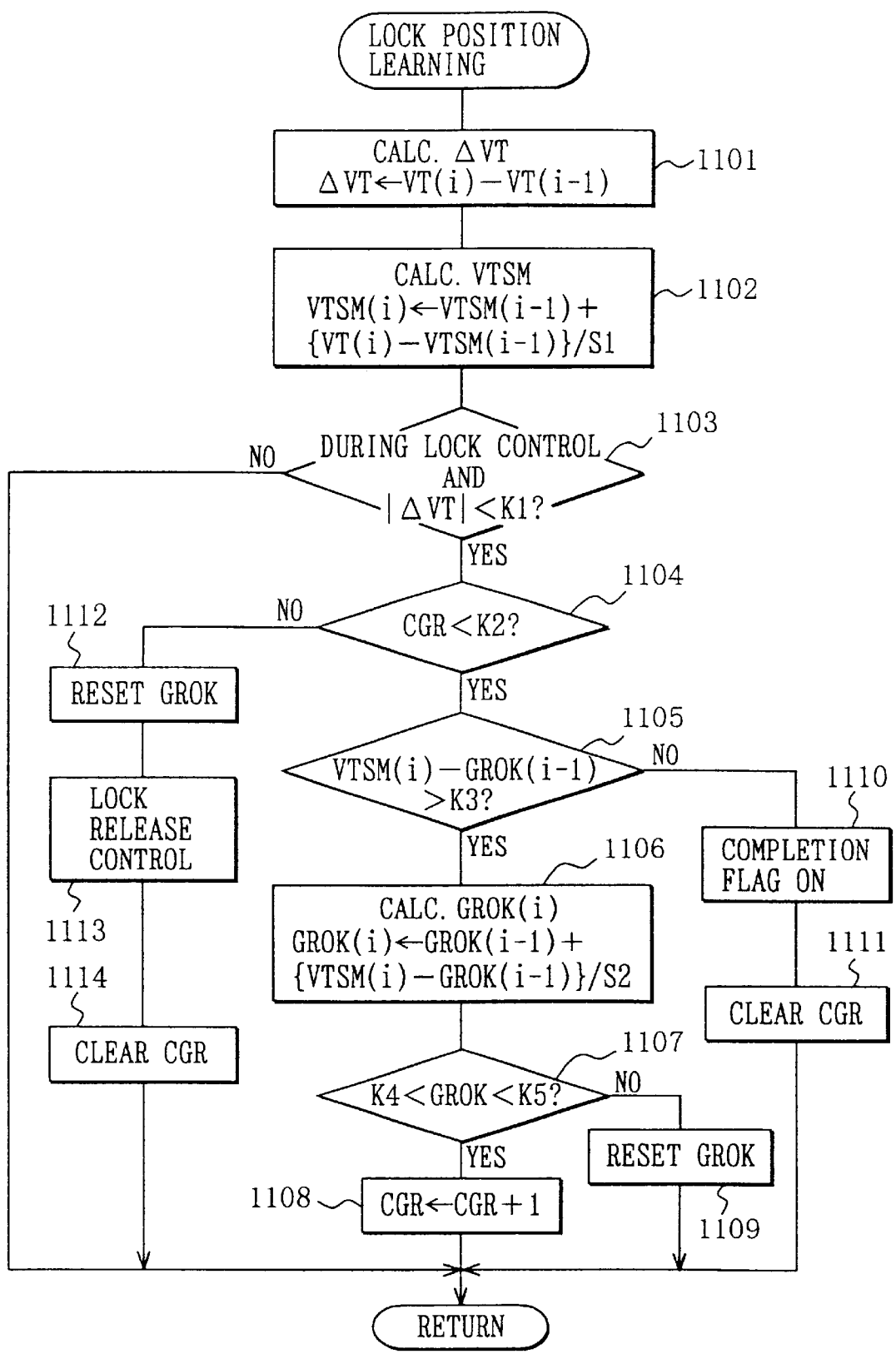
FIG. 8 is a flow chart showing a processing routine of a lock position learning program.

On the other hand, the engine control circuit 21 is enabled, by executing the lock position learning program stored in a ROM (or storage media) and shown in FIG. 8 for every predetermined time periods or every predetermined crank angles, to play the role of lock position learning means for learning the lock position on the basis of the real camshaft phase VT during the lock control. When this program is started, at first Step 101, a real camshaft phase change $\Delta VT$ is calculated from the deviation between the present value VT(i) and the previous value VT(i-1) of the real crankshaft phase:

$$\Delta VT=VT(i)-VT(i-1).$$

At next Step 1102, a rounded real crankshaft phase value VTSM(i), as rounded from the real crankshaft phase VT, is calculated by the following Formula:

$$VTSM(i)=VTSM(i-1)+\{VT(i)-VTSM(i-1)\}/S1,$$

wherein: VTSM(i-1) indicate a previous rounded real crankshaft phase value; and S1 indicate a rounding constant.

After this, at Step 1103, depending on whether or not during the lock control and whether or not the absolute value of the real camshaft phase change $\Delta VT$ is smaller than a predetermined value K1, it is judged whether or not the change in the real camshaft phase decreases. If not during the lock control or if the real camshaft phase change $\Delta VT$ is larger than the predetermined value K1, it is apparent that the state not in the lock, so that this program is ended without any subsequent learning routine.

If during the lock control and if the absolute value of the real camshaft phase change $\Delta VT$ is smaller than the predetermined value, the real camshaft phase VT is approaching the lock state so that the lock position is learned in the following manner. First of all, at Step 1104, it is judged whether or not the number of learnings CGR of the lock position, as counted by a learning number counter, is smaller than a predetermined value K2. If the learning number CGR is smaller than the predetermined value K2, the routine advances to Step 1105, at which it is judged whether or not the deviation between the present rounded real camshaft phase value VTSM(i) and the previous lock position learning value GROK(i-1) is larger than a predetermined value K3.

If the deviation between the present rounded real camshaft phase value VTSM(i) and the previous lock position learning value GROK(I-1) is larger than the predetermined value K3, it is judged that the rounded real camshaft phase value VTSM(i) has not converged into a constant value yet (that is, that the camshaft phase is not locked yet), and the routine advances to Step 1106, at which a lock position learning value GROK(i) is calculated by the following rounding Equation using the rounded real camshaft phase value VTSM(i):

$$GROK(i)=GROK(i-1)+\{VTSM(i)-GROK(i-1)\}/S2,$$

wherein S2 indicate a rounding constant. After the calculation of the lock position learning value GROK(i), the routine advances to Step 1107, at which it is judged whether or not the lock position learning value GROK (i) is within an allowable dispersion range (i.e., a predetermined value K4<GROK(i)<a predetermined value K5). If within this range, the routine advances to Step 1108, at which the counter of the learning number CGR is incremented, and this program is ended. If the lock position learning value GROK(i) is outside of the allowable dispersion range, it is judged that the lock position learning value GROK(i) is fixed at a position other than the lock position, and the routine advances to Step 1109, at which the lock position learning value GROK(i) is reset to the initial value (or a designed center value) or the learning value at the previous lock control time.

If the deviation between the present rounded real camshaft phase VTSM(i) and the previous lock position learning value GROK(i-1) is smaller than the predetermined value K3 before the learning number CGR reaches the predetermined value K2, it is judged that the rounded real camshaft phase value VTSM(i) has converged into a constant value (that is, that the camshaft phase is locked), and the routine advances to Step 1110, at which the learning completion flag is ON. At next Step 1111, the counter of the learning number CGR is cleared, and this program is ended.

When the learning number CGR reaches the predetermined value K2 before the deviation between the present rounded real camshaft phase VTSM(i) and the previous lock position learning value GROK(i-1) becomes smaller than the predetermined value K3, it is judged that the state is in the insufficient lock state (or the half lock state), and the routine advances to Step 1112, at which the lock position learning value GROK(i) is reset to the initial value (or the designed center value) or the learning value at the previous lock control time. After this, the routine advances to Step 1113, at which the lock release control is made. Thus, the insufficient lock state can be returned by the lock release control to the lock release state so that the normal lock condition can be established by the next lock control. At Step 1114, this program is ended by clearing the counter of the learning number CGR.

One example of the learning processing of the lock position learning value GROK by the lock position learning program thus far described will be described with reference to FIGS. 9 and 10. Here, FIG. 9 illustrates the behaviors of the lock position learning procedure during the normal condition, and FIG. 10 illustrates the behaviors of the lock position learning procedure during the abnormal condition. During the lock control, the real camshaft phase VT is controlled toward the advance angle side so that the lock position learning value GROK gradually approaches the lock position. During the normal condition, as illustrated in FIG. 9, the real camshaft phase VT reaches the lock position during the lock control so that the lock position learning value GROK converges into the constant value. At this time, the lock completion is judged to turn ON the learning completion flag, and the learning of the lock position learning value GROK is ended.

Thus, during the normal condition, it does not take a long time that the real camshaft phase VT is locked at the lock position. When the insufficient lock state (or the half lock state) comes in, however, the real camshaft phase VT is not fixed even if the lock control is continued long, so that the lock position learning value GROK does not converge into the constant value. When the learning number CGR reaches the predetermined value K2 before the lock position learning value GROK converges into a constant value, as illustrated in FIG. 10, therefore, the insufficient lock state (or the half lock state) is judged, the lock position learning value GROK is reset to the initial value (or the designed center value) or the learning value during the previous lock control.

Here, even when the lock position learning value GROK converges into the constant value before the learning number CGR reaches the predetermined value K2, it is judged that the lock position learning value GROK is fixed at a position other than the lock position, if the lock position learning value GROK is outside of the allowable dispersion range. Then, the lock position learning value GROK is reset to the initial value (or the designed center value) or the learning value during the previous lock control.

In this Embodiment, the insufficient lock state is judged when the learning number CGR of the lock position learning value GROK reaches the predetermined value K2. However, the insufficient lock state may be judged when the learning time (or the lock control time) reaches a predetermined value.

Figure 11:
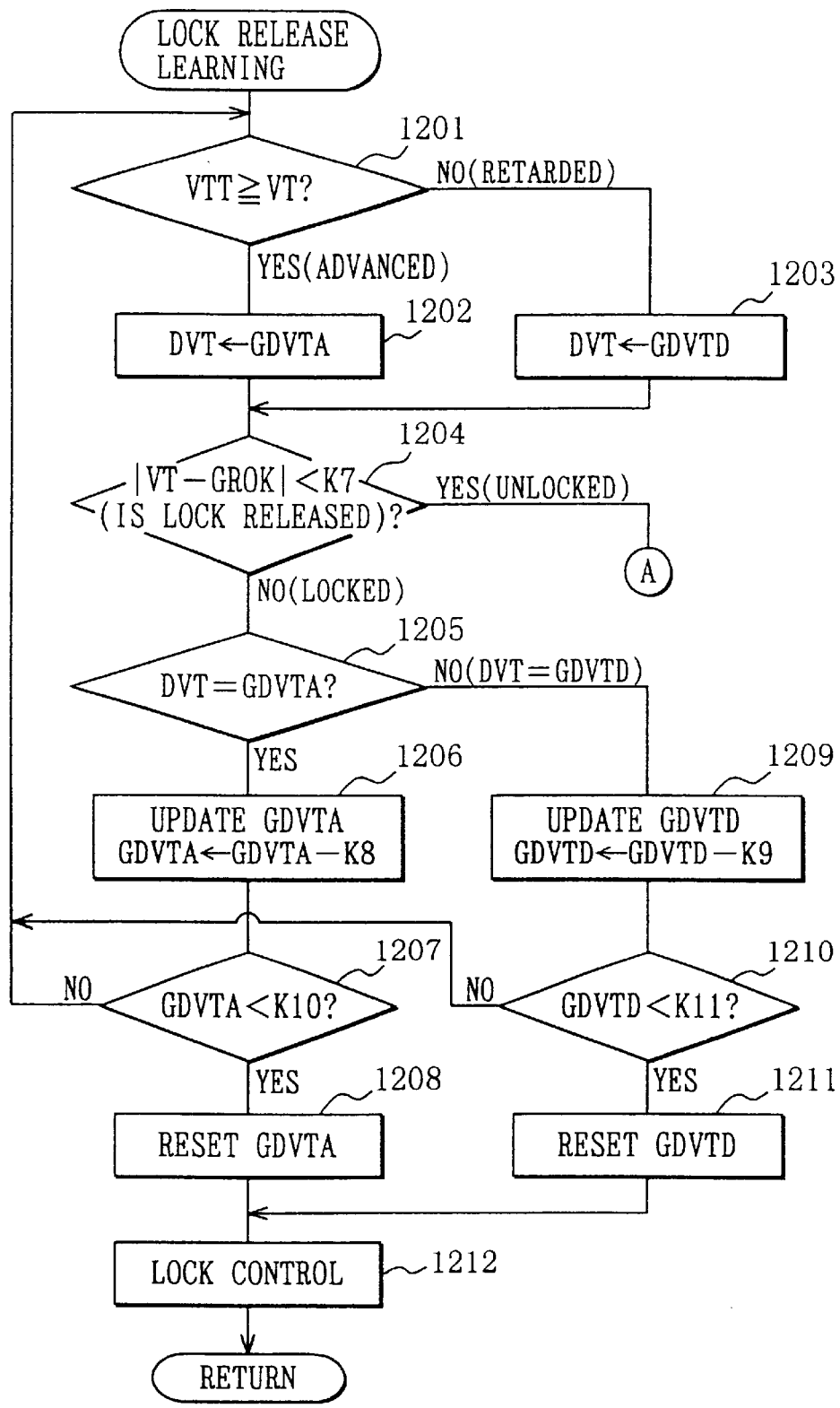
FIG. 11 is a flow chart (1) showing a processing routine of a lock release learning program.
Figure 12:
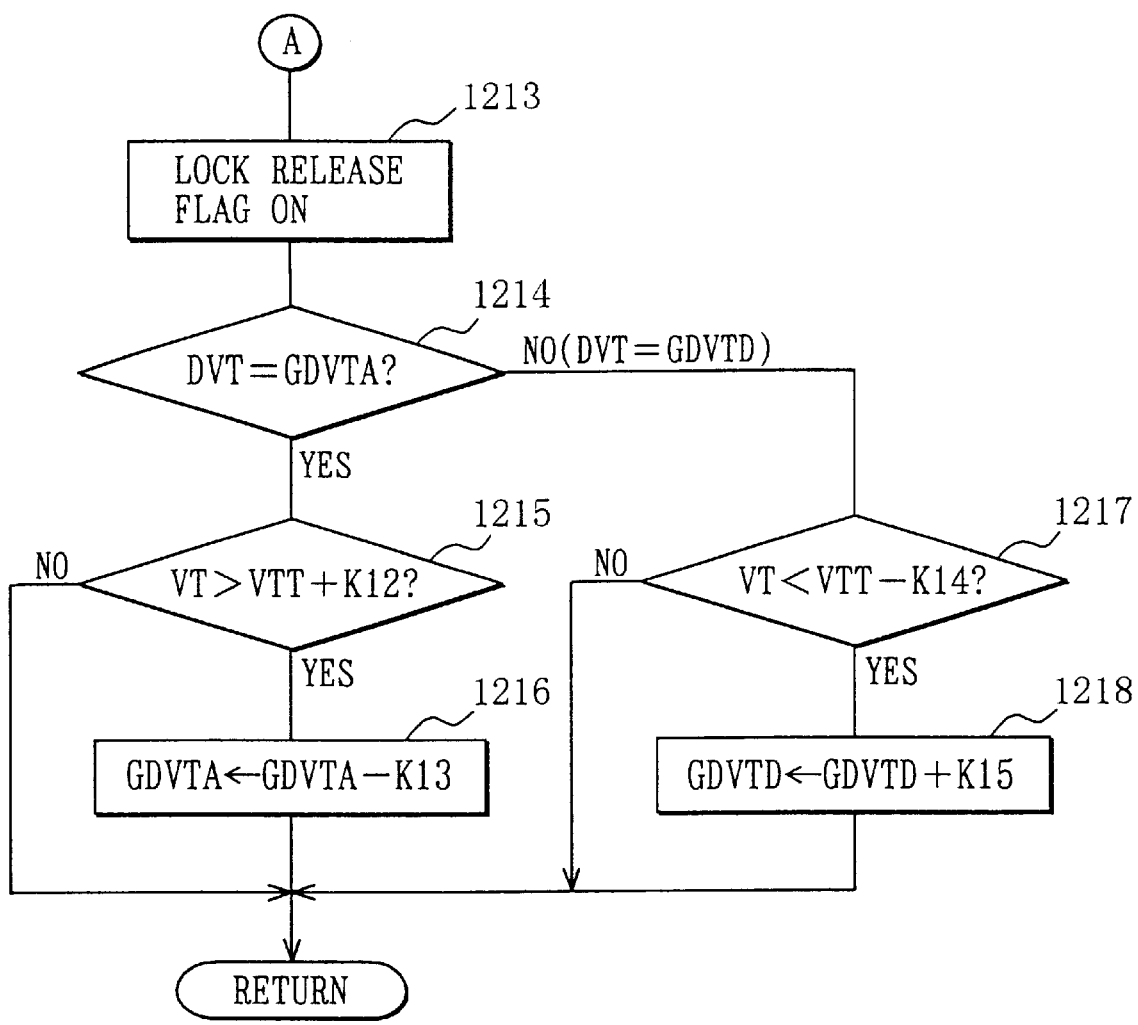
FIG. 12 is a flow chart (2) showing a processing routine of the lock release learning program.

On the other hand, the engine control circuit 21 is enabled, by executing the lock release learning program stored in the ROM (or the storage media) and shown in FIGS. 11 and 12 for every predetermined times or at predetermined crank angles, to play the role of lock position learning means for learning the control of the hydraulic control valve 29 (as will be called the "lock release control") during the lock control.

When this program is started, at first Step 1201, the target camshaft phase VTT and the real camshaft phase VT are compared to judge whether the target camshaft phase VTT is advanced or retarded from the real camshaft phase VT. When the target camshaft phase VTT is advanced from the real camshaft phase VT (that is, when VTT≧VT), the routine advances to Step 1202, at which a lock release control DVT is set to an advance angle learning value GDVTA to perform the lock release control. When the target camshaft phase VTT is retarded from the real camshaft phase VT (that is, when VTT<VT), on the other hand, the routine advances to Step 1203, at which the lock release control DVT is set to a retard angle learning value GDVTD to perform the lock release control.

After this, at Step 1204, depending on whether or not the absolute value of the deviation between the real camshaft phase VT and the lock position learning value GROK is larger than a predetermined value K7, it is judged whether or not the lock is released. If the absolute value of the deviation between the real camshaft phase VT and the lock position learning value GROK is smaller than the predetermined value K7, the locked state is judged, and the learning value of the lock release control DVT is updated in the following manners.

First of all, at Step 1205, it is judged whether or not the present lock release control DVT is the advance angle learning value GDVTA (that is, whether or not the routine has passed through Step 1202). If at the advance angle learning value GDVTA, the routine advances to Step 1206, at which the advance angle learning value GDVTA is corrected by a predetermined value K8 toward the retard angle side and is updated:

$$GDVTA=GDVTA-K8.$$

After this, at Step 1207, it is judged whether or not the advance angle learning value GDVTA is smaller (or toward the retard angle side) than a predetermined value K10 or an allowable limit value. If the advance angle learning value GDVTA is more than the predetermined value K10, the routine returns to Step 1201, at which the operations described above are repeated. As a result, till the lock release is detected, the advance angle learning value GDVTA is corrected by the predetermined value K8 toward the retard angle side, and the lock release control DVT is corrected by the predetermined value K8 toward the retard angle side. These operations to execute the lock release control are repeated.

If the advance angle learning value GDVTA becomes smaller than the predetermined value K10 before the lock release is detected, the insufficient lock release (or the fixed lock) is judged, and the routine advances to Step 1208, at which the advance angle learning value GDVTA is reset to the initial value (or the designed center value) or the advance angle learning value GDVTA during the previous lock release control. At next Step 1212, the lock control is made to keep the lock state.

When it is judged at Step 1205 that the present lock release control DVT is at the retard angle learning value GDVTD (that is, that the routine has passed through Step 1203), on the other hand, the routine advances to Step 1209, at which the retard angle learning value GDVTD is corrected by a predetermined value K9 toward the retard angle side and is updated:

$$GDVTD=GDVTD-K9.$$

After this, at Step 1201, it is judged whether or not the retard angle learning value GDVTD is smaller (on the retard angle side) than a predetermined value K11 or an allowable limit value. If the retard angle learning value GDVTD is more than the predetermined value K11, the routine returns to Step 1201, and the operations described above are repeated. As a result, till the lock release is detected, the retard angle learning value GDVTD is corrected by the predetermined value K9 toward the retard angle side and is updated, and the lock release control DVT is corrected by the predetermined value K9 toward the retard angle side. These operations to execute the lock release control are repeated.

If the retard angle learning value GDVTD becomes smaller than the predetermined value K11 before the lock release is detected, the insufficient lock release (or the fixed lock) is judged, and the routine advances to Step 1211, at which the retard angle learning value GDVTD is reset to the initial value or the retard angle learning value GDVTD during the previous lock release control. At next Step 1212, the lock control is made to keep the lock state.

If the absolute value of the deviation between the real camshaft phase VT and the lock position learning value GROK becomes larger than the predetermined value K7 during the lock release control, on the contrary, it is judged at Step 1204 that the lock is released, and the routine advances to Step 1213 of FIG. 12, at which the lock release flag is turned ON. After this, at Step 1214, it is judged whether or not the present lock release control DVT is at the advance angle learning value GDVTA (that is, whether or not the routine has passed through Step 1202). If at the advance angle learning value GDVTA, the routine advances to Step 1215. Depending on whether or not the real camshaft phase VT is larger (or on the advance angle side) than the target camshaft phase VTT+a predetermined value K12, it is judged at Step 1215 whether or not the advance angle learning value GDVTA is excessively corrected toward the advance angle side. If the advance angle learning value GDVTA is not excessively corrected toward the advance angle side, this program is ended as it is. If the advance angle learning value GDVTA is excessively corrected toward the advance angle side, the routine advances to Step 1216, at which the advance angle learning value GDVTA is corrected by a predetermined value K13 toward the retard angle side.

If it is judged at Step 1214 that the present lock release control DVT is at the retard angle learning value GDVTD (that is, that the routine has passed through Step 1203), on the other hand, the routine advances to Step 1217. Depending on whether or not the real camshaft phase VT is smaller (toward the retard angle side) than the target camshaft phase VTT—a predetermined value K14, it is judged at Step 1217 whether or not the retard angle learning value GDVTD is excessively corrected toward the retard angle side. If the retard angle learning value GDVTD is not excessively corrected toward the retard angle side, this program is ended as it is. If the retard angle learning value GDVTD is excessively corrected toward the retard angle side, however, the routine advances to Step 1218, at which the retard angle learning value GDVTD is corrected by a predetermined value K15 toward the advance angle side.

Figure 13:
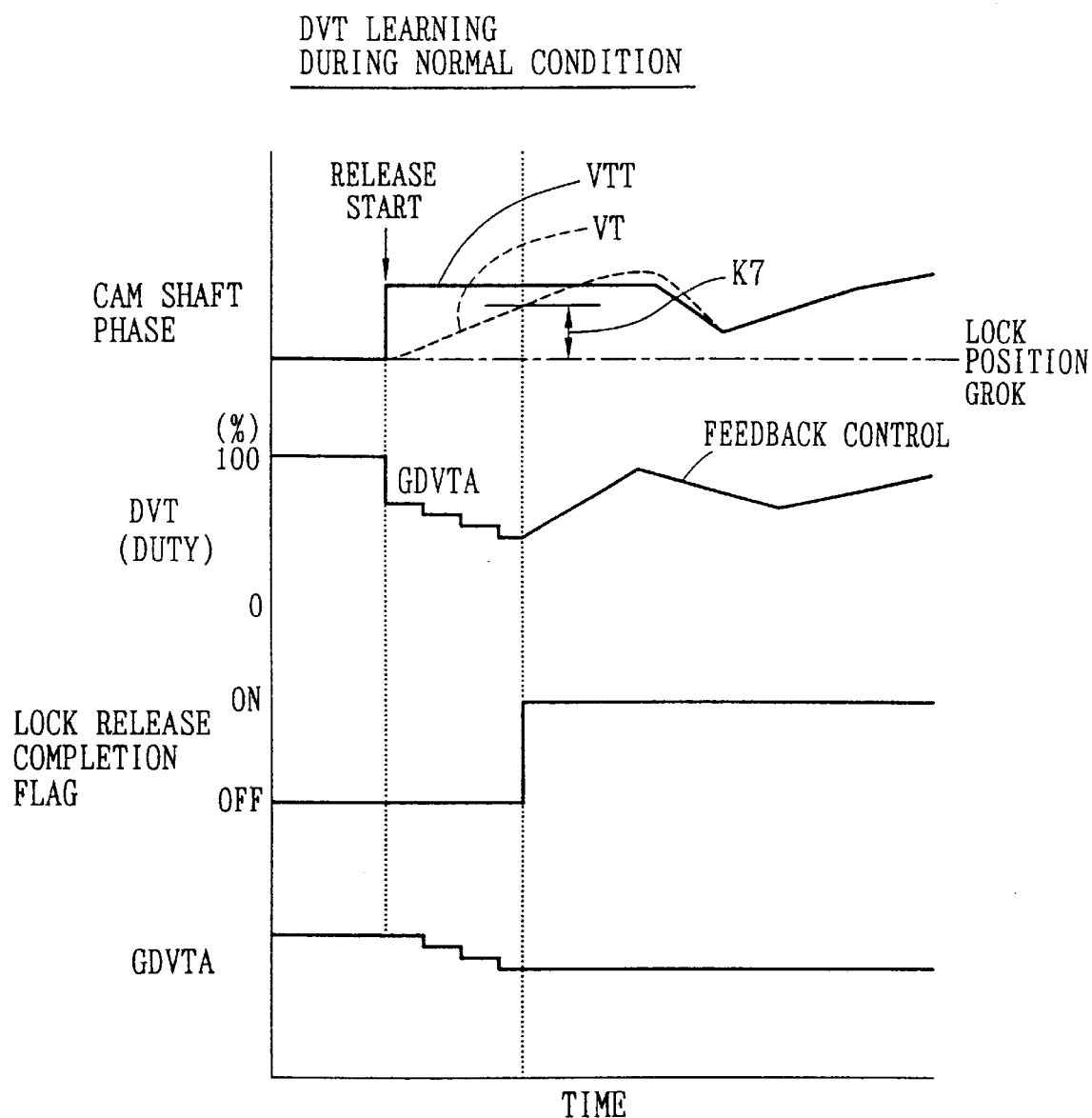
FIG. 13 is a time chart showing illustrating the behaviors of the lock release learning procedure during the normal condition.
Figure 14:
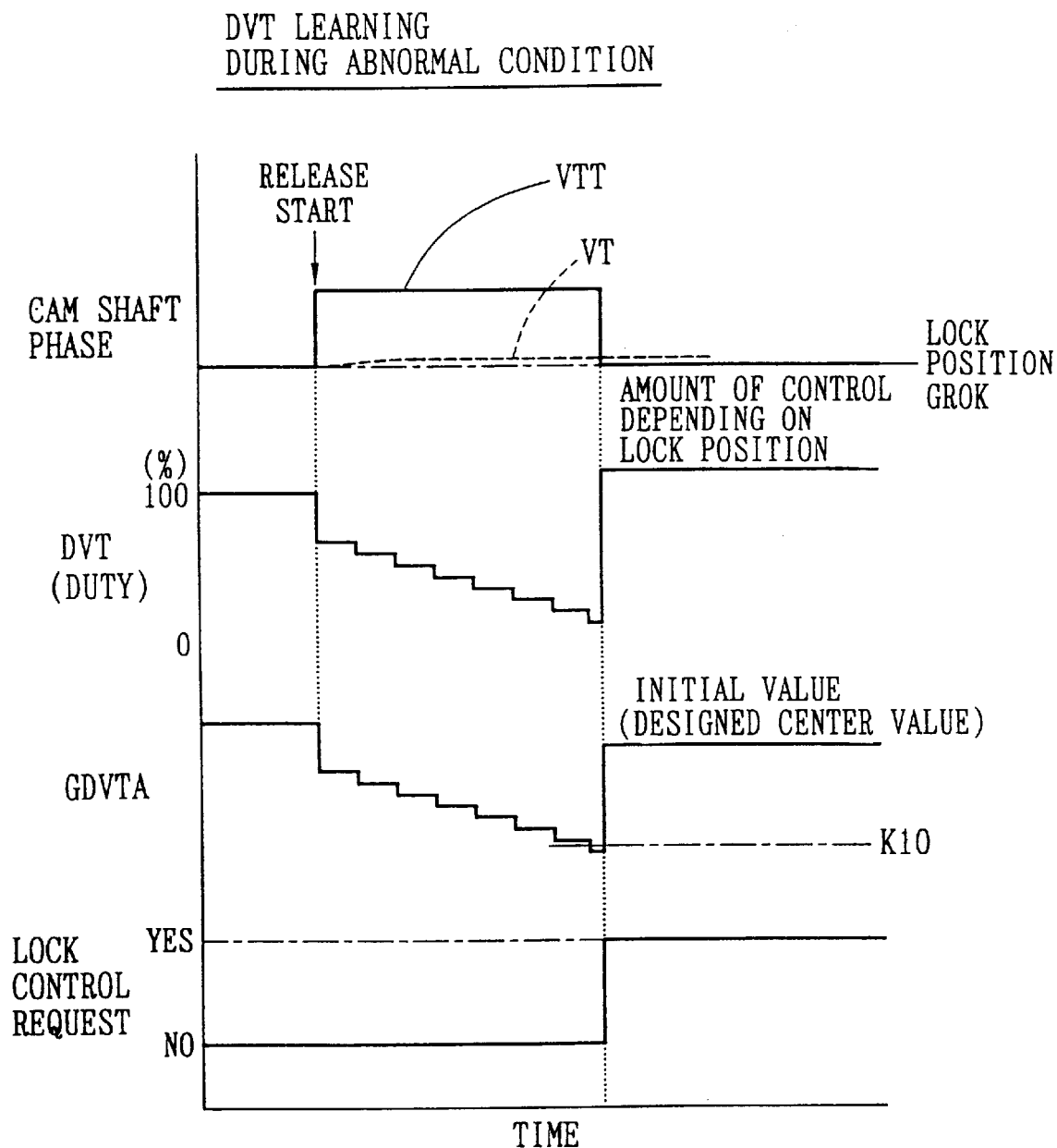
FIG. 14 is a time chart showing illustrating the behaviors of the lock release learning procedure during the abnormal condition.
Figure 15:
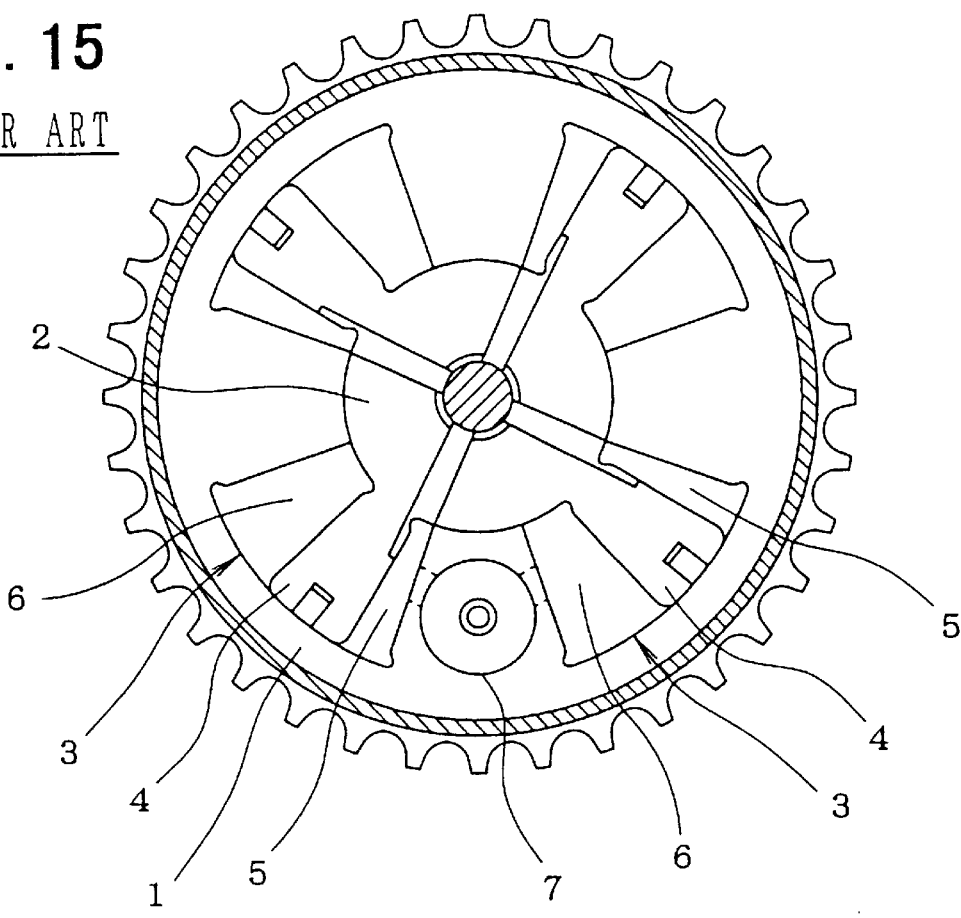
FIG. 15 is a section showing a variable timing device of the related art.

One example of the learning processing of the lock release control DVT by the lock release learning program thus far described will be described with reference to FIGS. 13 and 14. Here, FIG. 13 illustrates the behaviors of the lock release learning procedure during the normal condition, and FIG. 14 illustrates the behaviors of the lock release learning procedure during the abnormal condition. When the target camshaft phase VTT is set on the advance angle side from the lock position learning value GROK, for example, the lock release control DVT is set to the advance angle learning value GDVTA to start the lock release control, as illustrated in FIG. 13. During the lock release control, till the lock release is detected, there are repeated the operations to correct the lock release control DVT by the predetermined value K8 toward the retard angle side and to correct and update the advance angle learning value GDVTA by the predetermined value K8 toward the retard angle side. As a result, the lock release is judged at the instant when the deviation between the real camshaft phase VT and the lock position learning value GROK becomes larger than the predetermined value K7, the lock release flag is turned ON, and the learning of the advance angle learning value GDVTA is ended. If the advance angle learning value GDVTA is then excessively corrected toward the advance angle side, the advance angle learning value GDVTA is corrected by the predetermined value K13 toward the retard angle side.

When the insufficient lock release (or the fixed lock) occurs, on the other hand, the lock release is not detected even if the lock release control is continued long. During the lock release control, the operation to correct the advance angle learning value GDVTA toward the retard angle side is repeated many times till the lock release is detected. Before long, as illustrated in FIG. 14, the advance angle learning value GDVTA becomes smaller than the predetermined value K10 or the allowable limit value. At this instant, the insufficient lock release (or the fixed lock) is judged, and the advance angle learning value GDVTA is reset to the initial value (or the designed center value) or the advance angle learning value GDVTA during the previous lock release control so that the lock control is made to keep the lock state.

According to this Embodiment thus far described, the lock position is learned during the lock control. If the manufacture dispersion of the lock position is wide, therefore, the actual lock position can be learned to judge the lock release on the basis of the learned value, so that the lock release can be judged highly accurately without being influenced by the manufacture dispersion of the lock position. Here, the learned value of the lock position can also be used for an application (e.g., for judging the lock) other than that for judging the lock release.

In this Embodiment, on the other hand, the lock release control of the hydraulic control valve 29 is learned during the lock release control. Even if the manufacture dispersion of the lock position and the manufacture dispersion of the hydraulic control valve 29 are wide, therefore, the lock release control can be optimized for the characteristics of the individual systems to improve the lock releasing performance.

In this Embodiment, therefore, when the lock release control is to be learned, depending on whether the target camshaft phase during the lock release control is on the retard angle side or on the advance angle side from the real camshaft phase, the lock release control is learned by discriminating the retard angle side learning value and the advance angle side learning value. After the lock release, therefore, the lock release control can be learned so that the real camshaft phase may converge into the target camshaft phase thereby to improve the convergence of the real camshaft phase into the target camshaft phase. In the invention, however, the learning procedure may be simplified by reducing the learning value of the lock release control to one.

Here in the lock release learning program of FIGS. 11 and 12, the insufficient lock release (or the fixed lock) is judged when the learning value of the lock release control becomes smaller than the predetermined value. When the correction of the lock release control (or the learning value) is repeated by a predetermined number or more, however, the insufficient lock release may be judged.

When the lock release cannot be performed, on the other hand, the lock release control may be made again in the running region where the oil pressure to be fed to the hydraulic control valve 29 is high. Then, the oil pressure in the lock releasing direction to be applied to the lock pin 58 can be raised to make the lock release control again so that the lock release can be performed even if the resistance to the lock release (such as the frictional resistance to the lock pin 58) is slightly larger.

Here, the invention can be variously modified in the variable valve timing adjustor of the exhaust valve without departing from its gist by learning only one of the lock position and the lock release control, by modifying the construction of the variable valve timing adjustor or the construction of the lock mechanism.

If the timing for the lock release is retarded for some cause, on the other hand, the deviation between the real advance angle position and the target advance angle position increases. As a result, the feedback control is made in the direction to enlarge the difference between the oil pressures in the advance angle chambers 42 and the retard angle chambers 43 so that the worse circulation is entered to retard the lock release timing the more. As a result, the valve timing control is not made in the normal condition to invite problems in the reduction of the drivability, the deterioration of the fuel economy, and the deterioration in the exhaust emission.

Figure 18:
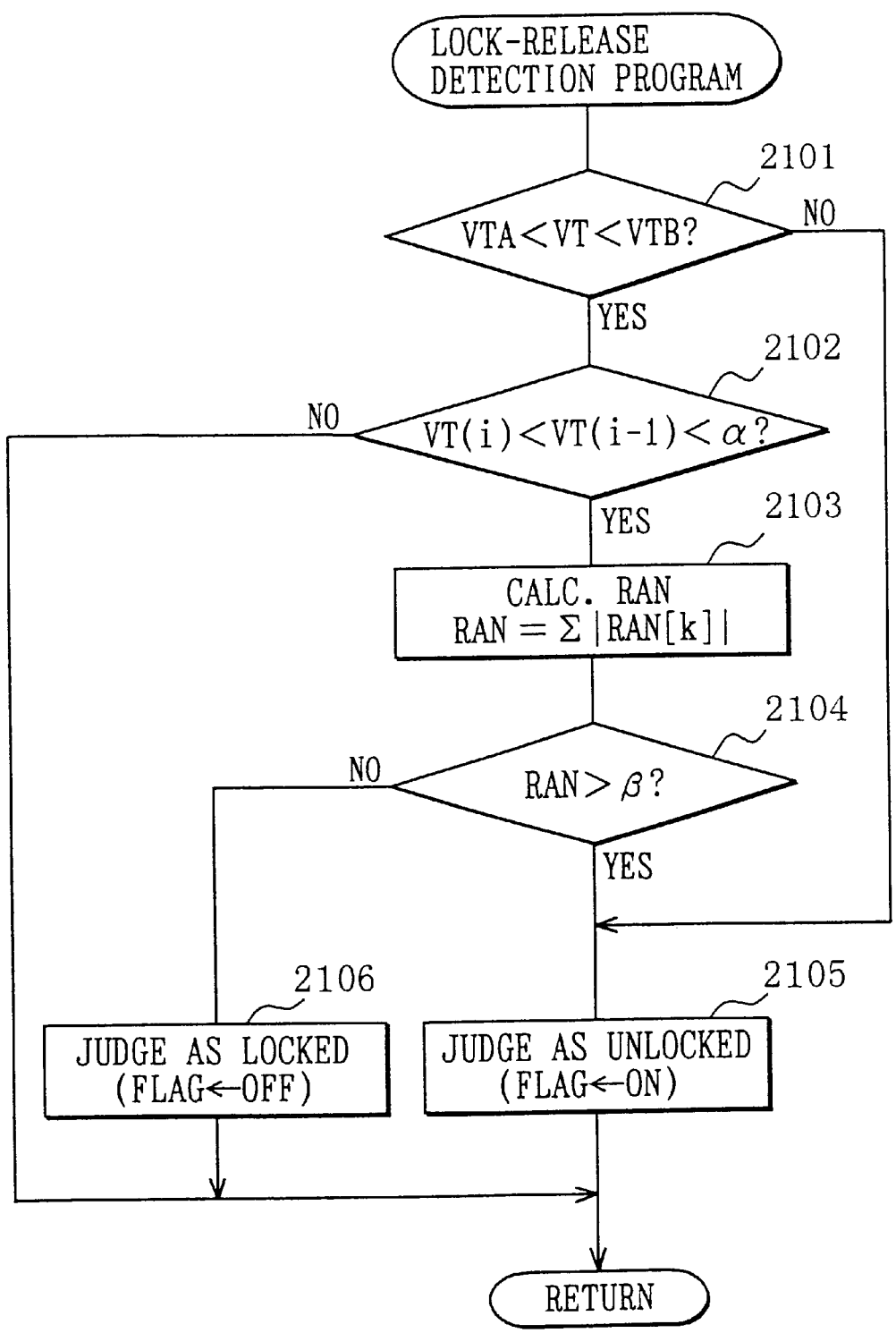
FIG. 18 is a flow chart showing a processing routine of a lock release detection program of First Embodiment.

In First Embodiment, therefore, it is judged by the lock release detection program of FIG. 18 whether or not the lock of the lock pin 58 is released. By the valve timing control program of FIG. 20, the feedback control is started after the lock release is released. These programs are stored in the ROM (or the storage media) packaged in the engine control circuit 21 and executed by the microcomputer of the engine control circuit 21. The processing contents of those programs will be described in the following.

The lock release detection program of FIG. 18 is executed periodically repeatedly to play the role of release detection means. When this program is started, at first Step 2101, it is judged whether or not the present real advance angle position (or the real valve timing) VT is within a predetermined range (VTA<VT<VTB) in the vicinity of the intermediate lock position. Here, the predetermined range (VTA<VT<VTB) is set within the range from the intermediate lock position up to a predetermined value (e.g., the value estimating the error factors such as the detection error of the real advance angle position VT, the manufacture dispersion and the aging to the maximum). On the other hand, the intermediate lock position to be used as the center value of the predetermined range is set at the center value of the manufacture dispersion (or the designed center value).

If the present real advance angle position VT is not within the predetermined range in the vicinity of the intermediate lock position, it is apparent considering the error factors such as the detection error to the maximum that the camshaft phase is apart from the intermediate lock position. Therefore, the routine advances to Step 2105, at which the lock release of the lock pin 58 is judged, and this program is ended.

If the present real advance angle position VT is within the predetermined range in the vicinity of the intermediate lock position, on the other hand, the routine advances to Step 2102, at which whether or not the running state is stable is judged depending on whether or not the deviation between the present real advance angle position VT(i) and the previous real advance angle position VT(i-1) is smaller than a predetermined value $\alpha$. This is because the detection dispersion of the real advance angle position VT(i) has a tendency to grow wide in the region where the running state is not stable, so that the detection accuracy of the lock release is deteriorated by the later-described detect ion method of Steps 2103 to 2106. When the deviation between the present real advance angle position VT(i) and the previous real advance angle position VT(i-1) is larger than the predetermined value $\alpha$, therefore, it is judged that the detection of the lock release cannot be accurately made, and this program is ended without any subsequent operation.

If the deviation between the present real advance angle position VT(i) and the previous real advance angle position VT(i-1) is smaller than the predetermined value $\alpha$, on the other hand, it is judged that the lock release can be detected, and the routine advances to Step 2103, at which the dispersion degree RAN of the advance angles of a plurality of cam angle signals is calculated by either of the following two methods.

[First Calculation Method]

As shown in FIG. 16, the mutual deviations RAN[1], RAN[2], RAN[3] and RAN[4] of advance angles VT[1], VT[2], VT[3] and VT[4] of four cam angle signals, as outputted from the cam angle sensor 19 as the camshaft 16 makes one rotation, are calculated by the following formulas:

$$RAN[1]=VT[1]-VT[4];$$

$$RAN[2]=VT[2]-VT[1];$$

$$RAN[3]=VT[3]-VT[2];$$

and $$RAN[4]=VT[4]-VT[3].$$

Moreover, these four deviations RAN[1], RAN[2], RAN[3] and RAN[4] are accumulated to determine the dispersion degree RAN of the advance angles of the cam angle signals:

$$RAN=|RAN[1]+RAN[2]+RAN[3]+RAN[4]|.$$

[Second Calculation Method]

The deviations RAN[1], RAN[2], RAN[3] and RAN[4] between the present values and the previous values of the advance angles VT[1], VT[2], VT[3] and VT[4] of the four cam angle signals, as outputted from the cam angle sensor 19 as the camshaft 16 makes one rotation, are calculated by the following formulas:

$$RAN[1]=VT[1](i)-VT[1](i-1);$$

$$RAN[2]=VT[2](i)-VT[2](i-1);$$

$$RAN[3]=VT[3](i)-VT[3](i-1);$$

and $$RAN[4]=VT[4](i)-VT[4](i-1).$$

Moreover, these four deviations RAN[1], RAN[2], RAN[3] and RAN[4] are accumulated to determine the dispersion degree RAN of the advance angles of the cam angle signals:

$$RAN=|RAN[1]+RAN[2]+RAN[3]+RAN[4]|.$$

After the dispersion degree RAN was calculated by either of the methods described above, the routine advances to Step 2104, at which the dispersion degree RAN of the advance angles of the cam angle signals is compared with a predetermined value $\beta$. If the dispersion degree RAN is below the predetermined value $\beta$, it is thought that the camshaft phase is fixed at the intermediate lock position and is not moved in the least. Therefore, the routine advances to Step 2106, at which it is judged that the lock pin 58 is locked, and the lock release detection flag is kept OFF.

If the dispersion degree RAN of the advance angles of the cam angle signals is over the predetermined value $\beta$, on the other hand, it is thought that the camshaft phase is finely hunting in the vicinity of the intermediate lock position. Therefore, the routine advances to Step 2105, at which it is judged that the lock of the lock pin 58 is released, and the lock release detection flag is turned ON. When the lock pin 58 is unlocked, more specifically, the camshaft phase hunts finely even if the camshaft phase is hydraulically controlled to the vicinity of the intermediate lock position. By utilizing the characteristic that the dispersion degree RAN of the advance angles of the cam angle signals increases, therefore, it is judged from the magnitude of the dispersion degree RAN of the advance angles of the cam angle signals whether or not the lock is released.

Here, the method for determining the dispersion degree RAN of the advance angles of the cam angle signals should not be limited to the method of accumulating the advance angle deviations RAN[1] to RAN[4] of the individual cam angle signals, but could be exemplified by employing the differences of the maximums and the minimums of the advance angle deviations of the cam angle signals as the dispersion degrees RAN, or by employing the maximums as the dispersion degrees RAN. In short, the dispersion degrees RAN may be those in which the magnitudes of the dispersions of the advance angles of the cam angle signals are expressed by numerical values.

Figure 19:
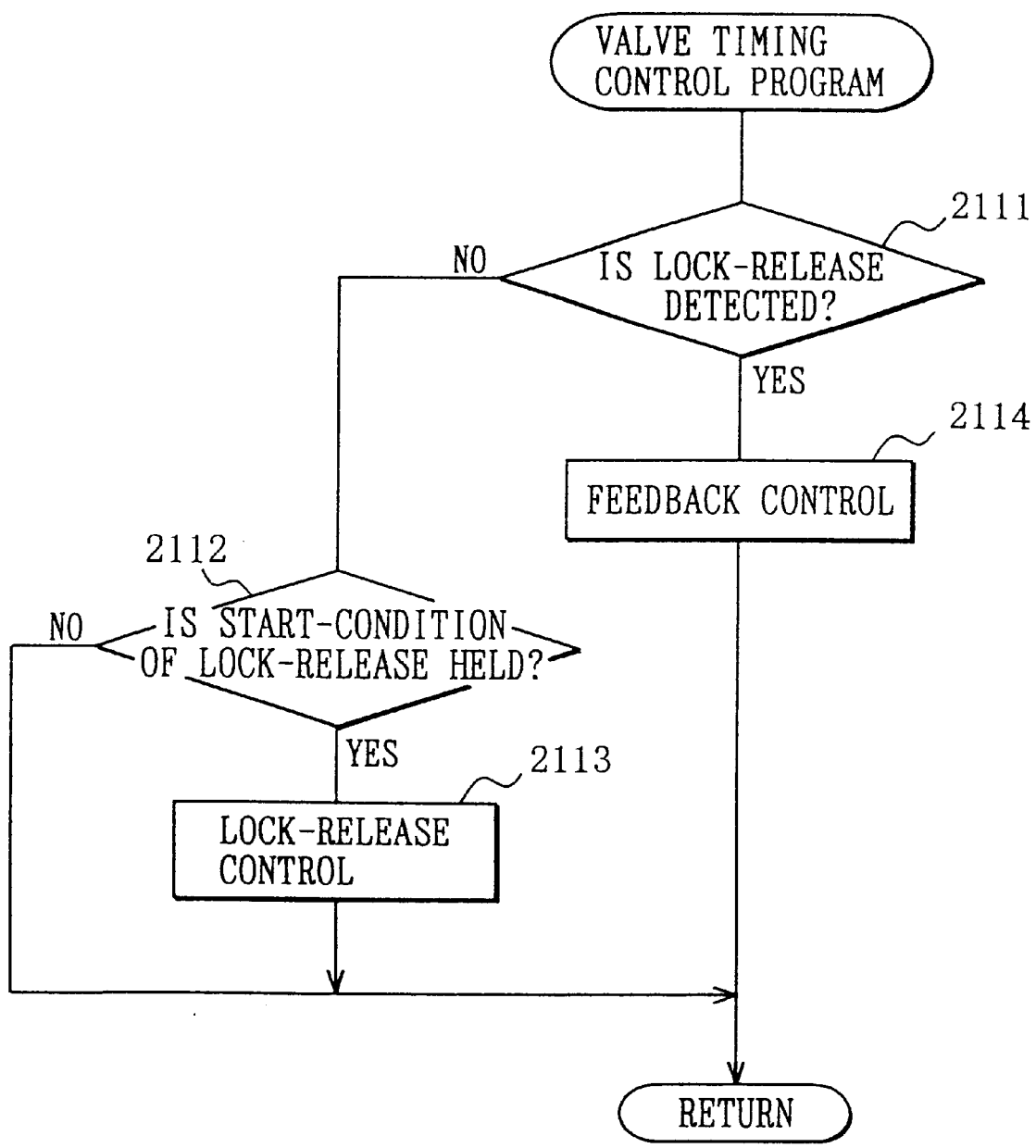
FIG. 19 is a flow chart showing a processing routine of a valve timing control program of First Embodiment.

Here will be described the processing contents of the valve timing control program of FIG. 19. This program is executed periodically repeatedly to play the role of valve timing control means. When this program is started, at first Step 2111, it is judged whether or not the lock release of the lock pin 58 is detected by the lock release detection program of FIG. 18 (that is, whether or not the lock release detection flag is ON). If the lock release is not detected yet, the routine advances to Step 2112, at which it is judged whether or not the start condition for the lock release is held. Here, this start condition for the lock release is that a predetermined time has elapsed from the start, or that the oil pressure to be discharged from the oil pump 28 has risen to a predetermined or higher level.

If the lock release starting condition is not held, this program is ended as it is. If the lock release starting condition is held, on the other hand, the routine advances to Step 2113, at which the lock release control is executed to unlock the lock pin 58. This lock release control is made by feeding the oil pressure to the retard angle chambers 43 and further to the lock hole 59 via the lock release oil passage 68 so that the lock pin 58 is pushed out of the lock hole 59 by the oil pressure to unlock the lock pin 58.

If it is judged at Step 2111 that the lock release of the lock pin 58 is detected, on the other hand, the routine advances to Step 2114, at which the feedback control of the valve timing is started so that the hydraulic control valve 29 is feedback-controlled to make the coincidence between the real advance angle position (or the real valve timing) VT and the target advance angle position (or the target valve timing) VTT thereby to control the oil pressures in the advance angle chambers 42 and the retard angle chambers 43.

Figure 20:
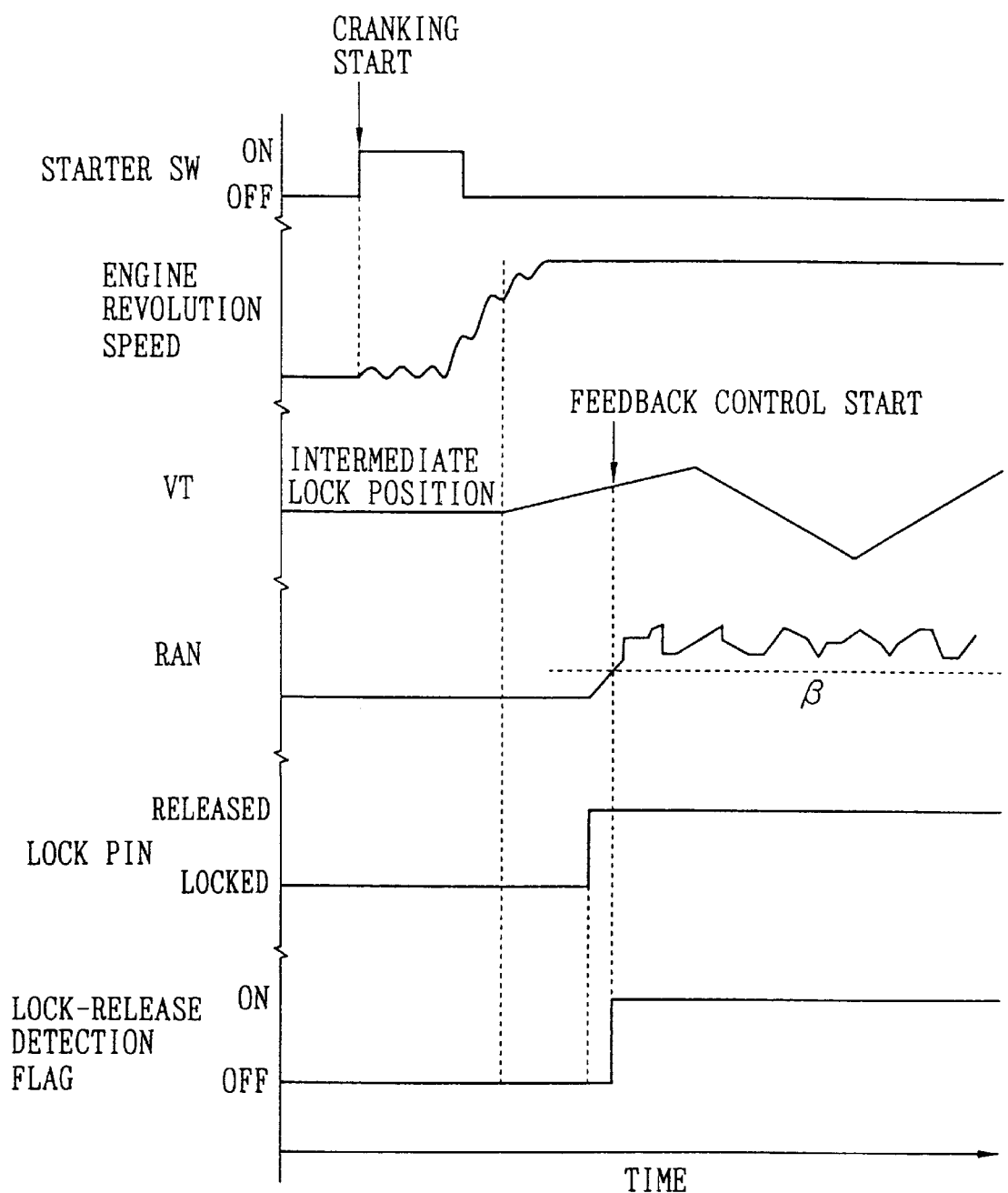
FIG. 20 is a time chart showing a control example of First Embodiment.

An example of the control of First Example thus far described will be described with reference to the time chart of FIG. 20. When the lock pin 58 is unlocked by the oil pressure which is raised as the engine speed (or the oil pump speed) goes up after the start, the dispersion degree RAN of the advance angles of the cam angle signals gradually increases. When this dispersion degree RAN exceeds the predetermined value β, the lock release is judged, and the lock release detection flag is switched ON. As a result, the feedback control of the valve timing is started so that hydraulic control valve 29 is feedback-controlled to establish the coincidence between the real advance angle position (or the real valve timing) VT and the target advance angle position (or the target valve timing) VTT.

Since, in this case, the feedback control of the valve timing is not started before the lock release of the lock pin 58 is detected, the feedback control is not started before the end of the lock release. Unlike the related art in which the lock release of the lock pin 58 is obstructed by the feedback control, therefore, the lock can be quickly released so that the transfer can be made to the feedback control to improve the drivability, the fuel economy and the exhaust emission better than the related art.

In First Embodiment, moreover, the lock release is detected on the basis of the dispersion degree RAN of the advance angles of the cam angle signals so that no new sensor for detecting the lock release need be added to satisfy the demand for the lower cost.

If the variable valve timing adjustor 19 has a poor movement when the engine stops, however, the camshaft phase may fail to reach the lock position and may stop before the engine stop, thereby to cause the problems of the poor startability or the noise.

Figure 21:
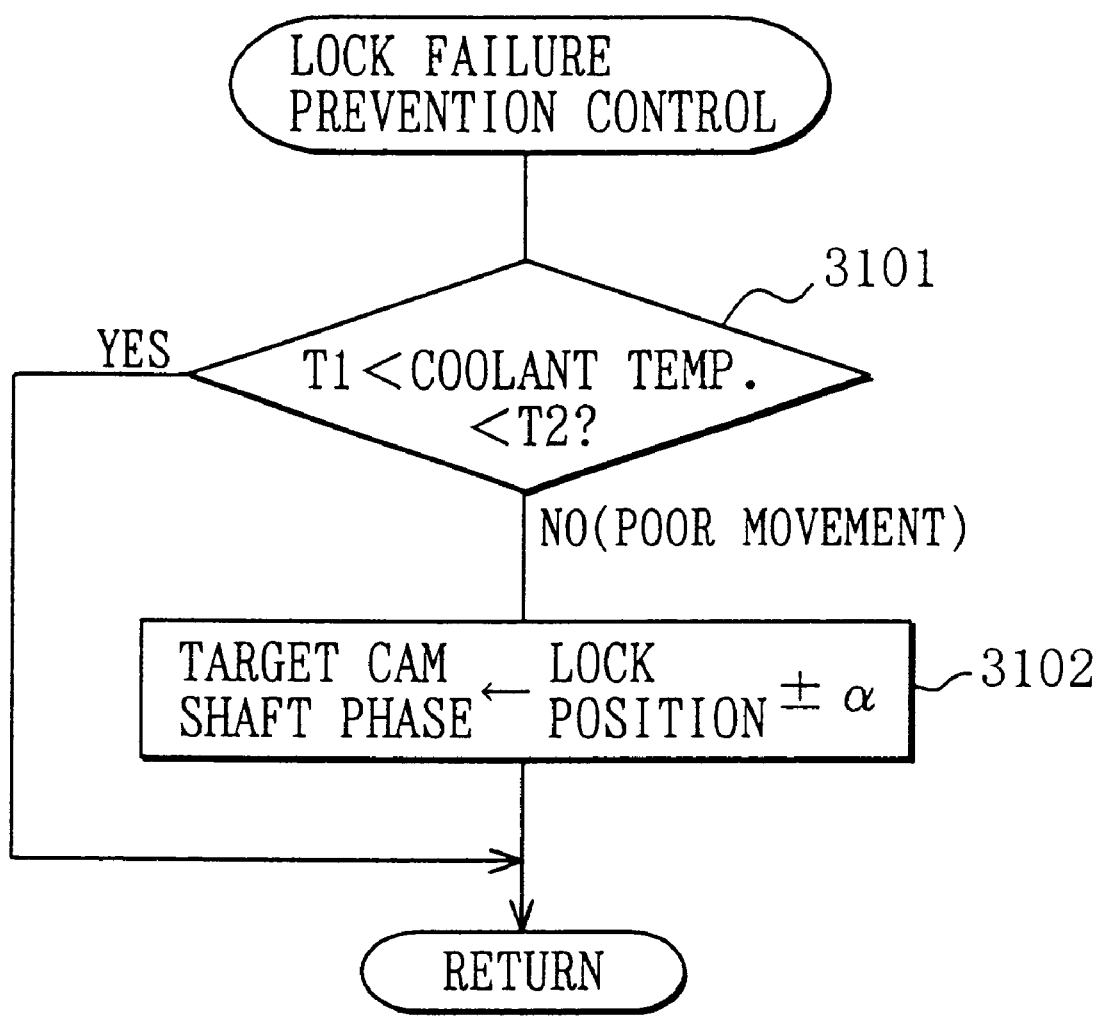
FIG. 21 is a flow chart showing a processing routine of a lock-failure prevention control program of First Embodiment of the invention.

As counter-measures against the problems, the engine control circuit 21 is enabled, by executing the lock failure preventing control program stored in the ROM (or the storage media) and shown in FIG. 21 for every predetermined times or at every predetermined crank angles, to play the role of lock failure prevention control means for preventing the lock failure in advance. When this program is started, at first Step 3101, whether or not the movement of the variable valve timing adjustor 18 is poor is judged depending on whether or not the coolant temperature or the temperature information in place of the oil temperature is within a predetermined temperature range (T1<the coolant temperature<T2). Here, the predetermined temperature range is set by the temperature range in which the variable valve timing adjustor 18 has a sufficient movement.

If the coolant temperature is within the predetermined temperature range, therefore, it is judged that the movement of the variable valve timing adjustor 18 is sufficient, and this program is ended as it is. If the coolant temperature is lower than the lower limit T1 or higher than the upper limit T2 of the predetermined temperature range, however, it is judged that the variable valve timing adjustor 18 is poor, and the routine advances to step 3102. At this Step 3102, the target camshaft phase is set in the vicinity of the lock position (that is, the lock position+the predetermined value α, or the lock position−the predetermined value α), to execute the lock failure prevention control for positioning the camshaft phase in the vicinity of the lock position. Here, the lock position to be used for setting the target camshaft phase may be either the learning value or the designed center value. When target camshaft phase is set in the vicinity of the lock position (or the lock position±α), on the other hand, the predetermined value α may be a constant value but may also change according to the coolant temperature (or the oil temperature).

Figure 22:
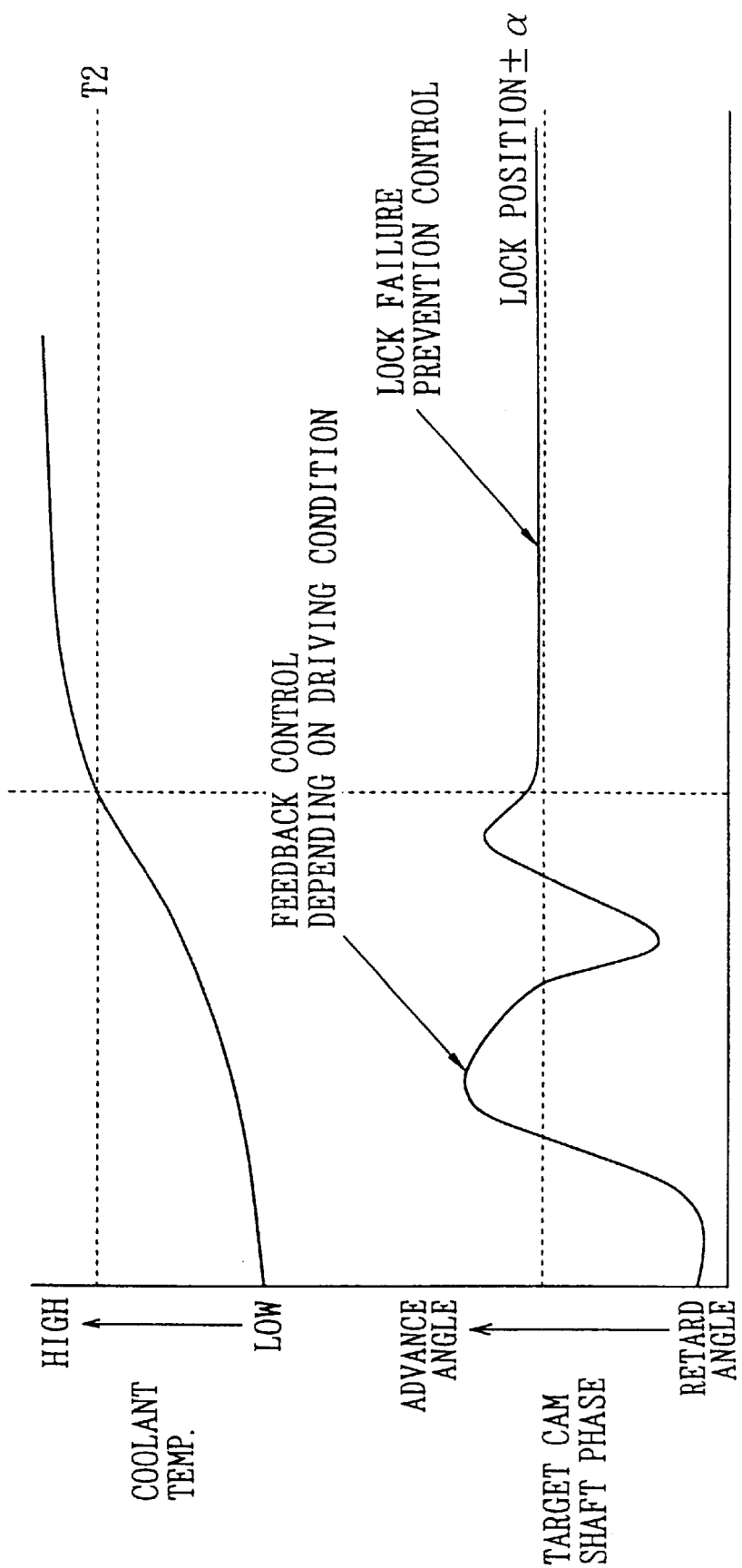
FIG. 22 is a time chart illustrating the behaviors of the lock-failure prevention control of First Embodiment.

One example of the lock failure prevention control by the lock failure preventing control program thus far described will be described with reference to the time chart of FIG. 22. In the example shown in FIG. 22, at the instant when the coolant temperature rises to exceed the upper limit T2 of the predetermined temperature range while the camshaft phase is feedback-controlled to the target camshaft phase in dependence upon the running condition, the lock failure prevention control is started to set the target camshaft phase in the vicinity of the lock position (or the lock position±α) to feedback-control the camshaft phase in the vicinity of the lock position. With this setting, in the state where the movement of the variable vale timing adjustor 18 is poor, the camshaft phase remains in the vicinity of the lock position so that the camshaft phase can be reliably adjusted to the lock position by the lock control even if the movement of the variable valve timing adjustor 18 is poor when the engine is to be stopped. As a result, the next start can be reliably made with the camshaft phase being locked, to avoid the problems of the poor startability or the noise due to the lock failure.

Here, in First Embodiment, when the movement of the variable valve timing adjustor 18 is poor, the camshaft phase is controlled to the vicinity of the lock position but may be controlled to the lock position. In this case, during the lock failure prevent control, the oil pressure in either the advance angle chambers 42 or the retard angle chambers 43 has risen, the lock pin 58 is held in the lock release position by the oil pressure even if the lock pin 58 (or the camshaft phase) is aligned to the lock hole 59 (or the lock position).

As has been described hereinbefore, the engine is started with the lock pin 58 being held in the lock position (or in the intermediate lock position), and the lock release control is made after the engine start when the discharge pressure of the oil pump 28 rises to some level. When the oil pressure in the lock hole 59 (or the oil pressure in the retard angle chambers 43) is raised by the lock release control, the lock pin 58 is unlocked by the oil pressure so that the feedback control of the valve timing (or the camshaft phase) of the intake valve can be executed.

Even after the lock release control, however, the lock pin 58 cannot be unlocked for some cause. In this case, it is conceivable to make the lock release control again. By thus repeating this control, the lock release failure could be remedied if it is temporarily caused as a result that the lock mechanism bites a foreign obstacle. The lock release failure is thought to be caused not only by the failure of the lock mechanism but also by the failure of the hydraulic control valve 29. In case of the failure of the hydraulic control valve 29, the hydraulic control valve 29 does not operate normally even if the signal of the lock release control is outputted to the hydraulic control valve 29, so that the lock cannot be released even if the lock mechanism itself is normal.

Figure 23:
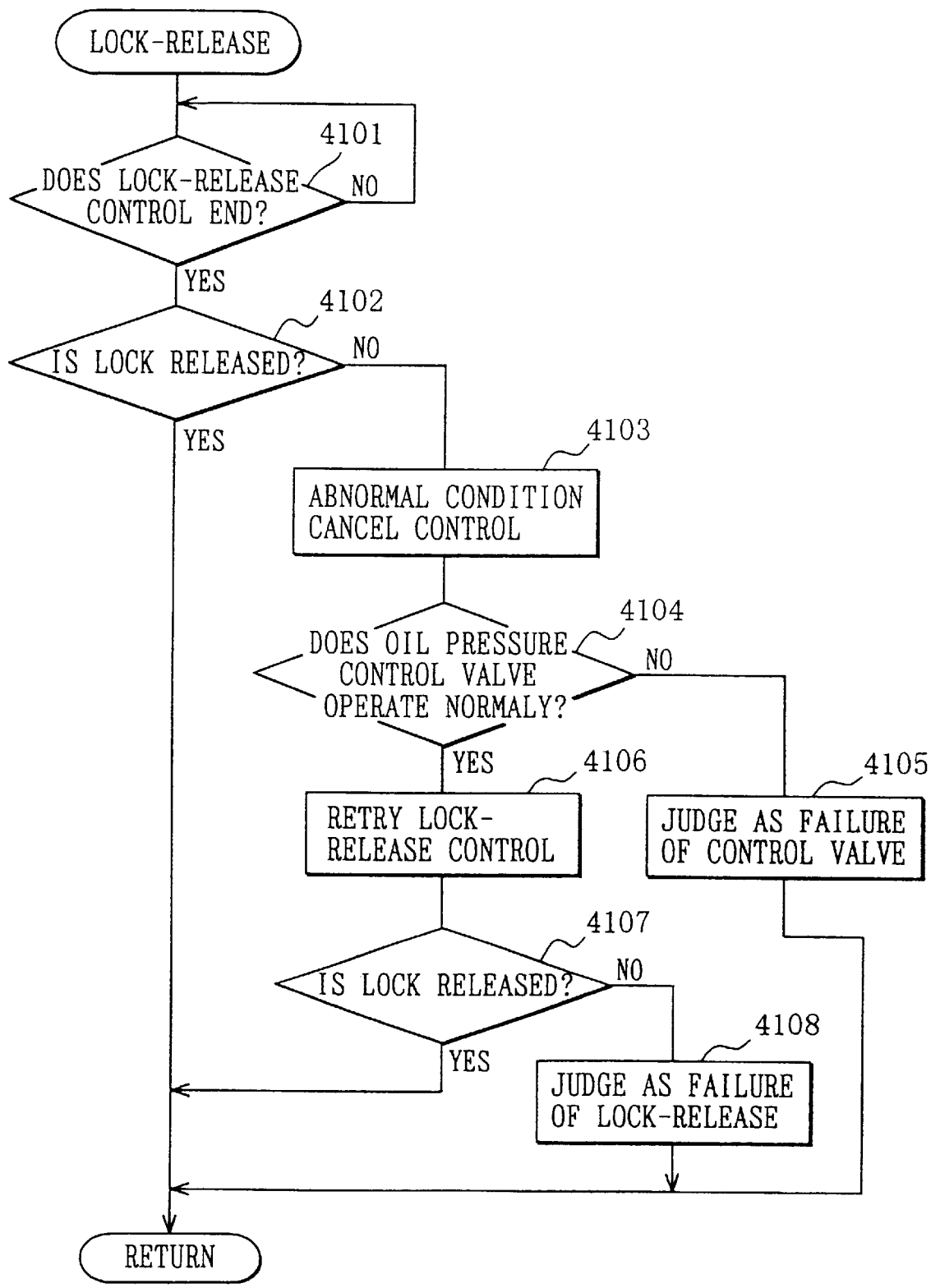
FIG. 23 is a flow chart showing a processing routine of a lock release program of First Embodiment.

In this Embodiment, therefore, the engine control circuit 21 executes the lock release program of FIG. 23, as stored in the packaged ROM (or the storage media), and drives the hydraulic control valve 29 with the drive pattern (as referred to FIG. 24) for the abnormal condition release control, when it is judged after the end of the lock release control that the lock is not released, to eliminate the cause (or the foreign substance) for the operation failure thereby to make the lock release control again. This program is started after the (not-shown) ignition switch was turned ON, and plays the role of lock release control means, as defined in the claims.

When this program is started, at first Step 4101, after the engine start, the end of the lock release control is awaited. After this, at the instant when the lock release control ends, the routine advances to Step 4102, it is judged in the following manner whether or not the lock is released (whether or not the lock pin 58 comes out of the lock hole 59). First of all, it is judged whether or not the present real advance angle position (or the real valve timing) VT is within the predetermined range (VTA<VT<VTB) in the vicinity of the intermediate lock position. Here, the predetermined range (VTA<VT<VTB) is set to the range within the predetermined value (or the value estimating the error causes such as the detection error of the real advance angle position VT, the manufacture dispersion or the aging) from the intermediate lock position. If the present real advance angle position VT is not within the predetermined range in the vicinity of the intermediate lock position, the lock release is judged because it is apparent, although the error factor such as the detector error is considered to the maximum, that the camshaft phase is apart from the intermediate lock position.

If the present real advance angle position VT is within the predetermined range in the vicinity of the intermediate lock position, on the other hand, it is judged from the dispersion degree of the advance angles of the cam angle signals whether or not the lock is released. In short, when the lock is released, the camshaft phase hunts finely even if it is hydraulically controlled to the vicinity of the intermediate lock position, so that the dispersion degree of the advance angles of the cam angle signals increases. By utilizing these characteristics, whether or not the lock is released is judged depending on the dispersion degree of the advance angles of the cam angle signals. Here, the operation of this Step 4102 plays the role of lock release judging means.

Figure 24:
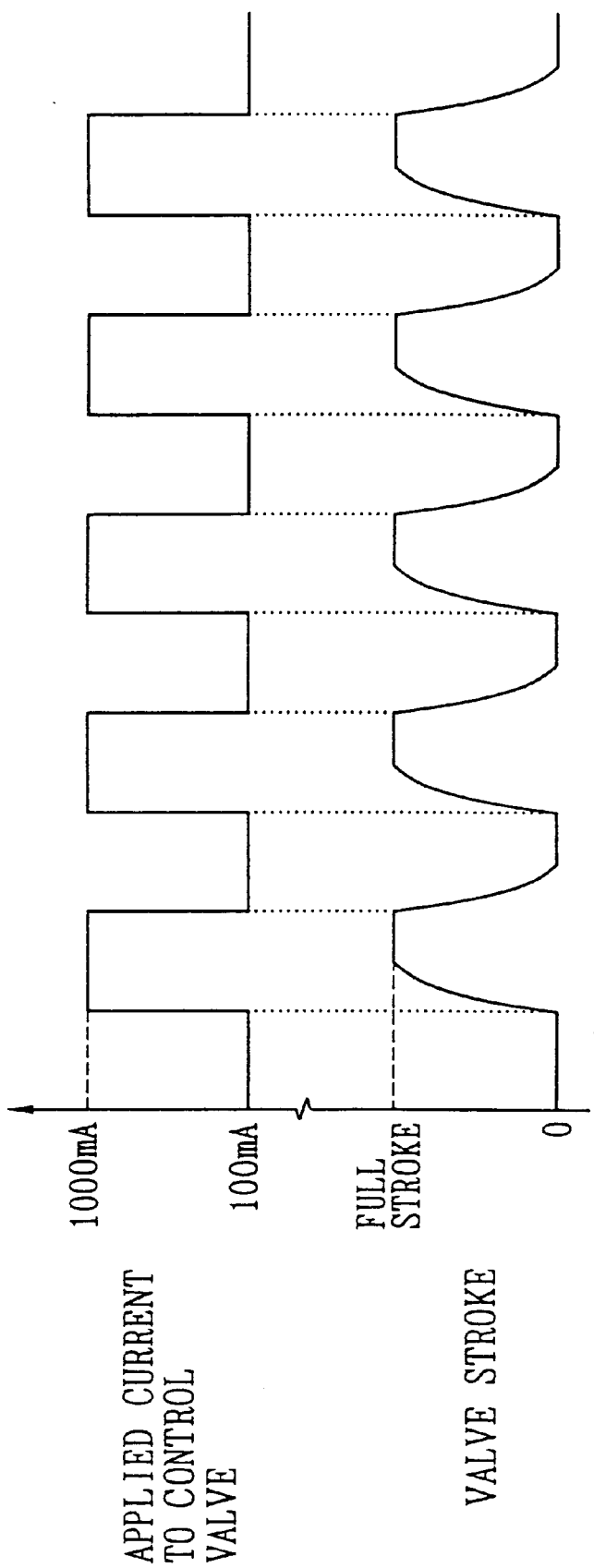
FIG. 24 is a time chart illustrating a drive pattern of an abnormal condition cancel control.

If the lock release is judged at that Step 4102, this program is ended. If the lock is not released, the routine advances to Step 4103, at which the abnormal condition cancel control of the hydraulic control valve 29 is executed. In this abnormal condition cancel control, as shown in FIG. 24, the applied current to the hydraulic control valve 29 is switched alternately for a constant period between 100 mA and 1,000 mA, for example, to repeat the operations, in which the valve stroke of the hydraulic control valve 29 is reciprocated between 0 and the full stroke, for a predetermined time period. Thus, in the case of the temporary failure of the hydraulic control valve 29 due to the bite of the foreign substance, the operations to reciprocate the valve member of the hydraulic control valve 29 by the abnormal condition cancel control are repeated to eliminate the cause (or the foreign substance) for the failure thereby to restore the normal operation of the hydraulic control valve 29.

During the abnormal condition cancel control, it is judged (at Step 4104) on the basis of the output signal of the valve stroke sensor for detecting the stroke of the valve member of the hydraulic control valve 29 whether or not the hydraulic control valve 29 operates normally. If the hydraulic control valve 29 does not operate normally till the end of the abnormal condition cancel control, the operation failure of the hydraulic control valve 29 is judged (at Step 4105). In the case of the failure of the hydraulic control valve 29, this program is ended because the repeated lock release control is useless. Here, if the failure of the hydraulic control valve 29 is judged, its information is stored in the nonvolatile memory (such as the backup RAM), and the driver is informed of the abnormal condition by lighting a warning lamp or the like. Moreover, the fuel injection rate or the ignition timing is controlled so that the engine 11 can be run with the variable valve timing adjustor 18 being locked.

If the hydraulic control valve 29 operates normally till the end of the abnormal condition cancel control, on the other hand, the routine advances to Step 4106, at which the lock release control is re-tried. If the lock mechanism is normal at this time, the lock can be released by the repeated lock release control. After this, the routine advances to Step 4107, at which it is judged by a method similar to that of Step 4102 whether or not the lock is released. If the lock is released, this program is ended as it is. If the lock is not released, the routine advances to Step 4108, at which the lock release failure (or the fixed lock) of the lock pin 508 is judged. In short, since it has been confirmed at Step 4104 that the hydraulic control valve 29 operates normally, the lock release failure (or the fixed lock) of the lock pin 58 can be judged if the lock is not released, even if the repeated lock release control is made. Here, if the lock release failure of the lock pin 58 is judged, its information is stored in the nonvolatile memory (such as the backup RAM), and the driver is informed of the abnormal condition by lighting a warning lamp or the like. Moreover, the fuel injection rate or the ignition timing is controlled so that the engine 11 can be run with the variable valve timing adjustor 18 being locked.

Figure 25:
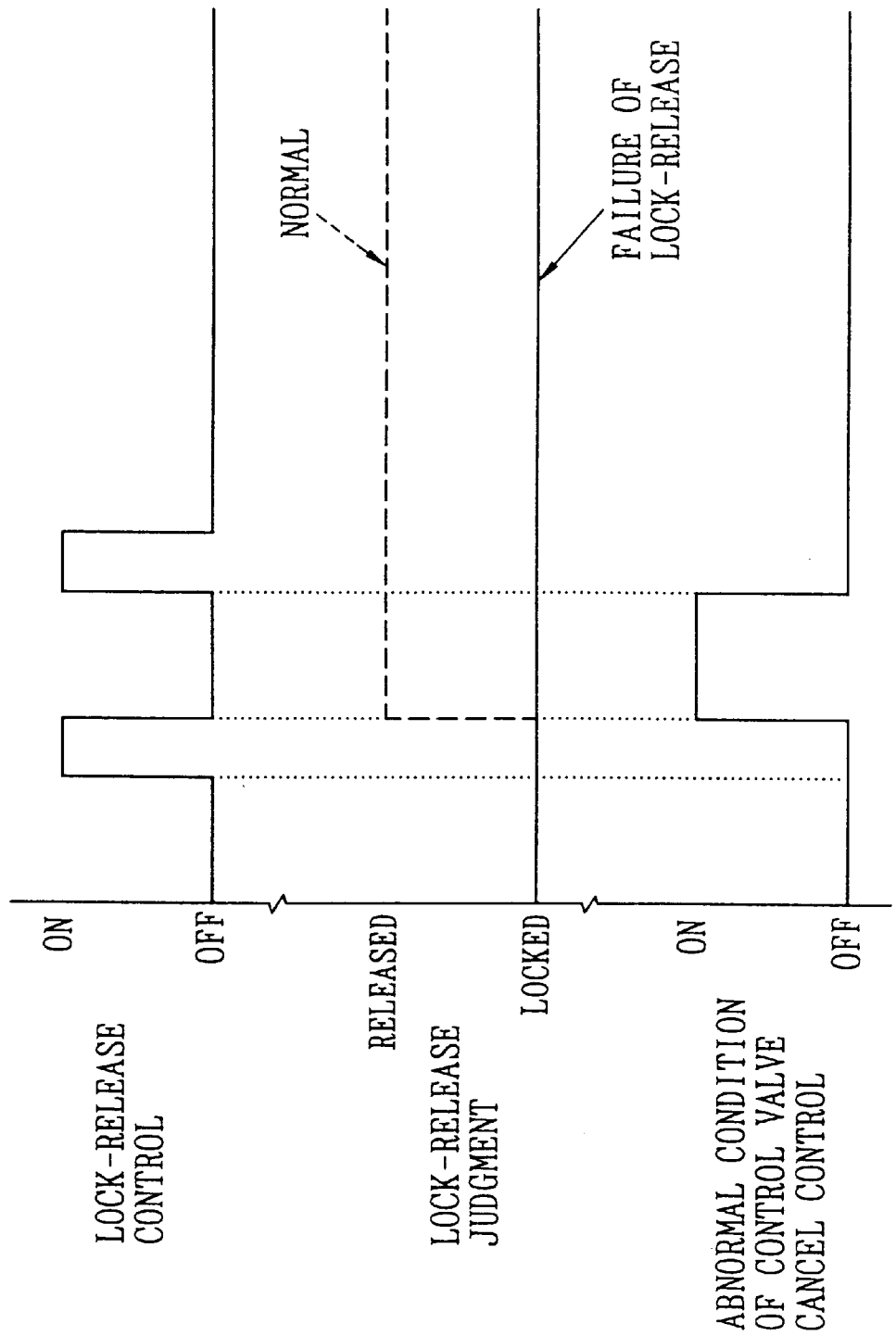
FIG. 25 is a time chart illustrating one example of the lock release control of First Embodiment.

An example of the execution of the lock release program of FIG. 23 thus far described will be described with reference to the time chart of FIG. 25. FIG. 25 illustrates a control example of the case in which the lock release failure (or the fixed lock) of the lock pin 58 occurs. In this case, the lock cannot be released even if the lock release control is tried, so that the lock release control is made again after the abnormal condition release control of the hydraulic control valve 29 was made. If the lock is not released even by repeating the lock release control, the lock release failure (or the fixed lock) of the lock pin 58 is judged.

In this First Embodiment thus far described, the hydraulic control valve 29 is driven in the drive pattern of the abnormal condition cancel control before the repeated lock release control. If the operation failure is temporary due to the biting of the foreign substance by the hydraulic control valve 29, therefore, the repeated lock release control can be made after the hydraulic control valve 29 is returned to the normal operation by the abnormal condition cancel control. If the lock mechanism is normal, therefore, the lock can be released by the repeated lock release control so that the percentage of the lock release failure can be reduced more than the related art to improve the reliability of the variable valve timing control.

In this First Embodiment, moreover, during the abnormal condition cancel control, the stroke of the valve member of the hydraulic control valve 29 is detected by the valve stroke sensor 25 to judge whether or not the hydraulic control valve 29 operates normally. The cause for the lock release failure can be specified on whether it is due to the operation failure (or the fixed lock) of the lock mechanism or the operation failure of the hydraulic control valve 29. By storing the information in the nonvolatile memory (such as the backup RAM), the trouble can be easily diagnosed when it is remedied.

Here in this First Embodiment, whether or not the operation of the hydraulic control valve 29 fails is judged before the repeated lock release control. If the lock release failure is judged after the end of the repeated lock release control, however, whether or not the operation of the hydraulic control valve 29 fails may be judged by making the abnormal condition cancel control of the hydraulic control valve 29 while the power source main relay is ON (that is, while the power source is ON) after the engine stop.

Here, the sensor for detecting the operation state of the valve member of the hydraulic control valve 29 should not be limited to the single valve stroke sensor but may be exemplified such that two sensors for detecting the valve member of the hydraulic control valve 29 individually are disposed at the positions of the zero valve stroke and the full valve stroke thereby to detect the operating states of the valve member of the hydraulic control valve 29 by the two sensors.

On the other hand, the invention may be modified in construction by omitting the valve stroke sensor 25 to detect no operation failure of the hydraulic control valve 29. In this modification, too, it is possible to achieve the desired object of the invention fully.

In this First Embodiment, on the other hand, the hydraulic control valve 29 is driven in the full stroke during the abnormal condition cancel control but may be driven in a smaller stroke than the full stroke. In this First Embodiment, on the other hand, the hydraulic control valve 29 is driven in the full stroke during the abnormal condition cancel control, but the drive stroke of the hydraulic control valve 29 may be gradually changed such that it is gradually enlarged during the abnormal condition cancel control.

Here, when the operation failure of the hydraulic control valve 29 is judged after the end of the abnormal condition cancel control, this abnormal condition cancel control may be repeated again. If it is judged that the operation of the hydraulic control valve 29 is normal, on the other hand, the lock release control may be further repeated by one or two times if the lock cannot be released by the repeated lock release control.

[Second Embodiment]

As the dispersion degree RAN of the advance angles of the cam angle signals caused by the fine hunting of the camshaft 16 just after the lock release of the lockpin 58 grows the larger, its difference before and after the lock release appears the larger so that the detection of the lock release can be facilitated while improving the detection accuracy.

Normally, the cam angle signal for cylinder discriminations is outputted in terms of a cam angle, at which the rotation of the camshaft 16 is relatively stabilized, so that the cylinder discriminations may be stabilized. Therefore, the dispersion of the advance angles of the cam angle signals is relatively narrow. This makes it probable that the dispersion degree RAN of the advance angles of the cam angles signal before and after the lock release of the lock pin 58 does not appear so large.

Figure 26:
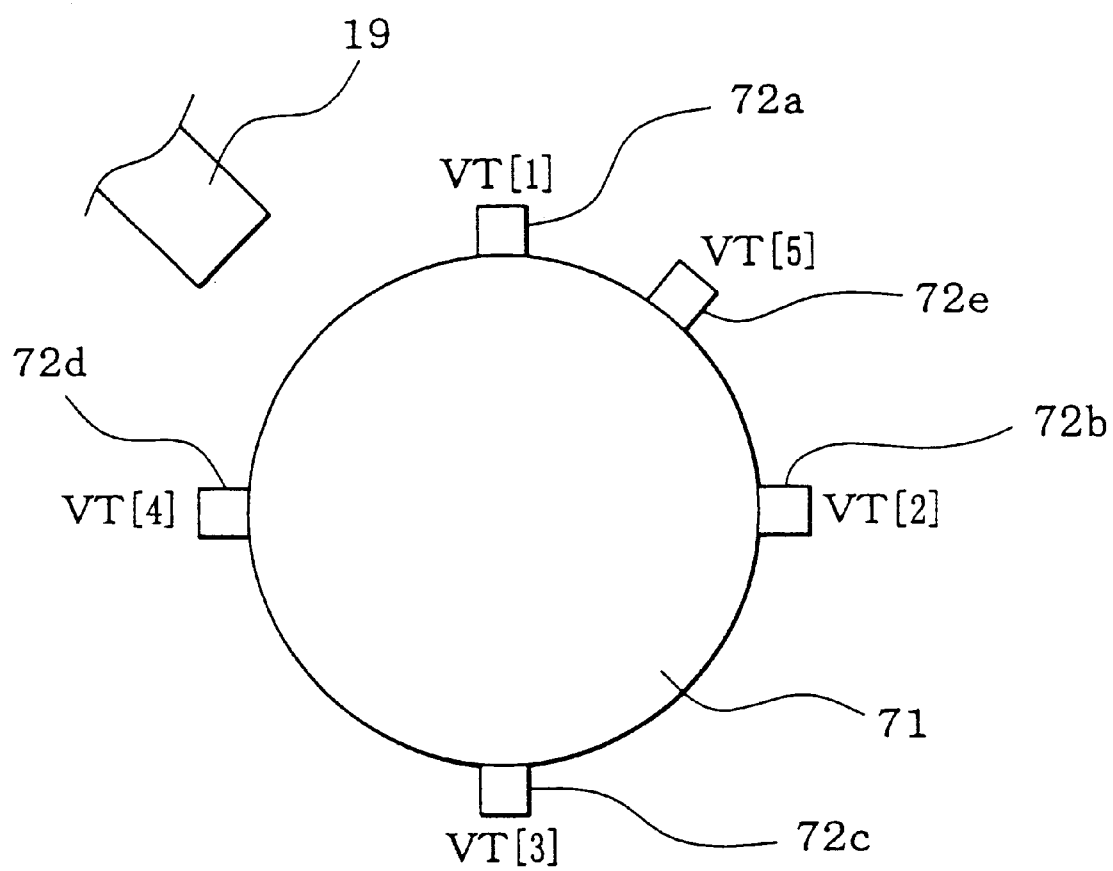
FIG. 26 is a diagram for explaining the structure of a cam angle sensor of Second Embodiment.
Figure 27:
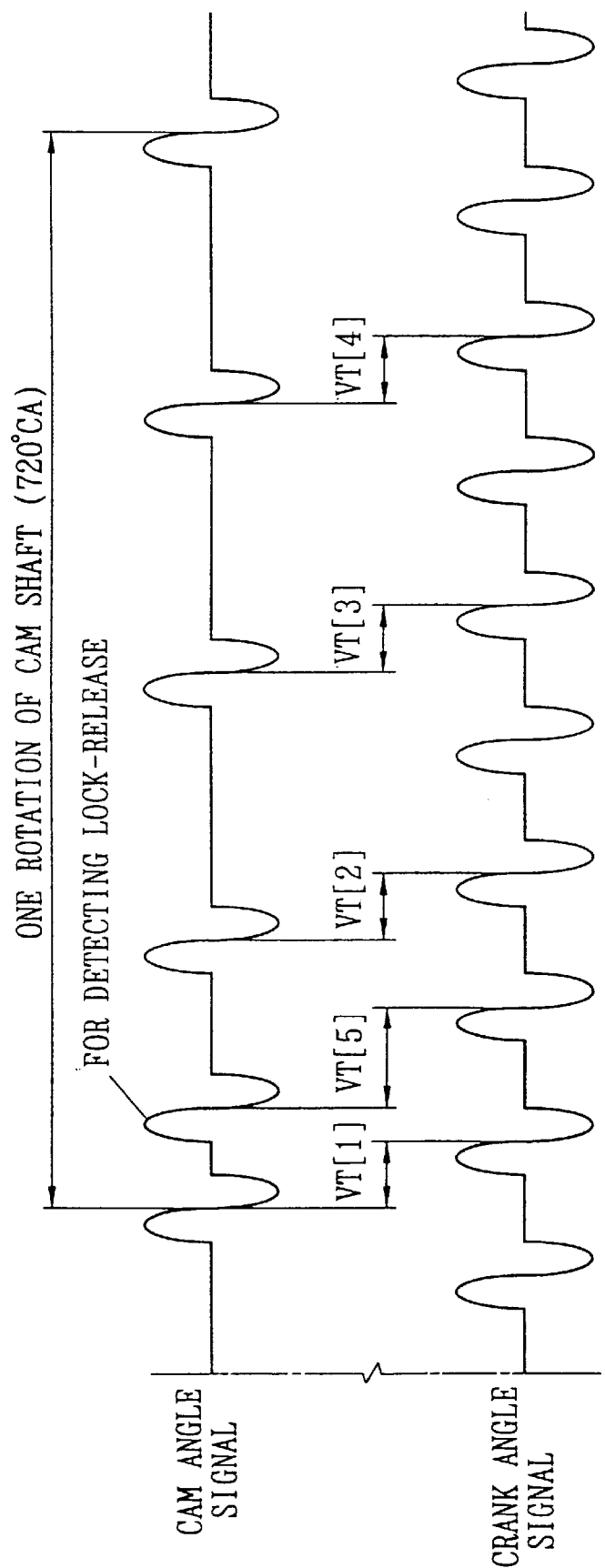
FIG. 27 is a time chart for explaining the relation between a cam angle signal and a crank angle signal of Second Embodiment.

In Second Embodiment of the invention, therefore, on the outer circumference of the signal rotor 71 of the intake side camshaft 16, a lock release detecting projection 72e is formed at a position different from those of the cylinder discriminating four projections 72a to 72d, as shown in FIG. 26. The projection 72e is constructed, as shown in FIG. 27, to output a lock release detecting cam angle signal VT[5] at a cam angle (i.e., at a cam angle for easily detecting the fine hunting of the intake side camshaft 16 just after the lock release) different from those of the cam angle signals VT[1] to VT[4] for the cylinder discriminations. In this case, the lock release is detected by the lock release detection program of FIG. 18. At this time, however, at Step 2103, the dispersion degrees of the advance angles of a plurality of cam angle signals are calculated by the following method.

First of all, with reference to the advance angle VT[5] of the lock release detecting cam angle signal, the deviations RAN[1], RAN[2], RAN[3] and RAN[4] from the advance angles VT[1] to VT[4] of the remaining four cam angle signals are calculated by the following Formulas:

$$RAN[1]=VT[1]-VT[5];$$

$$RAN[2]=VT[2]-VT[5];$$

$$RAN[3]=VT[3]-VT[5];$$

and $$RAN[4]=VT[4]-VT[5].$$

Moreover, these four deviations RAN[1] to RAN[4] are accumulated to determine the dispersion degree RAN of the cam angle signal. Here, for the advance angle deviation VT[k] of the cam angle signals, the mutual deviations RAN[k] of the advance angles VT[1] to VT[5] of the five cam angle signals may be calculated by using the first calculation method, as having been described in First Embodiment, or the deviation RAN[k] between the present values and the previous values of the individual advance angles VT[1] to VT[5] of the five cam angle signals may be calculated by using the second calculation method. The operations of the remaining steps are identical to those of First Embodiment.

If the invention is constructed, as in this Second Embodiment, such that the lock release detecting cam angle signal VT[5] is outputted at the cam angle (i.e., the cam angle for allowing the easy detection of the fine hunting of the intake side camshaft 16 just after the lock release) different from those of the cylinder discriminating cam angle signals VT[1] to VT[4], the difference in the dispersion degree RAN of the advance angles of the cam angle signals before and after the lock release so that the lock release can be easily detected while improving the detection accuracy.

Here, another construction may be made such that the lock release detecting cam angle signal is outputted at two or more portions. On the other hand, it is needless to say that the cylinder discriminating cam angle signals are not limited to the four.

[Third Embodiment]

In First Embodiment, the center value (or the intermediate lock position) of the predetermined range (VTA<VT<VTB)

to be used in Step 2101 of the lock release detection program of FIG. 18 is set at the center value (or the designed center value) of the manufacture dispersion. In Third Embodiment of the invention, as shown in FIG. 28, the intermediate lock position is learned during the lock of the lock pin 58, and the learned value of the intermediate lock position is used to set the predetermined range (VTA<VT<VTB) to be used at Step 2101.

Figure 28:
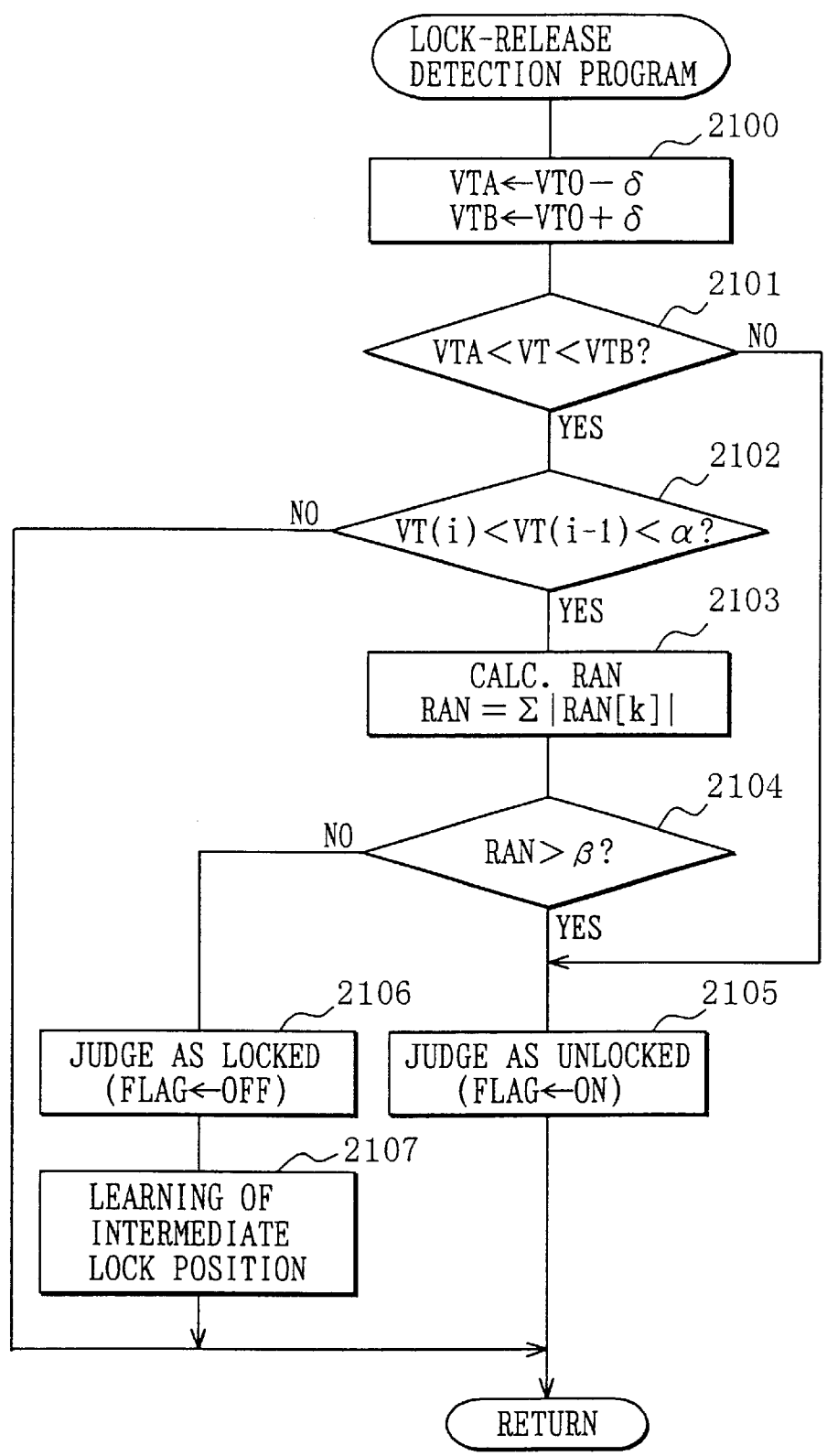
FIG. 28 is a flow chart showing a processing routine of a lock release detection program of Third Embodiment.

The lock release detection program of FIG. 28 to be executed in Third Embodiment is made by adding the operations of step 2100 and Step 2107 to the program of FIG. 18, and the operations of the remaining Steps are identical to those of the program of FIG. 18.

In the In the lock release detection program of FIG. 28, when it is judged at Step 2106 that the lock pin 58 is locked, the routine advances to Step 2107, at which the real advance angle position (or the real valve timing) VTO is learned as the intermediate lock position and stored in the nonvolatile memory such as the backup RAM. The operation of this Step 2107 plays the role corresponding to the learning means.

When this program is started at the next round, the learned value VTO of the intermediate lock position is read out from the memory, and the boundary values VTA and VTB of the predetermined range are determined by adding and subtracting a predetermined value δ to and from the learned value VTO:

$$VTA = VTO - \delta;$$

and $$VTB = VTO + \delta.$$

Here, the predetermined value δ is set to a value estimating the error factors such as the detection error of the real advance angle position VT, the manufacture dispersion and the aging to the maximum.

Thus, using the predetermined range (VTA<VT<VTB) calculated on the basis of the learned value VTO of the intermediate lock position, it is judged at next Step 2101 whether or not the present real advance angle position VT is with the predetermined range. If not within the predetermined range, it is apparent that the camshaft phase is apart from the intermediate lock position, even if the error factors such as the detection error is considered to the maximum. Therefore, the routine advances to Step 2105, at which the lock release of the lock pin 58 is judged.

In Third Embodiment thus far described, the intermediate lock position is learned so that the lock release can be highly accurately detected without being influenced by the manufacture dispersion or the aging.

[Fourth Embodiment]

Figure 29:
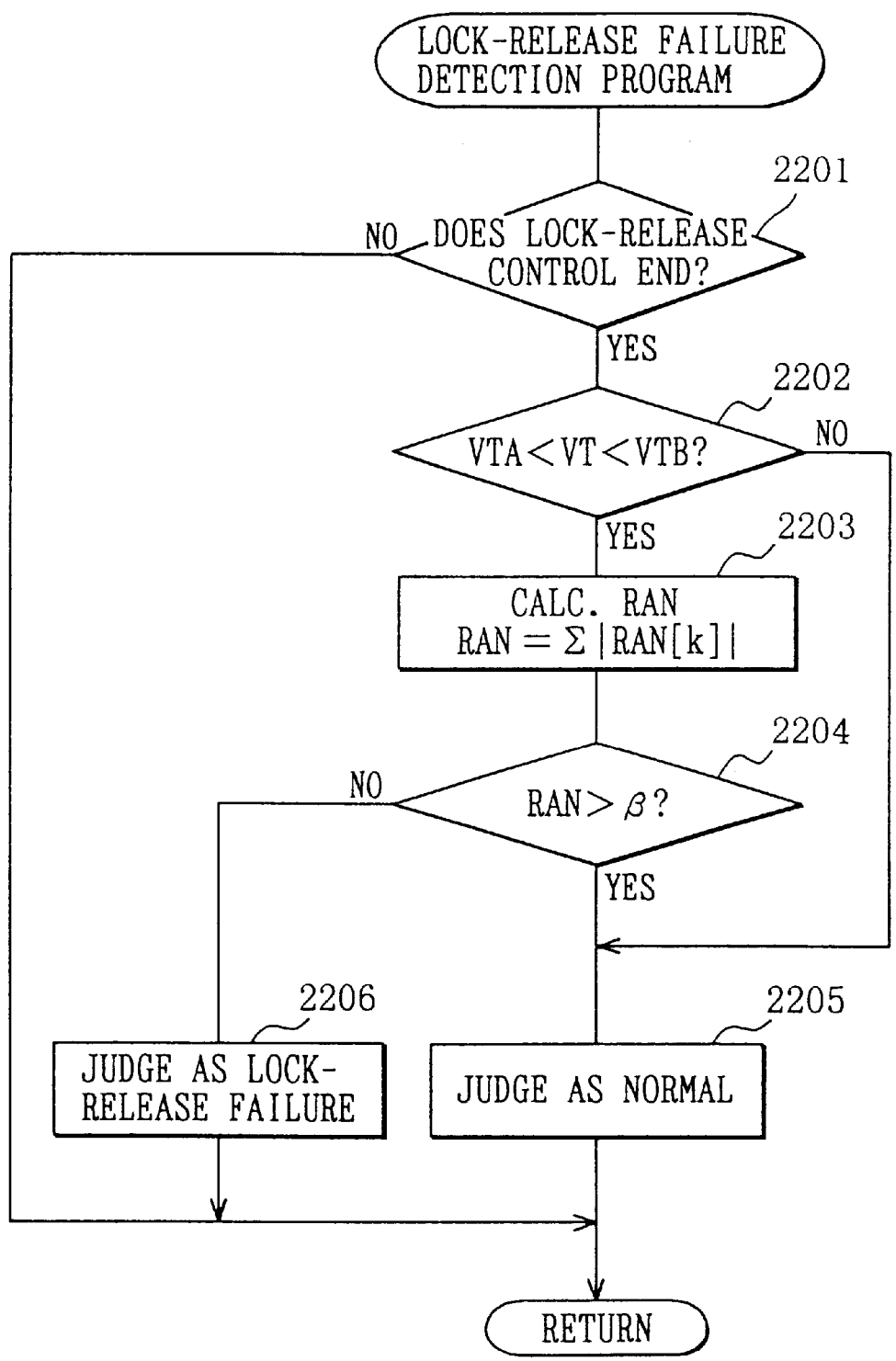
FIG. 29 is a flow chart showing a processing routine of a lock release failure detection program of Fourth Embodiment.
Figure 30:
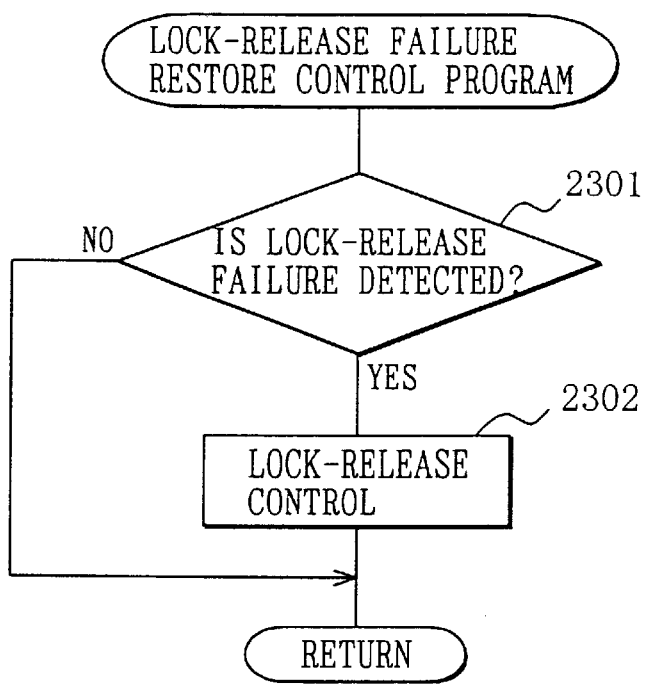
FIG. 30 is a flow chart showing a processing routine of a lock release failure restore control program of Fourth Embodiment.

Fourth Embodiment of the invention, as shown in FIGS. 29 and 30, is provided with a function to detect the lock release failure and a function to execute the lock release control at the lock release failure detecting time.

The lock release failure detection program of FIG. 29 is periodically repeated to play the role of failure detection means, as defined in claims. When this program is started, at first Step 2201, it is judged whether or not the lock release control is ended. If the lock release control is not ended, it is thought that the lock point 58 is in the locked state, so that this program is ended without any subsequent lock release failure detecting routine.

After this, when the lock release control is ended, the routine advances to Step 2202, at which it is judged whether or not the present real advance angle position VT is within the predetermined range (VTA<VT<VTB) in the vicinity of the intermediate lock position. The method for setting this predetermined range may be identical to that of First or Third Embodiment. If the present real advance angle position VT is not within the predetermined range in the vicinity of the intermediate lock position, it is judged (at Step 2205) that the lock is normally released.

If the present real advance angle position VT is within the predetermined range in the vicinity of the intermediate lock position, on the other hand, the routine advances to Step 2203, at which the dispersion degree RAN of the advance angles of the cam angle signals is calculated by the same method as that of First or Second Embodiment. After this, the routine advances to Step 2204, at which the dispersion degree RAN of the advance angles of the cam angle signals is compared with the predetermined value β. If the dispersion degree RAN is less than the predetermined value β, it is thought that the camshaft phase is fixed at the intermediate lock position and does not move in the least. Therefore, the routine advances to Step 2206, at which the lock release failure is judged. If the dispersion degree RAN of the advance angles of the cam angle signals is larger than the predetermined value β, on the other hand, it is though that the camshaft phase finely hunts in the vicinity of the intermediate lock position so that the routine advances to Step 2205, at which it is judged that the lock is normally released.

The lock release failure restore control program of FIG. 30 is periodically repeated to play the role of lock release failure restore control means, as defined in claims. When this program is started, at first Step 2301, it is judged by the lock release failure detection program of FIG. 29 whether or not the lock release failure is detected. If the lock release failure is not detected, this program is ended as it is. If the lock release failure is detected, on the other hand, the routine advances to Step 2302, at which the lock release control is made to unlock the lock pin 58.

In Fourth Embodiment thus far described, the lock release failure is detected by the lock release failure detection program of FIG. 29 on the basis of the dispersion degree RAN of the advance angles of the cam angle signals. With no new sensor being added, therefore, the lock release failure can be detected to satisfy the demand for the lower cost. Since the lock release control is made when the lock release failure is detected, moreover, the lock release failure can be quickly returned to the normal lock release state so that the feedback control of the valve timing can be early started.

[Fifth Embodiment]

Figure 31:
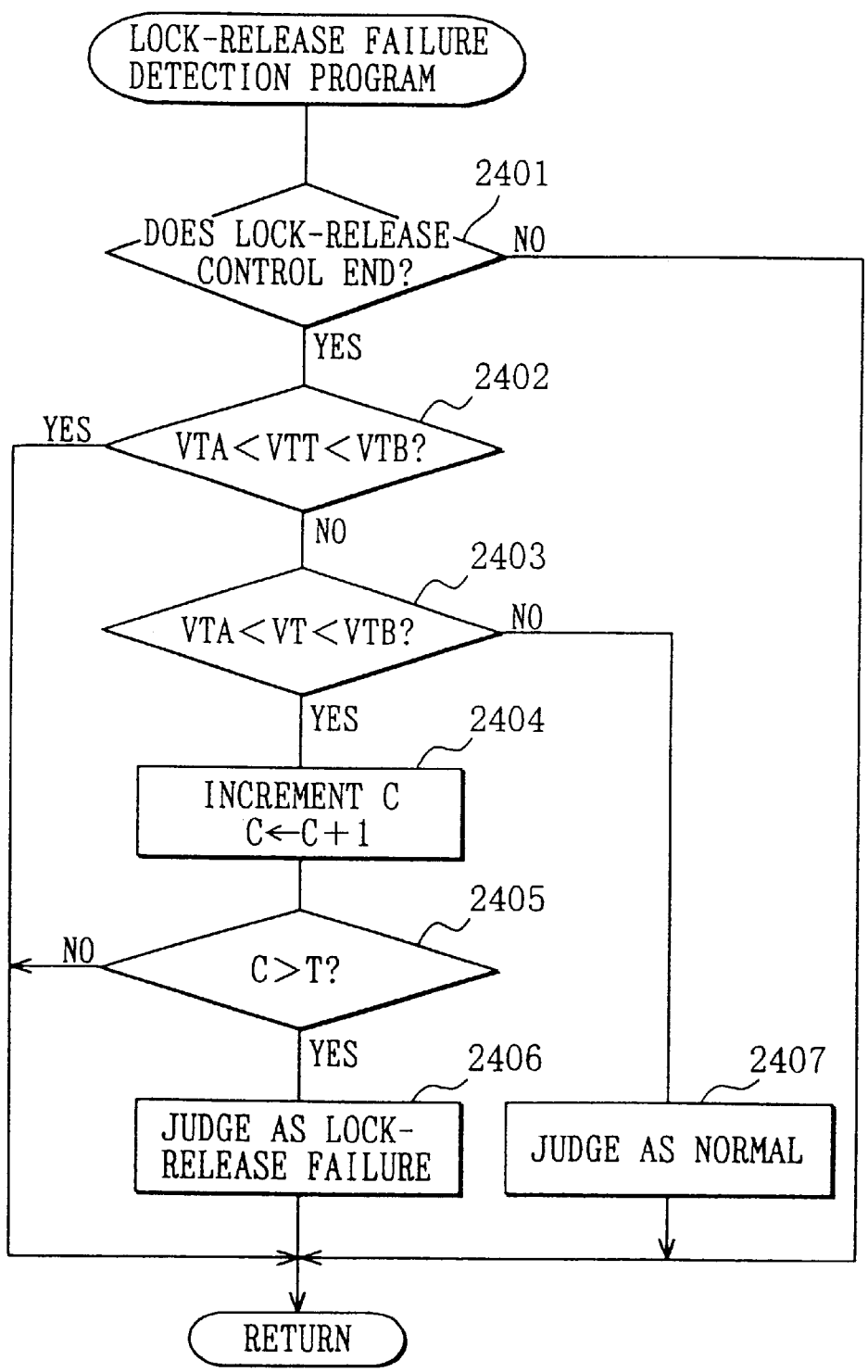
FIG. 31 is a flow chart showing a processing routine of a lock release failure detection program of Fifth Embodiment.

In Fifth Embodiment, the lock release failure is detected by the lock release failure detection program of FIG. 31 in the following manners. At first Step 2401, it is judged whether or not the lock release control is ended. If the lock release control is not ended, it is thought that the lock pin 58 is still in the lock state, so that this program is ended without any subsequent operations for the lock release failure detection.

After this, at the instant when the lock release control is ended, the routine advances to Step 2402, at which it is judged whether or not the present target advance angle position VTT is within the predetermined range (VTA<VT<VTB) in the vicinity of the intermediate lock position. intermediate lock position. The method for setting this predetermined range may be identical to that of First or Third Embodiment. If the present target advance angle position VTT is within the predetermined range in the vicinity of the intermediate lock position, this program is ended without any subsequent operations for the lock release failure detection.

If the present target advance angle position VTT is not within the predetermined range in the vicinity of the intermediate lock position, on the other hand, the routine advances to Step 2403, at which it is judged whether or not the present real advance angle position VT is within the predetermined range (VTA<VT<VTB) in the vicinity of the intermediate lock position. This predetermined range may be identical to that used at Step 2402. If the present real advance angle position VT is not within the predetermined range in the vicinity of the intermediate lock position, it is judged (at Step 2407) that the lock is normally released.

If the present real advance angle position VT is within the predetermined range in the vicinity of the intermediate lock position, the routine advances to Step 2404, at which a time counter C is incremented to count the time period C for which the state for the real advance angle position VT to be within the predetermined range in the vicinity of the intermediate lock position continues although the target advance angle position VTT is not within the predetermined range in the vicinity of the intermediate lock position. At next Step 2405, it is judged whether or not the time C exceeds a predetermined time T. Here, this predetermined time T is set necessary and sufficient for controlling the real advance angle position VT to the vicinity of the target advance angle position VTT. If the answer of Step 2405 is "Yes", that is, if the real advance angle position VT cannot be controlled to the vicinity of the target advance angle position VTT even after the predetermined time T, it is though that the camshaft phase is fixed at the intermediate lock position so that it does not move in the least. Therefore, the routine advances to Step 2406, at which the lock release failure is judged.

According to the lock release failure detection method of Fifth Embodiment thus far described, too, the lock release failure can be detected without adding any new sensor as in Fourth Embodiment, to satisfy the demand for the lower cost.

[Sixth Embodiment]

Figure 32:
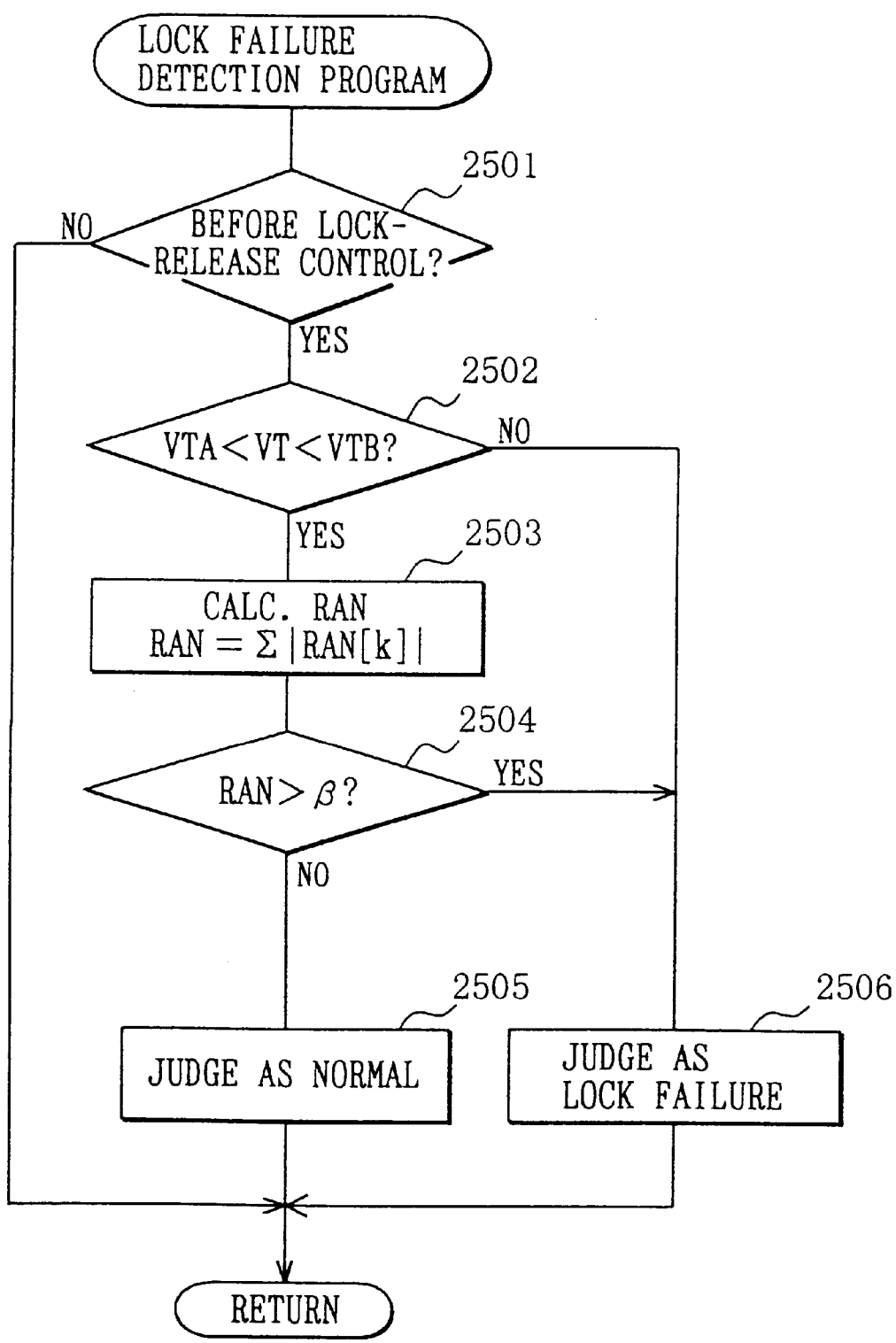
FIG. 32 is a flow chart showing a processing routine of a lock failure detection program of Sixth Embodiment.

In Sixth Embodiment of the invention, the lock failure is detected by the lock failure detection program of FIG. 32 in the following manners. At first step 2501, it is judged whether or not before the lock release control. If the lock release control is already made, this program is ended without any operations for the lock failure detection.

Before the lock release control, on the other hand, the routine advances to Step 2502, at which it is judged whether or not the present real advance angle position VT is within the predetermined range (VTA<VT<VTB) in the vicinity of the intermediate lock position. This method for setting the predetermined range may be identical to that of First or Third Embodiment. If the present real advance angle position VT is not within the predetermined range in the vicinity of the intermediate lock position, it can be judged that the camshaft phase is apart from the intermediate lock position, the routine advances to Step 2506, at which the lock failure is judged.

If the present real advance angle position VT is within the predetermined range in the vicinity of the intermediate lock position, the routine advances to Step 2503, at which the dispersion degree RAN of the advance angles of the cam angle signals is calculated by the same method as that of the First or Second Embodiment. After this, the routine advances to Step 2504, at which the dispersion degree RAN of the advance angles of the cam angle signals is compared with the predetermined value β. If the dispersion degree RAN is below the predetermined value β, it is thought that the camshaft phase is fixed at the intermediate lock position and does not move in the least. Therefore, the routine advances to Step 2505, at which the normal lock state is judged. If the dispersion degree RAN of the advance angles of the cam angle signals is over the predetermined value β, on the other hand, it is thought that the camshaft phase is finely hunting in the vicinity of the intermediate lock position. Therefore, the routine advances to Step 2506, at which the lock failure is judged.

According to Sixth Embodiment thus far described, the lock failure can be detected without adding any new sensor while satisfying the demand for the lower cost.

In the foregoing First to Sixth Embodiments, on the other hand, the invention is applied to the variable valve timing control system of the intake valve but may also be applied to a variable valve timing control system for the exhaust valve. In addition, the invention can be suitably modified in the structure of the valve timing adjustor. In short, the valve timing adjustor may be of the type in which the camshaft phase is locked in the intermediate lock phase.

[Seventh Embodiment]

Figure 33:
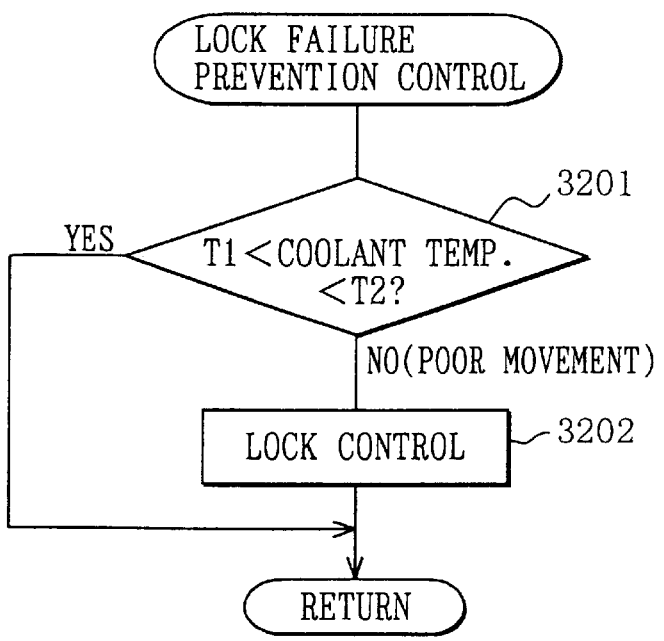
FIG. 33 is a flow chart showing a processing routine of a lock failure prevention program of Seventh Embodiment of the invention.

In Seventh Embodiment of the invention, a lock failure prevention control program shown in FIG. 33 is repeated for a predetermined period. If a poor movement of the variable valve timing adjustor 18 is judged (that is, if the coolant temperature is outside a predetermined temperature range), the routine advances from Step 3201 to Step 3202, at which the lock control is made. In this lock control, the camshaft phase (or the lock pin 58) is adjusted to the lock position (or the lock hole 59) to lower the oil pressures in the advance angle chambers 42 and the retard angle chambers 43, so that the lock pin 58 is inserted into the lock hole 59 by the spring force of the spring 62 to lock the camshaft phase in the lock position.

Thus, when the variable valve timing adjustor 18 has the poor movement, the camshaft phase is locked at the lock position (or the drive is continued after the start in the lock state without being unlocked), so that the camshaft phase can be stopped reliably in the locked state when the engine stops even if the variable valve timing adjustor 18 has the poor movement. As a result, at the next start, the engine can be started reliably with the camshaft phase being locked, thereby to avoid the problems of the poor startability or the noise due to the lock failure.

In First and Seventh Embodiments thus far described, the coolant temperature is used as the data for judging whether or not the variable valve timing adjustor has the poor movement. However, the coolant temperature may be replaced by the engine temperature or the temperature information correlating to the oil temperature. Of course, this oil temperature may be detected by an oil temperature sensor to judge whether or not the movement of the variable valve timing adjustor 18 is poor. If the temperature information such as the coolant temperature correlating to the oil temperature is used as in First and Seventh Embodiment, the output of the coolant temperature sensor, as generally provided for controlling the engine, can e utilized as the information in place of the oil temperature, so that no new oil temperature sensor need be provided while satisfying the demand for reducing the number of parts and for lowering the cost.

Here in First and Seventh Embodiments, in both the cases where the coolant temperature (or the oil temperature) is lower than a predetermined temperature T1 and higher than a predetermined temperature T2, it is judged that the movement of the variable valve timing adjustor 18 is poor. It is sufficient that the poor movement of the variable valve timing adjustor 18 is judged only when lower than the predetermined temperature T1 (that is, when the oil has a high viscosity).

[Eighth Embodiment]

Figure 34:
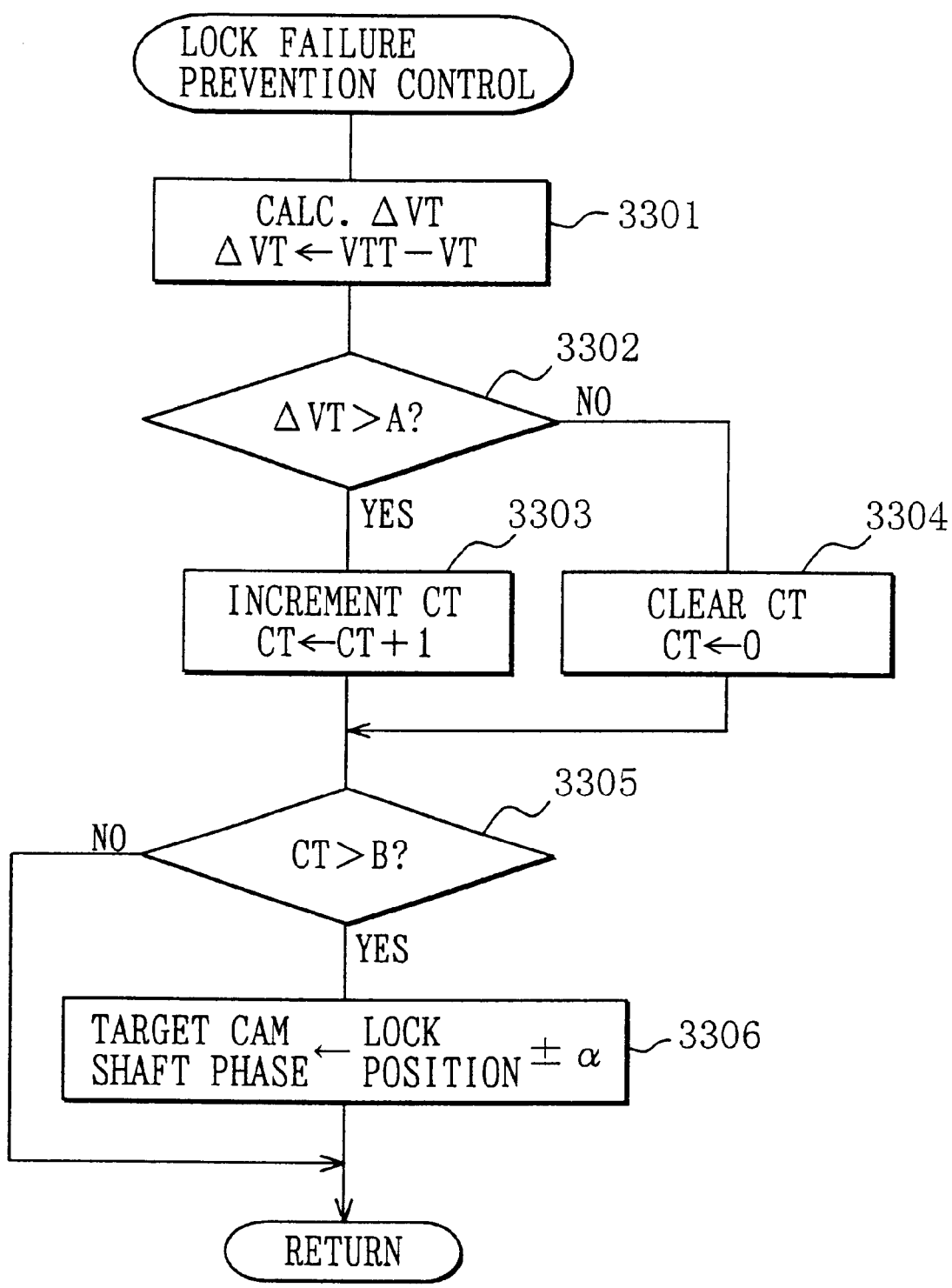
FIG. 34 is a flow chart showing a processing routine of a lock failure prevention program of Eighth Embodiment of the invention.

In Eighth Embodiment of the invention, a lock failure prevention control program shown in FIG. 34 is repeated for a predetermined period to judge (at Steps 3301 to 3305) whether or not the movement of the variable valve timing adjustor 18 is poor, depending on the deviation ΔVT between the target camshaft phase VTT and the real camshaft phase VT. At first Step 3301, specifically, the deviation (or the displacement of the camshaft phase) ΔVT between the target camshaft phase VTT and the real camshaft phase VT is calculated by the following Formula:

$$\Delta VT = VTT - VT.$$

After this, at Step 3302, the displacement ΔVT of the camshaft phase is compared with a judgment value A. If the displacement ΔVT is larger than the judgment value A, the movement of the variable valve timing adjustor 18 may be poor, and the routine advances to Step 3303, at which a time counter CT for counting the duration period of ΔVT>A is incremented. If the displacement ΔVT of the camshaft phase is smaller than the judgment value A, it is judged that the movement is normal, and the routine advances to Step 3304, at which the value of the time counter CT is cleared.

At next Step 3305, it is judged whether or not the value of the time counter CT exceeds a predetermined time B. If the time CT is shorter than the predetermined time B, it is judged that the movement is normal, and this program is ended. If the value of the time counter CT exceeds the predetermined time B, however, it is judged that the movement of the variable valve timing adjustor 18 is poor.

In short, if the state where the displacement ΔVT of the camshaft phase is larger than the judgment value A continues for the predetermined time B or longer, it is judged that the movement of the variable valve timing adjustor 18 is poor, but otherwise, it is judged that the movement is normal. Here, the judgment value A may be set to a considerably larger value, and the poor movement of the variable valve timing adjustor 18 may be judged instantly when the displacement ΔVT of the camshaft phase exceeds the judgment value A.

In Eighth Embodiment, too, the lock failure preventing control (at Step 3306) when the poor movement of the variable valve timing adjustor 18 is judged may be identical to that of First or Seventh Embodiment.

In Eighth Embodiment thus far described, the movement of the variable valve timing adjustor 18 can be judged on whether or not it is poor, by monitoring it actually. Even if the movement of the variable valve timing adjustor 18 is deteriorated by a cause (e.g., the bite of a foreign substance) other than the oil temperature (or the oil viscosity), the poor movement can be detected highly accurately.

Here, the invention should not be limited to the foregoing First to Seventh and Eighth Embodiments, but the construction of the variable valve timing adjustor or the construction of the lock mechanism may be suitably modified. Moreover, the invention can also be applied to the variable valve timing adjustor for the exhaust valve. Thus, the invention can be modified in various manners without departing from the gist thereof.

[Ninth Embodiment]

Figure 35:
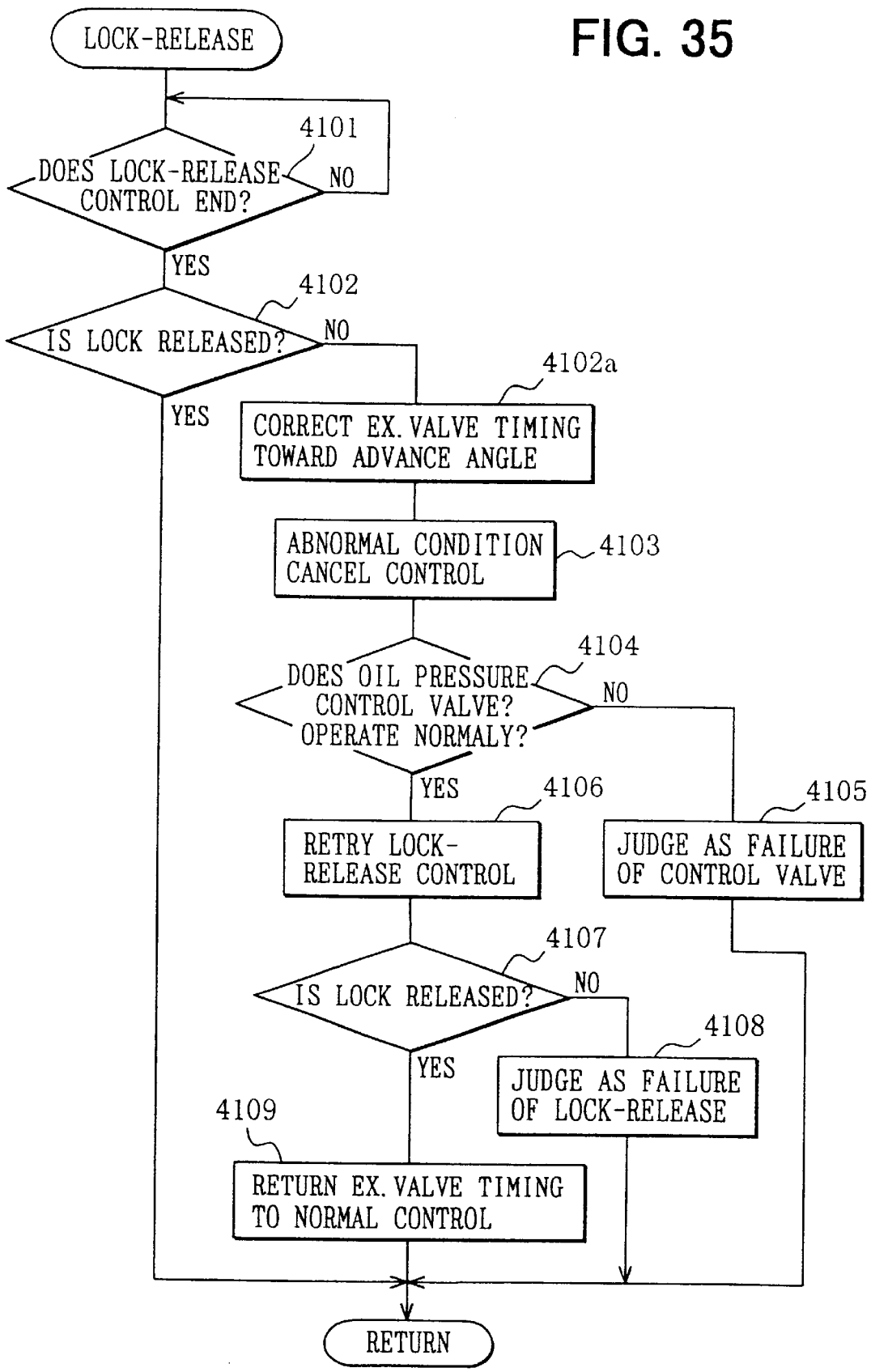
FIG. 35 is a flow chart showing a processing routine of a lock release program of Eighth Embodiment.
Figure 36:
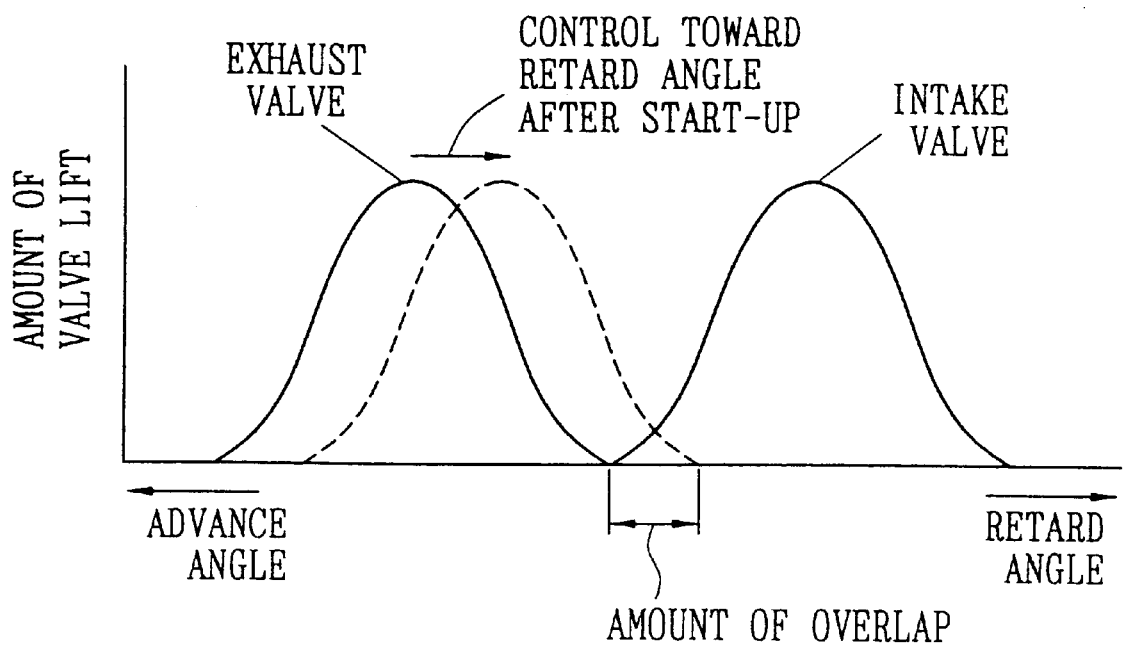
FIG. 36 is a diagram illustrating the opening/closing timing characteristics of an intake valve and an exhaust value.
Figure 37:
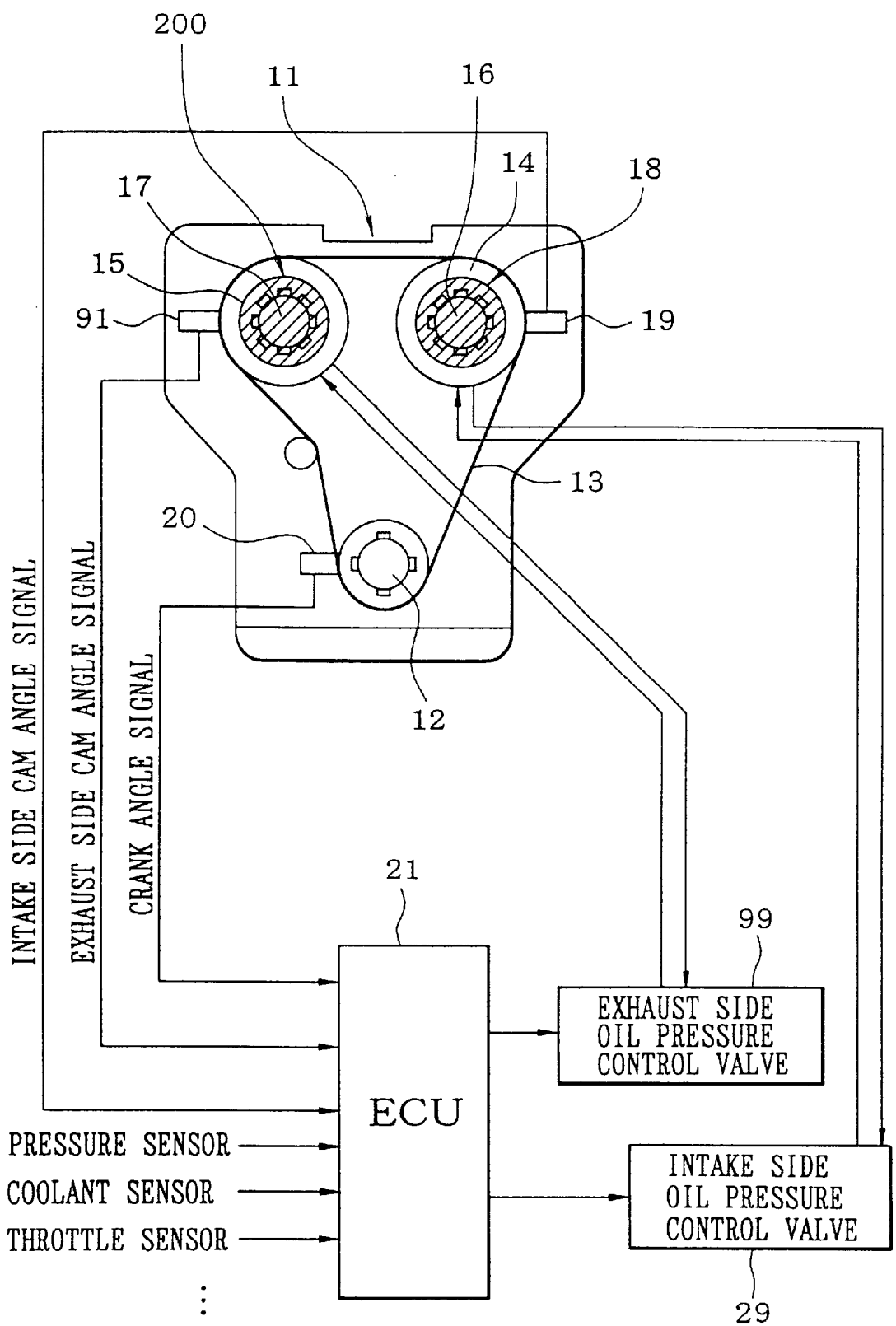
FIG. 37 is a schematic construction diagram showing a whole control system according to Tenth Embodiment of the invention.

The foregoing Eighth Embodiment is provided only at the intake valve with the variable valve timing adjustor 18, but Ninth Embodiment is provided at both the intake valve and the exhaust valve with the variable valve timing adjustor, as shown in FIGS. 35 and 36. In Ninth Embodiment, too, the intake side variable valve timing adjustor has the same construction as that of the variable valve timing adjustor 18 having the intermediate lock mechanism of Eighth Embodiment, and the exhaust side variable valve timing adjustor has the same construction of the variable valve timing adjustor of the related art having no intermediate lock mechanism. The exhaust valve timing at the engine start is the most advance angle phase so that the exhaust valve timing is controlled toward the retard angle (as illustrated in FIG. 36) when the variable valve timing control is started.

With this construction, when the variable valve timing control is made with the intake side variable valve timing adjustor being unlocked, only the exhaust variable valve timing adjustor operates normally. As a result, the valve overlap of the intake and exhaust valves may become abnormal to make the exhaust residual ratio (or the internal EGR amount) excessive in the cylinder. Then, the combustion state in the cylinder may be deteriorated to cause a misfire or to deteriorate the drivability or the exhaust emission and to cause the engine stall in the worst case.

In Ninth Embodiment, therefore, the exhaust valve timing is so controlled by the lock release program of FIG. 35 that the exhaust residual ratio (or the internal EGR amount) in the cylinder may be suppressed till the lock release is detected. In the program of FIG. 35, the operations of Steps 4102a and 4109 are added to the program of FIG. 23 which has been described in connection with Eighth Embodiment.

In this program, if it is judged after the end of the lock release control that the lock is not released, the routine advances to Step 4102a, at which the exhaust valve timing is corrected toward the advance angle so that the valve overlap between the intake and exhaust valves is reduced to reduce the internal EGR amount in the engine under the abnormal condition cancel control thereby to suppress the deterioration in the combustion state. Here, the correction of the exhaust valve timing toward the advance angle may be controlled to the most advance angle phase or to a more advance angle by a predetermined correction a than the normal one. This correction α may be changed by the map or the like according to the engine running condition or may naturally be fixed.

After this, the abnormal condition cancel control and the repeated lock release control are made. If the lock is released, the routine advances to Step 4109, at which the exhaust valve timing control is returned to the normal control. If the lock is not released, the correction of the exhaust valve timing toward the advance angle is then continued, so that the engine is run with the internal EGR being reduced. As a result, the deterioration in the combustion state of the engine at the lock release failure can be reduced to prevent the misfire so that the drivability and the exhaust emission can be improved while preventing the engine stall.

Here in Ninth Embodiment, the advance correction of the exhaust valve timing is made during the abnormal condition cancel control. However, the control of the exhaust valve timing may be interrupted during the abnormal condition cancel control to fix the exhaust valve timing. By this method, too, the internal EGR during the abnormal condition cancel control can be suppressed to reduce the deterioration in the combustion state.

[Other Embodiments]

When the invention is applied to a system in which the exhaust gas recirculation system (or the EGR system) is added to the construction of Ninth Embodiment, the exhaust valve timing is corrected toward the advance angle to reduce the internal EGR or the external EGR by the exhaust recirculation system. Alternatively, only the external EGR may be reduced without correcting the exhaust valve timing toward the advance angle. In short, the internal EGR and the external EGR have the same influence on the combustibility, and their sum is the total EGR. Even if the internal EGR increases during the abnormal condition cancel control, therefore, the increase in the total EGR can be suppressed if the external EGR is reduced, so that the combustion state of the engine can be prevented from being deteriorated.

Here in the invention, the lock mechanism may be attached to the exhaust side variable valve timing adjustor, and the lock mechanism may naturally be added to both the intake side and exhaust side variable valve timing adjusters. In this modification, when it is judged that the lock is not released after the end of the lock release control of the lock mechanism of the exhaust side variable valve timing adjustor, the intake valve timing may be so corrected toward the retard angle as to reduce the internal EGR, or the opening of the EGR valve may be controlled to reduce the external EGR.

On the other hand, the lock mechanism of the variable valve timing adjustor should not be limited to one to be locked at the intermediate lock position, but the invention can be applied to a construction in which the lock mechanism is locked at a position (e.g., at the most retard angle position or at the most advance angle position) other than the intermediate lock position.

In addition, the invention can be modified in various manners without departing from its gist such that it is suitably modified in the construction of the variable valve timing adjust or in the construction of the lock mechanism.

[Tenth Embodiment]

Tenth Embodiment of the invention will be described with reference to FIGS. 37 to 46. First of all, the schematic construction of the entire system will be described with reference to FIG. 37. In the DOHC engine 11 or the internal combustion engine 11, the power from the crankshaft 12 is transmitted by the timing chain 13 through the sprockets 14 and 15, respectively, to the intake side camshaft 16 and the exhaust side camshaft 17. This intake side camshaft 16 is equipped with the intake side variable valve timing adjustor 18 of the hydraulic drive type for adjusting the advance angle of the intake side camshaft 16 with respect to the crankshaft 12, and the intake side camshaft 16 is equipped with the intake side cam angle sensor 19 for outputting the intake side cam angle signal at every predetermined cam angles. On the other hand, the exhaust side camshaft 17 is equipped with an exhaust side variable valve timing adjustor 200 of hydraulic drive type for adjusting the advance angle of the exhaust side camshaft 17 with respect to the crankshaft 12, and further with an exhaust side cam angle sensor 91 for outputting an exhaust cam angle signal at every predetermined can angles. On the other hand, the crankshaft 12 is equipped with the crank angle sensor 20 for outputting the crank angle signal at every predetermined crank angles.

The individual output signals of the crank angle sensor 20 and the intake/exhaust side cam angle sensors 19 and 91 are inputted to the engine control circuit (as will be called the "ECU") 21, by which the real valve timings of the intake valve and the exhaust valve are calculated, and the engine speed is calculated with the frequency of the crank angle signal of the crank angle sensor 20. Although not shown, on the other hand, the outputs of various sensors for detecting the engine running state, such as the intake pressure sensor, the water temperature or the throttle sensor are also inputted to the ECU 21 so that the target valve timings (or the target advance angle of the intake side camshaft 16 and the target retard angle of the exhaust side camshaft 17) of the intake valve and the exhaust valve are calculated on the basis of the outputs of those various sensors.

The ECU 21 controls the intake side hydraulic control valve 29 to feedback-control the intake side variable valve timing adjustor 18 so as to adjust the real valve timing of the intake valve (or the real advance angle of the intake side camshaft 16), and controls an exhaust side hydraulic control valve 99 to feedback-control the exhaust side variable valve timing adjustor 200 so as to adjust the real valve timing of the exhaust valve (or the real retard angle of the exhaust side camshaft 17) to the target retard angle.

With reference to FIGS. 38 to 43, here will be described the construction of the intake side variable valve timing adjustor 18 with the lock mechanism. The housing 31 of the variable valve timing adjustor 18 is fastened and fixed on the sprocket 14 which is rotatably supported on the outer circumference of the intake side camshaft 16, by means of the bolts 32. As a result, the rotation of the crankshaft 12 is transmitted through the timing chain 13 to the sprocket 14 and the housing 31 so that the sprocket 14 and the housing 31 rotate in synchronism with the crankshaft 12.

On the other hand, the intake side camshaft 16 is rotatably supported by the cylinder head 33 and the bearing cap 34, and the rotor 35 is fastened and fixed on one end portion of the intake side camshaft 16 through the stopper 36 by means of the bolts 37. The rotor 35 is accommodated in the housing 31 rotatably relative to the housing 31.

Figure 38:
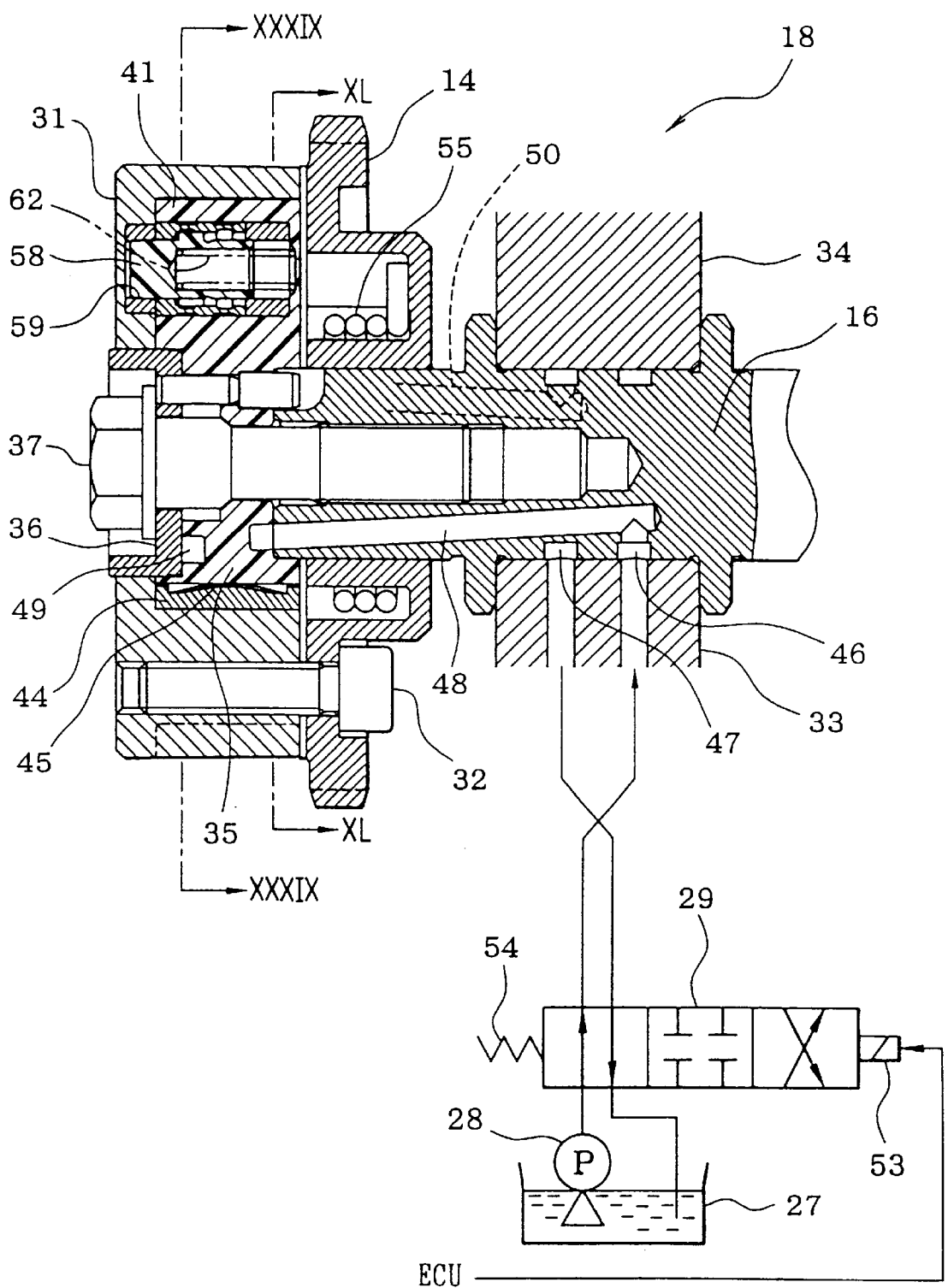
FIG. 38 is a longitudinal section showing a variable valve timing device.
Figure 39:
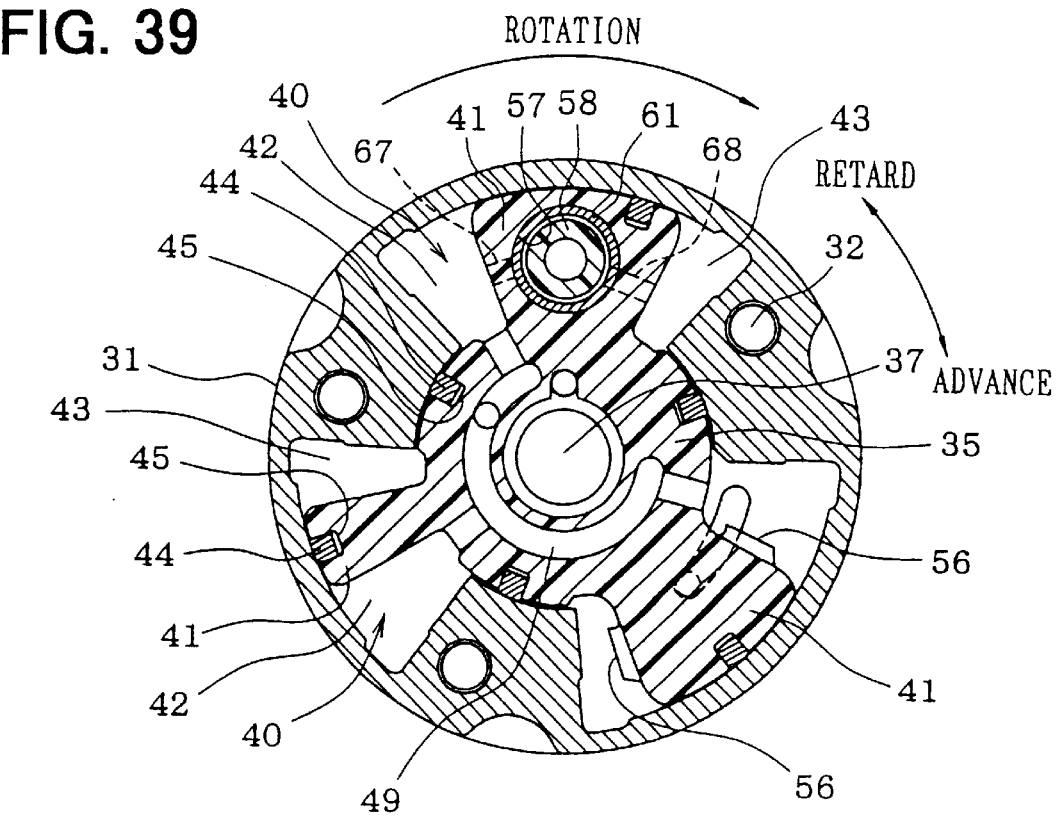
FIG. 39 is a section taken along line XXXIX—XXXIX of FIG. 38.
Figure 40:
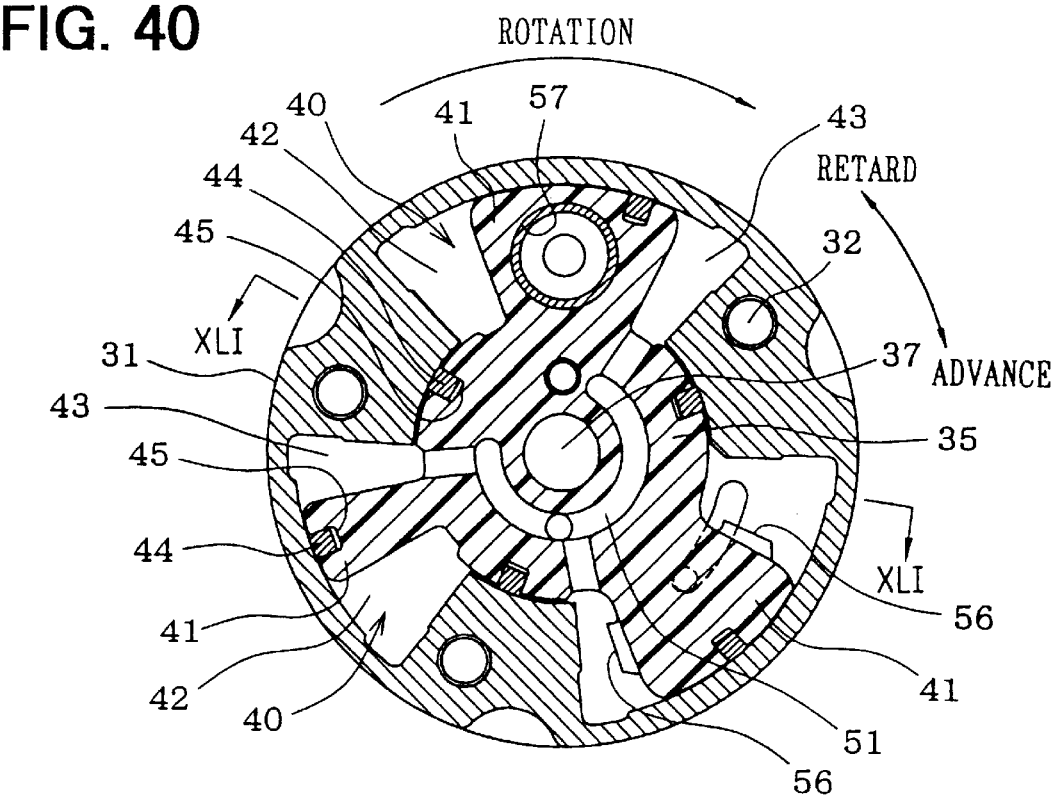
FIG. 40 is a section taken along line XL—XL of FIG. 38.
Figure 41:
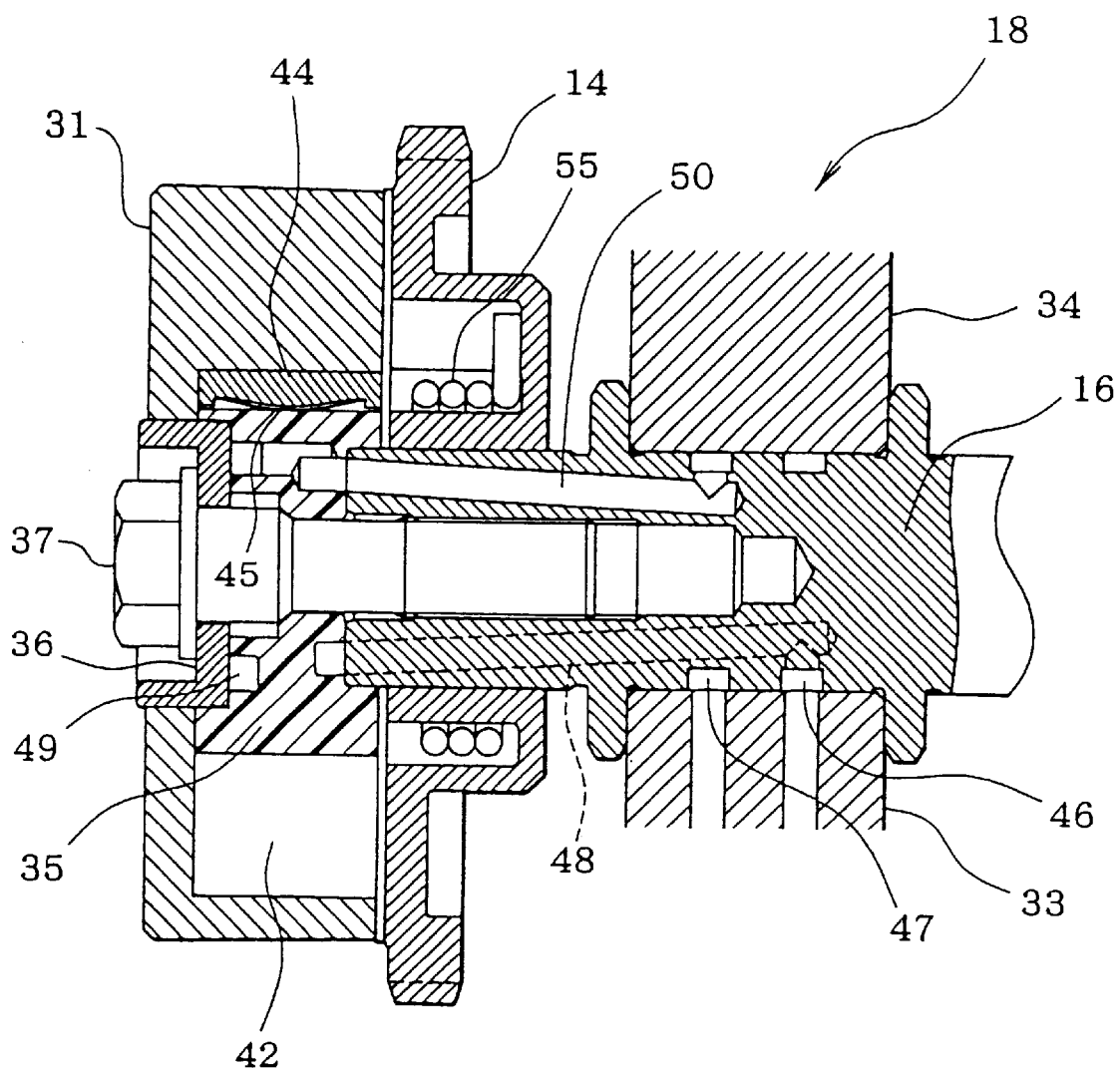
FIG. 41 is a section taken along line XLI—XLI of FIG. 40.
Figure 44:
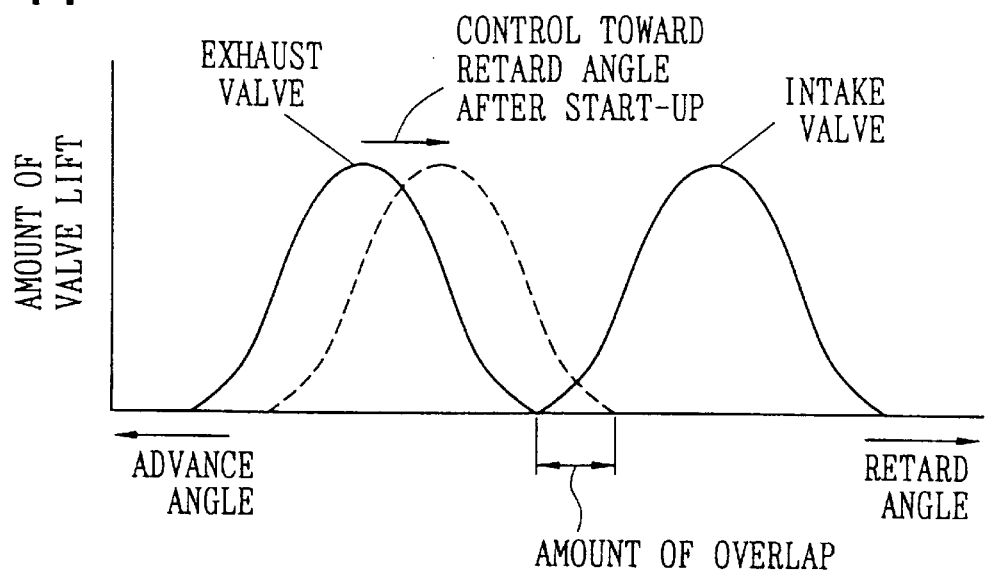
FIG. 44 is a diagram illustrating the opening/closing timing characteristics of an intake valve and an exhaust value.

In the housing 31, as shown in FIGS. 39 and 40, there are formed the plurality of fluid chambers 40, which are individually defined into the advance angle chambers 42 and the retard angle chambers 43 by the vanes 41 formed on the outer circumferential portion of the rotor 35. On the outer circumferential portion of the rotor 35 and the outer circumferential portions of the vanes 41, moreover, there are individually mounted the seal members 44, which are individually urged radially outward by the leaf springs 45 (as referred to FIG. 38). As a result, the clearance between the outer circumference of the rotor 35 and the inner circumference of the housing 31 and the clearance between the outer circumference of the vanes 41 and the inner circumference of the fluid chambers 40 are sealed with the seal members 44.

As shown in FIG. 38, the annular advance angle groove 46 and the annular retard angle groove 47 formed in the outer circumference of the intake camshaft 16 are individually connected with predetermined ports of the hydraulic control valve 29 so that the oil scooped out of the oil pan 27 is fed through the hydraulic control valve 29 to the advance angle groove 46 and the retard angle groove 47 as the oil pump 28 is driven by the power of the engine 11. The advance angle oil passage 48, as connected with the advance angle groove 46, is formed to extend through the inside of the intake camshaft 16 and to communicate with the arcuate advance angle oil passage 49 (as referred to FIG. 39), which is so formed in the lefthand side face of the rotor 35 as to communicate with the individual advance angle chambers 42. On the other hand, the retard angle oil passage 50, as connected with the retard angle groove 47, is formed to extent through the inside of the intake camshaft 16 and to communication with the arcuate retard angle oil passage 51 (as refereed to FIG. 40), which is so formed in the righthand side face of the rotor 35 as to communicate with the individual retard angle chambers 43.

The hydraulic control valve 29 is the 4-port/3-position change-over valve which has the valve member driven by the solenoid 53 and the spring 54. The valve member is switched among a position to feed the oil pressure to the advance angle chambers 42, a position to feed the oil pressure to the retard angle chambers 43, and a position to feed the oil pressure to neither the advance angle chambers 42 nor the retard angle chambers 43. When the solenoid 53 is deenergized, the valve member is automatically switched by the spring 54 to the position to feed the oil pressure to the advance angle chambers 42, so that the oil pressure acts in the direction to advance the crankshaft phase.

With the advance angle chambers 42 and the retard angle chambers 43 being fed with an oil pressure at a predetermined or higher pressure, the vanes 41 are fixed by the oil pressure in the advance angle chambers 42 and the retard angle chambers 43, so that the rotation of the housing 31 by the crankshaft 12 is transmitted by means of the oil to the rotor 35 (or the vanes 41), to drive the intake camshaft 16 rotationally integrally with the rotor 35. During the running of the engine, the oil pressure in the advance angle chambers 42 and the retard angle chambers 43 is controlled by the hydraulic control valve 29 to rotate the housing 31 and the rotor 35 (or the vanes 41) so that the rotational phase (as will be called the "camshaft phase") of the intake camshaft 16 with respect to the crankshaft 12 is controlled to make the valve timing of the intake valve variable. In the sprocket 14, there is accommodated the torsion coil spring 55 (as referred to FIG. 38) for aiding the hydraulic force to rotate the rotor 35 relatively in the angle advancing direction for an angle advancing control, with its spring force.

On the two sides of any one vane 41, as shown in FIGS. 39 and 40, there are formed the stopper portions 56 for regulating the relatively rotational range of the rotor 35 (or the vanes 41) relative to the housing 31 thereby to regulate the most advance angle phase and the most retard angle phase of the crankshaft phase. In the lock pin accommodating hole 57 formed in another vane 41, moreover, there is accommodated the lock pin 58 for locking the relative rotations between the housing 31 and the rotor 35 (or the vanes 41). When the lock pin 58 is fitted in the lock hole 59 (as referred to FIG. 38) formed in the housing 31, the camshaft phase is located at a substantially intermediate position (i.e. an intermediate lock position) of its adjustable range. This intermediate lock position is set in a phase suited for the start.

As shown in FIGS. 42 and 43, the lock pin 58 is slidably inserted in the cylindrical member 61 fitted in the inner circumference of the lock pin accommodating hole 57 and is biased in a locking direction (or in a protruding direction) by the spring 62. By the valve portion 63 formed on the outer circumference of the central portion of the lock pin 58, on the other hand, the clearance between the cylindrical member 61 and the lock pin 58 is defined into the lock hydraulic chamber 64 and the lock release holding hydraulic chamber 65. In order to feed the oil pressure from the advance angle chamber 42 to the lock hydraulic chamber 64 and the lock release holding hydraulic chamber 65, there are formed in the vanes 41 the lock oil passage 66 and the lock release holding oil passage 67 in communication with the advance angle chambers 42. In the housing 31, on the other hand, there is formed the lock release oil passage 68 for providing the communication between the lock hole 59 and the retard angle chambers 43.

At the locking time of the lock pin 58, as shown in FIG. 42, the valve portion 63 of the lock pin 58 closes the lock release holding oil passage 67 to bring the lock oil passage 66 into communication with the lock hydraulic chamber 64. As a result, the oil pressure is fed from the advance angle chambers 42 to the lock hydraulic chamber 64 to hold the lock pin 58 in the lock hole 59 together with the operation of the spring 62 so that the crankshaft phase is locked in the intermediate lock position.

During the engine stop, the oil pressure in the lock hydraulic chamber 64 (or the oil pressure in the advance angle chambers 42) falls, but the lock pin 58 is held in the lock position by the spring 62. Therefore, the engine start is effected with the lock pin 58 being held in the lock position (or in the intermediate lock position). As the oil pressure in the lock hole 59 (or in the oil pressure in the retard angle chambers 43) rises after the engine start, the lock pin 58 is unlocked by the rising oil pressure in the following manners. After the engine start, when the oil pressure (or the force in the lock releasing direction) fed from the retard angle chambers 43 via the lock release oil passage 68 to the lock hole 59 exceeds the resultant force (or the force in the locking direction) of the oil pressure in the lock hydraulic chamber 64 (or the oil pressure in the advance angle chambers 42) and the spring force of the spring 62, the lock pin 58 is pushed out of the lock hole 59 to the lock release position of FIG. 43 by the oil pressure of the lock hole 59 so that it is unlocked.

In this unlocked state, as shown in FIG. 43, the valve portion 63 of the lock pin 58 clogs the lock oil passage 66 to bring the lock release holding oil passage 67 into communication with the lock release holding hydraulic chamber 65. As a result, the oil pressure is fed from the advance angle chambers 42 to the lock release holding hydraulic chamber 65 so that the lock pin 58 is held in the lock release position by the oil pressure in the lock release holding hydraulic chamber 65 (or the oil pressure in the advance angle chambers 42) and the oil pressure in the lock hole 59 (or the oil pressure in the retard angle chambers 43) against the spring 62.

During the running of the engine, either of the oil pressures in the advance angle chambers 42 and the retard angle chambers 43 has risen to hold the lock pin 58 in the lock release position so that the housing 31 and the rotor 35 are held in the relatively rotatable state (or in the state capable of making the valve timing control).

During the running of the engine, the ECU 21 calculates the real valve timing (i.e., the real advance angle position of the intake camshaft 16) of the intake valve on the basis of the output signals of the crank angle sensor 20 and the cam angle sensor 19, and calculates the target valve timing (i.e., the target advance angle position of the intake camshaft 16) of the intake valve on the basis the outputs of the various sensors for detecting the engine running state, such as the intake pressure sensor or the water temperature sensor. Moreover, the hydraulic control valve 29 of the valve timing adjustor 18 is so feedback-controlled as to adjust the real valve timing of the intake valve to the target valve timing. As a result, the oil pressures in the advance angle chambers 42 and the retard angle chambers 43 are controlled to rotate the housing 31 and the rotor 35 relative to each other thereby to change the crankshaft phase so that the real valve timing of the intake valve may coincide with the target valve timing.

After this, if the engine speed goes down when the engine 11 is stopped, the discharge pressure of the oil pump 28 falls so that the oil pressures in the advance angle chambers 42 and the retard angle chambers 43 fall. When the oil pressure in the lock release holding hydraulic chamber 65 (or the oil pressure in the advance angle chambers 42) and the oil pressure in the lock hole 59 (or the oil pressure in the retard angle chambers 43) become so low that they are overcome by the spring force of the spring 62, the lock pin 58 is protruded to go into the lock hole by the spring force of the spring 62. For the lock pin 58 to be fitted in the lock hole 59, however, it is the condition that their positions are aligned, namely, that the crankshaft phase is aligned with the intermediate lock position.

When the engine 11 stops, its speed (or the rotational speed of the oil pump 28) goes down so that the oil pressure falls. As a result, the crankshaft phase is naturally changed toward the retard angle side by the load torque of the crankshaft. In this course, the lock pin 58 is inserted into the lock hole 59, as shown in FIG. 42, to lock the crankshaft phase at the lock position.

Here, the exhaust side variable valve timing adjustor 200 has the same construction, although not shown, as that of the variable valve timing adjustor of the related art having no lock mechanism. The valve timing of the exhaust valve at the engine starting time is at the most advance angle phase so that the valve timing of the exhaust valve is controlled toward the retard angle when the variable valve timing control is started (as referred to FIG. 44).

As described hereinbefore, the engine is started with the lock pin 58 of the intake side variable valve timing adjustor 18 being held in the lock position (or in the intermediate lock phase). When the oil pressure in the lock hole 59 (or the oil pressure in the retard angle chambers 43) rises after the engine start, it unlocks the lock pin 58 so that the feedback control of the valve timing of the intake valve can be made to start the variable valve timing control.

When the variable valve timing control is started after the engine start without the lock being released because of the failure of the lock pin 58, however, only the normally operating exhaust side variable valve timing adjustor 200 operates, as usual, toward the retard angle side. As a result, the valve overlap (as referred to FIG. 44) of the intake and exhaust valves may become excessive to make the exhaust residual ratio (or the internal EGR amount) excessive in the cylinder of the engine 11. Then, the combustion state in the engine 11 may be deteriorated to cause a misfire or to deteriorate the drivability or the exhaust emission.

Figure 45:
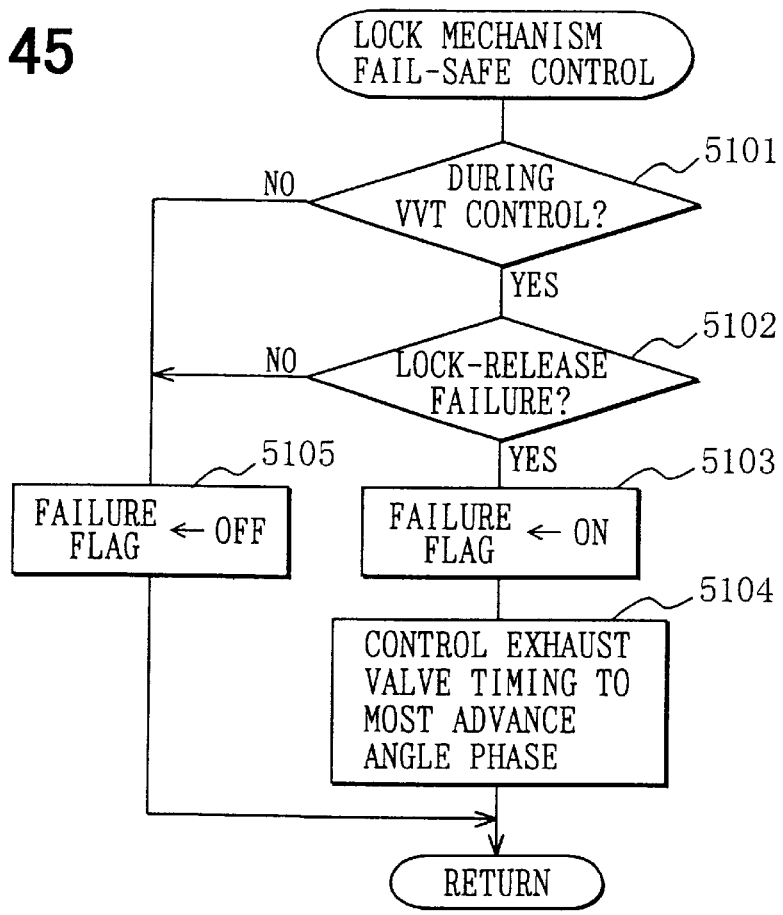
FIG. 45 is a flow chart showing a processing routine of a lock mechanism fail-safe control program of Tenth Embodiment.

In Tenth Embodiment, therefore, the ECU repeats the lock mechanism fail-safe control program of FIG. 45, as stored in the packaged ROM (or the storage media), for every predetermined time periods, to prevent the deterioration in the combustion state of the engine 11 due to the failure of the lock pin 58 being controlled in the variable valve timing, in the following manners. When this program is started, at first Step 5101, it is judged whether or not the variable valve timing control is being executed (or whether or not the lock release control of the lock pin 58 is ended). If the variable valve timing control is not made, the lock release failure flag is kept OFF (at Step 5105), and this program is ended.

If the variable valve timing control is being executed, on the other hand, the routine advances to Step 5102, at which it is judged whether or not the lock release failure of the lock pin 58 occurs. Here, the lock release failure means that the lock pin 58 is not in the lock release state while the variable valve timing control is being executed. The judgment on whether or not the lock release fails may be executed by judging whether or not the detected value of the valve timing of the intake valve is fixed at the intermediate lock phase and does not move in the least, considering the detection error or the manufacture dispersion. The operation of this Step 5102 plays the role of lock release failure judging means, as defined in claims. If no lock release failure is judged at Step 5102, the lock release failure flag is turned OFF (at Step 5105), and this program is ended.

If it is judged at Step 5102 that the lock release failure occurs, the routine advances to Step 5103, at which the lock release failure flag is set ON. At next Step 5104, the exhaust side variable valve timing adjustor 200 is so controlled that the valve timing of the exhaust valve may take the most advance angle phase, to reduce the valve overlap of the intake and exhaust valves thereby to reduce the internal EGR of the engine 11 and accordingly the deterioration in the combustion state. This operation of Step 5104 plays the role of abnormal condition control means.

Figure 46:
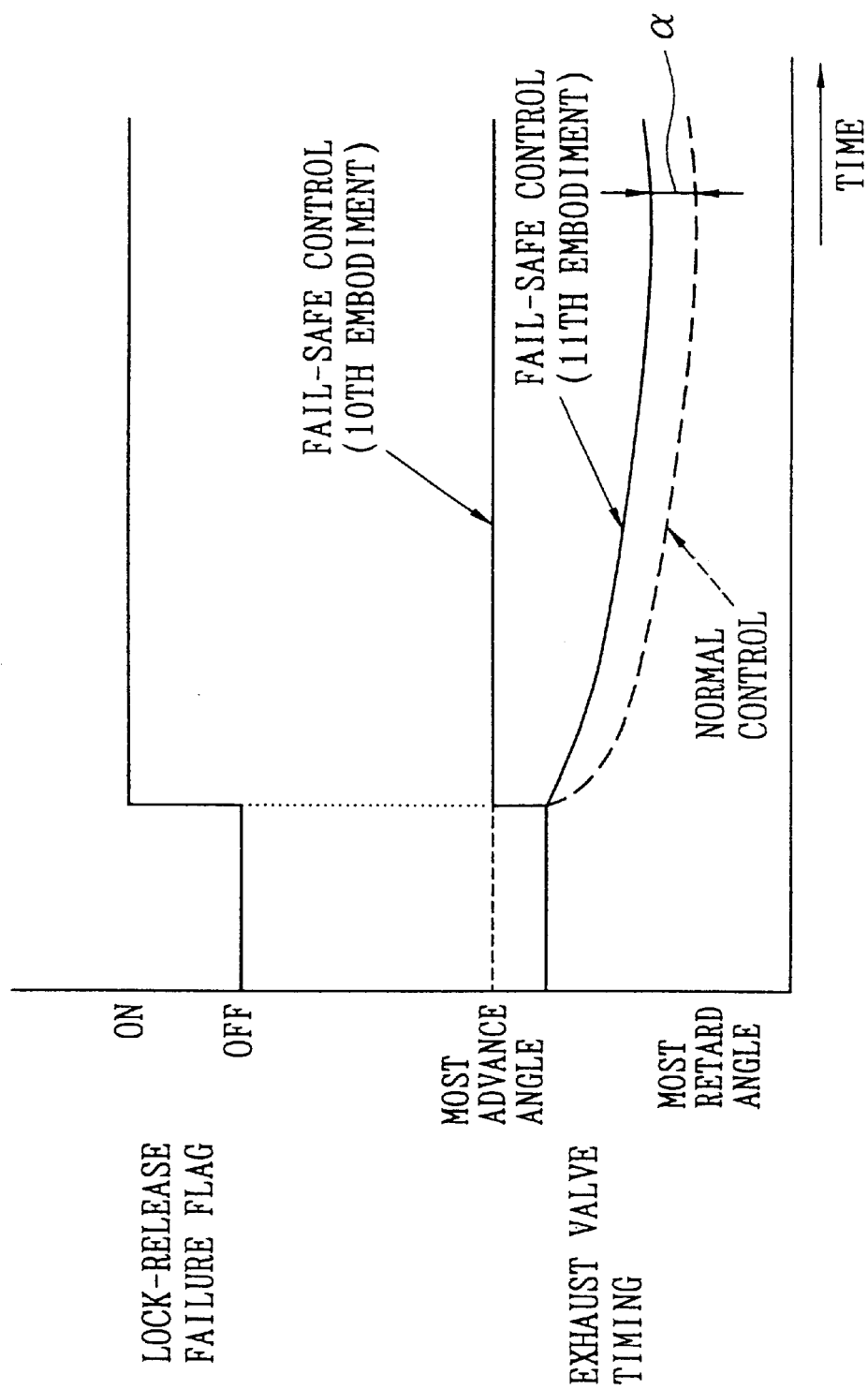
FIG. 46 is a time chart illustrating one example of the lock release failure fail-safe control of Tenth and Eleventh Embodiments.

With reference to FIG. 46, here will be described one example of the fail-safe control by the lock mechanism fail-safe control program of FIG. 45 thus far described with reference to FIG. 45. FIG. 46 illustrates one example of the fail-safe control of the case where the lock pin 58 is inserted into the lock hole 59 to cause the lock release failure during the variable valve timing control.

When the lock release failure occurs during the variable valve timing control, the lock release failure flag is set ON, and the valve timing of the exhaust valve is controlled to the most advance angle phase to reduce the valve overlap of the intake and exhaust valves thereby to reduce the internal EGR of the engine 11. As a result, the deterioration in the combustion state of the engine at the lock release failure can be reduced to prevent the misfire so that the drivability and the exhaust emission can be improved while preventing the engine stall.

Here, the failure of the lock pin 58 includes not only the lock release failure but also the lock failure. In this lock failure, the lock pin 58 is not locked although it should be so (e.g., at the engine starting time). When the lock pin 58 has to be in the lock state, the variable valve timing control is normally made. Even the lock failure occurs, therefore, the fail-safe control need not always be made. In the lock failure, too, the overlap of the in take and exhaust valves may increase by itself. Therefore, the fail-safe control may be made as at the time of a lock release failure.

[Eleventh Embodiment]

In Tenth Embodiment, at the lock release failure, the valve timing of the exhaust valve is controlled to the most advance angle phase. In the lock mechanism fail-safe control program of Eleventh Embodiment shown in FIG. 47, however, at the lock release failure, the target value of the valve timing of the exhaust valve is corrected by the predetermined correction a toward the advance angle side from the normal target value (at Step 5104a). As a result, as illustrated in FIG. 46, the valve timing of the exhaust valve at the lock release failure is advanced by the correction a more than the normal one to reduce the valve overlap of the intake and exhaust valves so that the internal EGR of the engine 11 is reduced to prevent the deterioration in the combustion state. At this time, the correction a of the valve timing may be changed by the map or the like in accordance with the engine running state or may naturally be fixed. Here, the operations of the individual Steps of FIG. 47 other than Step 5104a are identical to those of the individual Steps of FIG. 45.

[Twelfth Embodiment]

Figure 48:
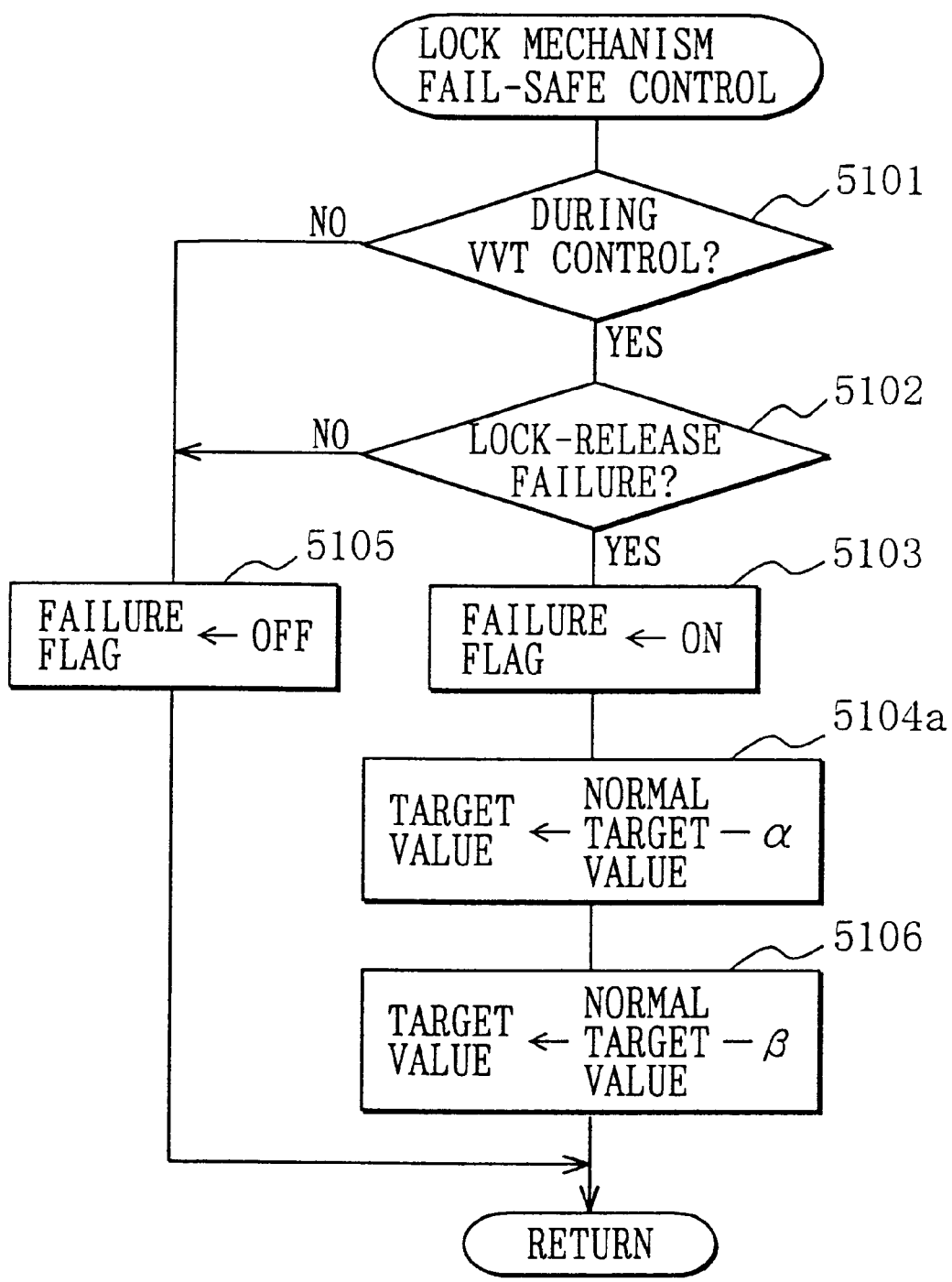
FIG. 48 is a flow chart showing a processing routine of a valve timing control program of Twelfth Embodiment.

With reference to FIG. 48, here will be described Twelfth Embodiment in which the invention is applied to an engine provided with an exhaust gas recirculation system. This exhaust gas recirculation system is constructed, although not shown, by connecting the EGR pipe for recirculating a portion of the exhaust gas to the intake pipe between the exhaust pipe and the intake pipe of the engine, by disposing the EGR valve midway of the EGR pipe, and by controlling the openign of the EGR valve by the ECU to control the external EGR.

Figure 47:
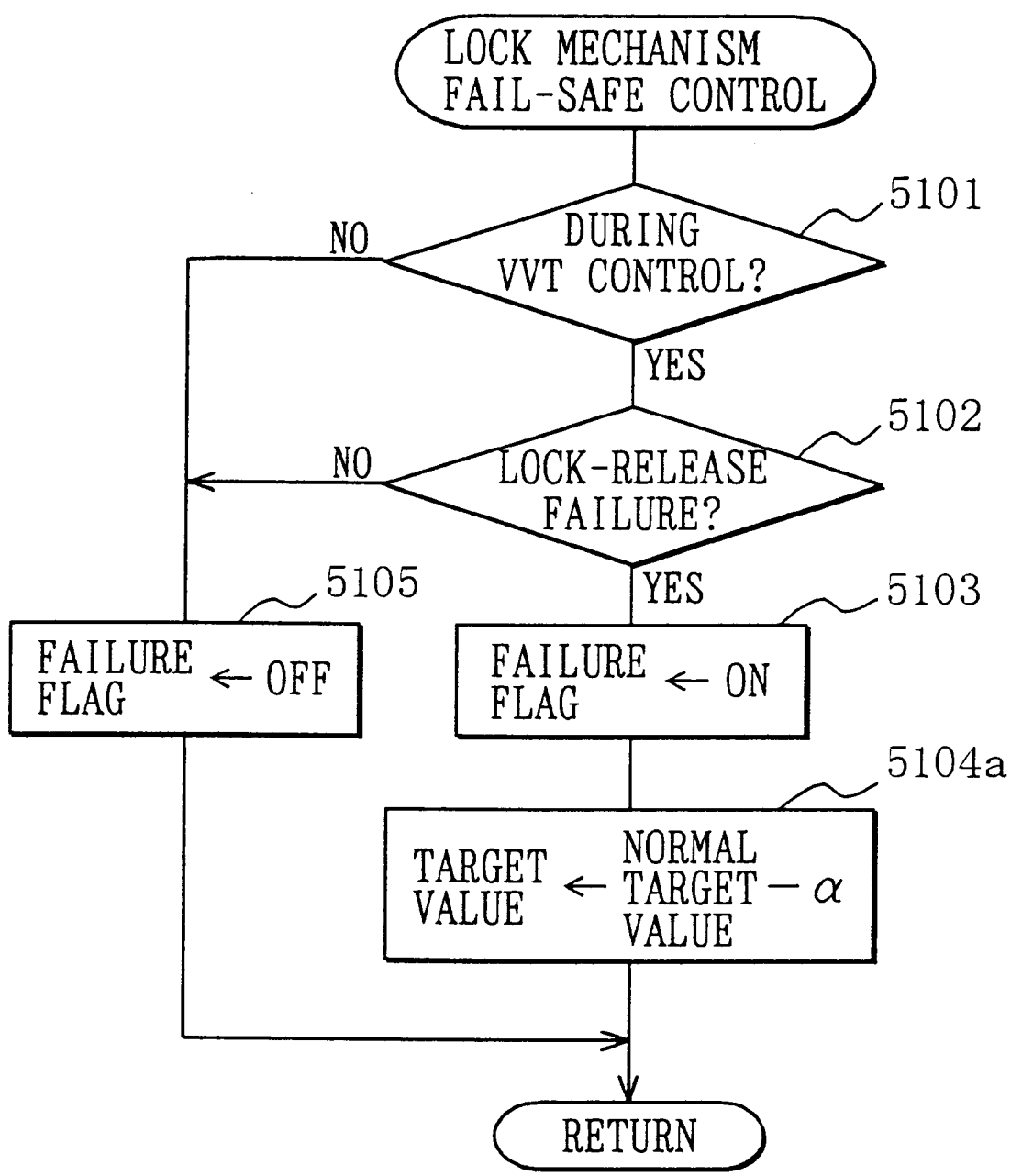
FIG. 47 is a flow chart showing a processing routine of a valve timing control program of Eleventh Embodiment.

The lock mechanism fail-safe control program of FIG. 48 is prepared by adding the operation of Step 5106 to the program of FIG. 47, as has been described in connection with Eleventh Embodiment. In this program, at the lock release failure, the target value of the valve timing of the exhaust valve is corrected (at Step 5104a) by the correction α toward the advance angle side than the normal target value, and the target value of the outside EGR is reduced (at Step 5106) by a predetermined correction β more than the normal target value. As a result, the valve timing of the exhaust valve at the lock release failure is advanced more by the correction value α than normal to reduced the valve overlap of the intake and exhaust valves so that the internal EGR of the engine 11 is reduced to reduce the target value of the external EGR more by the correction β than normal. At this time, the correction β of the external EGR may be changed by the map or the like in accordance with the engine running state or may naturally be fixed.

In Twelfth Embodiment thus far described, at the lock release failure, the valve timing of the exhaust valve is corrected toward the advance angle side to reduce the internal EGR and the external EGR so that the total EGR can be reliably reduced at the lock release failure to prevent the deterioration in the combustion state of the engine 11.

Here in Twelfth Embodiment, at the lock release failure, the valve timing of the exhaust valve may be controlled to the most advance angle phase, as in Tenth Embodiment. At the lock release failure, on the other hand, it is arbitrary to make not the advance angle correction of the valve timing of the exhaust valve but only the reducing correction of the external EGR.

Here, in any of the individual Tenth to Twelfth Embodiments, the intake side variable valve timing adjustor 18 is equipped with the lock mechanism, but the exhaust variable valve timing adjustor 20 may be equipped with the lock mechanism. Of course, both the intake side and the exhaust side variable valve timing adjusters 18 and 20 are individually equipped with the lock mechanism. In this case, when the lock mechanism of the exhaust side variable valve timing adjustor 20 fails (or makes the lock release failure), the intake side variable valve timing adjustor 18 may be controlled toward the retard angle side to reduce the internal EGR, or the opening of the EGR valve may be controlled to reduce the external EGR.

In addition, the invention can be modified in various manners without departing from its gist such that it is suitably modified in the construction of the variable valve timing adjust or in the construction of the lock mechanism.

What is claimed is:

1. A variable valve timing control system for an internal combustion engine, comprising: a variable valve timing adjuster for making the valve timing variable by changing the rotational phase (as will be called the "camshaft phase") of a camshaft with respect to the crankshaft of the internal combustion engine, said variable valve timing adjuster including a lock mechanism for locking said camshaft phase at a substantially intermediate lock position of its adjustable range when the variable valve timing control is not made, wherein the oil pressure for driving said lock mechanism and said variable valve timing adjuster is controlled by a hydraulic control valve, wherein the improvement comprises:
lock position learning means for learning said lock position on the basis of said camshaft phase which is detected during a lock control for locking said camshaft phase at said lock position.

2. A variable valve timing control system for an internal combustion engine according to claim 1, wherein said lock position learning means repeats the learning of said lock position during the lock control to update the learned values sequentially and ends the learning when it judges that said learned values have converged.

3. A variable valve timing control system for an internal combustion engine according to claim 2, wherein said lock position learning means judges an insufficient lock state, when the learned values of said lock position do not converge even if the learning number or the learning time of said lock position exceeds a predetermined value during the lock control, and sets the learned value of said lock position to an initial value or the learned value at the previous lock control time.

4. A variable valve timing control system for an internal combustion engine according to claim 3, wherein said lock position learning means makes a lock release control for controlling said hydraulic control valve, when it judges said insufficient lock state, so that said lock mechanism may release the lock.

5. A variable valve timing control system for an internal combustion engine according to claim 1, wherein said lock position learning means judges that said camshaft phase is fixed at a position other than said lock position, when the learned values of said lock position are not confined within an allowable range of dispersion, and sets the learned value of said lock position to the initial value or the learned value at the previous lock control time.

6. A variable valve timing control system for an internal combustion engine, comprising: a variable valve timing adjuster for making the valve timing variable by changing the rotational phase (as will be called the "camshaft phase") of a camshaft with respect to the crankshaft of the internal combustion engine, said variable valve timing adjuster including a lock mechanism for locking said camshaft phase at a substantially intermediate lock position of its adjustable range when the variable valve timing control is not made, wherein the oil pressure for driving said lock mechanism and said variable valve timing adjuster is controlled by a hydraulic control valve, wherein the improvement comprises:
lock release learning means for learning the control (as will be called the "lock release control") of said hydraulic control valve during a lock release control in which said hydraulic control valve is controlled to unlock said lock mechanism.

7. A variable valve timing control system for an internal combustion engine according to claim 6, wherein said lock release learning means corrects the lock release control of said hydraulic control valve, when the lock cannot be released during the lock release control, in a direction to facilitate the lock release.

8. A variable valve timing control system for an internal combustion engine according to claim 7, wherein said lock release learning means judges a lock release failure when the lock cannot be released even if the lock release control of said hydraulic control valve is corrected during the lock release control.

9. A variable valve timing control system for an internal combustion engine according to claim 8, wherein said lock release learning means controls to hold the lock state when it judges the lock release failure.

10. A variable valve timing control system for an internal combustion engine according to claim 8, wherein said lock release learning means judges the lock release failure either when the correction of the lock release control of said hydraulic control valve is repeated a predetermined or larger number of times during the lock release control or when said lock release control goes outside a predetermined range.

11. A variable valve timing control system for an internal combustion engine according to claim 6, wherein said lock release learning means sets the learned value of said lock release control to an initial value or the learned value at the previous lock control time, when it judges the lock release failure.

12. A variable valve timing control system for an internal combustion engine according to claim 6, wherein said lock release learning means repeats the lock release control in a running range where the oil pressure to be fed to said hydraulic control valve is high, when the lock cannot be released during the lock release control.

13. A variable valve timing control system for an internal combustion engine according to claim 6, wherein said lock release learning means learns a plurality of lock release controls according to a deviation between the real camshaft phase and the target camshaft phase during the lock release control.

14. A variable valve timing control system for an internal combustion engine, comprising:
   valve timing control means for controlling a valve timing variably by changing the rotational phase (as will be called the "camshaft phase") of a camshaft with respect to the crankshaft of the internal combustion engine with an oil pressure; and
   lock means biased for locking said camshaft phase at an intermediate lock means, which is located at a substantially center of the adjustable range thereof, during the stop or at the start of the internal combustion engine,
   wherein the improvement comprises: lock release detection means for detecting the lock release of said lock means,
   wherein said valve timing control means starts a feedback control of the valve timing after said lock release detection means detects the lock release of said lock means.

15. A variable valve timing control system for an internal combustion engine according to claim 14, further comprising:
   crank angle detection means for outputting crank angle signals at predetermined crank angles; and
   cam angle detection means for outputting cam angle signals at a plurality of cam angles for cylinder discriminations,
   wherein said lock release detection means judges whether or not the lock of said lock means is released, depending on the magnitude of the dispersion of the advance angles of said plurality of cam angle signals with respect to said crank angle signals.

16. A variable valve timing control system for an internal combustion engine according to claim 15,
   wherein said cam angle detection means outputs a lock release detection cam angle signal at an angle different from those of the cylinder discrimination cam angle signals, and
   wherein said lock release detection means judges whether or not the lock of said lock means is released, depending on the magnitude of the dispersion of the advance angles of said plurality of cam angle signals including said lock release detection cam angle signal.

17. A variable valve timing control system for an internal combustion engine according to claim 14, wherein said lock release detection means judges that the lock of said lock means is released, when the real advance angle position of said camshaft phase is apart a predetermined or more value from said intermediate lock position.

18. A variable valve timing control system for an internal combustion engine according to claim 17, wherein said intermediate lock position is set at the center value of a manufacture dispersion.

19. A variable valve timing control system for an internal combustion engine according to claim 17, further comprising learning means for learning said intermediate lock position during the lock of said lock means.

20. A variable valve timing control system for an internal combustion engine, comprising:
   valve timing control means for controlling a valve timing variably by changing the rotational phase (as will be called the "camshaft phase") of a camshaft with respect to the crankshaft of the internal combustion engine with an oil pressure;
   lock means biased for locking said camshaft phase at an intermediate lock means, which is located at a substantially center of the adjustable range thereof, during the stop or at the start of the internal combustion engine,
   crank angle detection means for outputting crank angle signals at predetermined crank angles;
   cam angle detection means for outputting cam angle signals at a plurality of cam angles for cylinder discriminations; and
   real advance angle position calculation means for calculating the real advance angle position of said camshaft phase on the basis of said crank angle signals and said cam angle signals,
   wherein the improvement comprises:
   failure detection means for detecting at least one of lock failure and the lock release failure of said lock means on the basis of at least one of the magnitude of the dispersion of the advance angles of said cam angle signals with respect to said crank angle signals and the real advance angle position of said camshaft phase.

21. A variable valve timing control system for an internal combustion engine according to claim 20,
   wherein said cam angle detection means outputs a lock release detection cam angle signal at an angle different from those of the cylinder discrimination cam angle signals, and
   wherein said failure detection means judges at least one of the lock failure and the lock release failure, depending on the magnitude of the dispersion of the advance angles of said plurality of cam angle signals including said failure detection cam angle signal.

22. A variable valve timing control system for an internal combustion engine according to claim 20, wherein said failure detection means judges the lock release failure when the dispersion of the advance angles of said plurality of cam angle signals is within a predetermined value at a region where said lock means has to be in the lock release state.

23. A variable valve timing control system for an internal combustion engine according to claim 20, wherein said failure detection means judges the lock failure when the dispersion of the advance angles of said plurality of cam angle signals is within a predetermined value at a region where said lock means has to be in the lock state.

24. A variable valve timing control system for an internal combustion engine according to claim 20, wherein said failure detection means judges the lock release failure when the time period, for which the real advance angle position is within a predetermined value from the intermediate lock position although the target advance angle position is apart more than a predetermined distance from the intermediate lock position, continues for a predetermined or more time.

25. A variable valve timing control system for an internal combustion engine according to claim 20, further comprising lock release failure restore control means for applying the oil pressure to said lock means in a lock releasing direction when the lock release failure is detected by said failure detection means.

26. A variable valve timing control system for an internal combustion engine, comprising:
- valve timing control means for controlling a valve timing variably by changing the rotational phase (as will be called the "camshaft phase") of a camshaft with respect to the crankshaft of the internal combustion engine with an oil pressure; and
- lock means biased for locking said camshaft phase at an intermediate lock means, which is located at a substantially center of the adjustable range thereof, during the stop or at the start of the internal combustion engine,
- wherein the improvement comprises:
- crank angle detection means for outputting crank angle signals at predetermined crank angles; and
- cam angle detection means for outputting cam angle signals at a plurality of cam angles; and
- lock release detection means for detecting whether or not the lock of said lock means is released, depending on the magnitude of the dispersion of the advance angles of said plurality of cam angle signals with respect to said crank angle signals.

27. A variable valve timing control system for an internal combustion engine according to claim 26,
- wherein said cam angle detection means outputs a lock release detection cam angle signal at an angle different from those of the cylinder discrimination cam angle signals, and
- wherein said lock release detection means judges whether or not the lock of said lock means is released, depending on the magnitude of the dispersion of the advance angles of said plurality of cam angle signals including said lock release detection cam angle signal.

28. A variable valve timing control system for an internal combustion engine according to claim 26, wherein said lock release detection means judges that the lock of said lock means is released, when the real advance angle position of said camshaft phase is apart a predetermined or more value from said intermediate lock position.

29. A variable valve timing control system for an internal combustion engine, comprising: a variable valve timing adjuster for making the valve timing variable by changing the rotational phase (as will be called the "camshaft phase") of a camshaft with respect to the crankshaft of the internal combustion engine, said variable valve timing adjuster including a lock mechanism for locking said camshaft phase at a substantially intermediate lock position of its adjustable range when the variable valve timing control is not made, wherein the oil pressure for driving said lock mechanism and said variable valve timing adjuster is controlled by a hydraulic control valve,
- wherein the improvement comprises:
- lock failure prevention control means for controlling said hydraulic control valve, when the movement of said variable valve timing adjuster is poor, so that said camshaft phase may be positioned at or in the vicinity of said lock position.

30. A variable valve timing control system for an internal combustion engine, comprising: a variable valve timing adjuster for making the valve timing variable by changing the rotational phase (as will be called the "camshaft phase") of a camshaft with respect to the crankshaft of the internal combustion engine, said variable valve timing adjuster including a lock mechanism for locking said camshaft phase at a substantially intermediate lock position of its adjustable range when the variable valve timing control is not made, wherein the oil pressure for driving said lock mechanism and said variable valve timing adjuster is controlled by a hydraulic control valve,
- wherein the improvement comprises:
- lock failure prevention control means for controlling said hydraulic control valve, when the movement of said variable valve timing adjuster is poor, so that said camshaft phase may be positioned at said lock position.

31. A variable valve timing control system for an internal combustion engine according to claim 29, wherein said lock failure prevention control means judges whether or not the movement of said variable valve timing adjuster is poor, depending on an oil temperature.

32. A variable valve timing control system for an internal combustion engine according to claim 29, wherein said lock failure prevention control means judges whether or not the movement of said variable valve timing adjuster is poor, depending on temperature information correlating to an oil temperature, such as a coolant temperature or an engine temperature.

33. A variable valve timing control system for an internal combustion engine according to claim 29, wherein said lock failure prevention control means judges whether or not the movement of said variable valve timing adjuster is poor, depending on a deviation between a real camshaft phase and a target camshaft phase.

34. A variable valve timing control system for an internal combustion engine, comprising: a variable valve timing adjuster mounted on at least one of the intake valve and the exhaust valve of the internal combustion engine, for making the valve timing variable, said variable valve timing adjuster including a lock mechanism for locking the valve timing at a predetermined phase when the variable valve timing control is not made, wherein said lock mechanism and said variable valve timing adjuster are driven by a hydraulic control valve,
- wherein the improvement comprises:
- lock release control means for controlling a hydraulic control valve of said hydraulic control circuit, during the lock release control of said lock mechanism, so that an oil pressure may be applied to said lock mechanism in a lock release direction; and
- lock release judgment means for judging whether or not the lock of said lock mechanism is released,
- wherein said lock release control means drives said hydraulic control valve in a drive pattern for an abnormal condition cancel control and then makes again the lock release control, when it is judged that the lock is not released after the end of the lock release control.

35. A variable valve timing control system for an internal combustion engine according to claim 34, wherein said abnormal condition cancel control repeats the operation to reciprocate the valve member of said hydraulic control valve at a predetermined stroke.

36. A variable valve timing control system for an internal combustion engine according to claim 34, wherein said lock release control means judges the lock release failure due to the failure of said lock mechanism, if the valve member of said hydraulic control valve operates normally when said hydraulic control valve is driven in a drive pattern for said abnormal condition cancel control.

37. A variable valve timing control system for an internal combustion engine according to claim 34,
- wherein said variable valve timing adjuster is mounted on each of the intake valve and the exhaust valve of the internal combustion engine, wherein said lock mechanism is mounted on at least one of said variable valve timing adjusters, and wherein said lock release control means makes a control, when it is judged that the lock is not released after the end of the lock release control, either to stop the variable valve timing control of the variable valve timing adjuster operating normally or to reduce the exhaust residual ratio in the cylinders of the internal combustion engine, till the lock release of said lock mechanism is detected by the repeated lock release control.

38. A variable valve timing control system for an internal combustion engine according to claim 34, further comprising:

an exhaust recirculation system for recirculating a portion of the exhaust gas of the internal combustion engine to the intake line, wherein said lock release control means makes a control, when it is judged that the lock is not released after the end of the lock release control, to reduce the exhaust recirculation by said exhaust recirculation system, till the lock release of said lock mechanism is detected by the repeated lock release control.

39. A control system for an internal combustion engine, comprising: variable valve timing adjusters mounted individually on the intake valve and the exhaust valve of the internal combustion engine, for making the valve timings variable, at least one of said variable valve timing adjusters including a lock mechanism for locking the valve timing at a substantially intermediate position of its adjustable range when the variable valve timing control is not made, wherein the improvement comprises:

lock failure judgment means for judging whether or not said lock mechanism fails; and abnormal condition control means for controlling, when the failure of said lock mechanism is judged by said lock failure judgment means, the normal variable valve timing adjuster so that the exhaust residual ratio in the cylinder of the internal combustion engine may become the lower.

40. A control system for an internal combustion engine according to claim 39, further comprising:

an exhaust recirculation system for recirculating a portion of the exhaust gas of the internal combustion engine to the intake line, wherein said abnormal condition control means controls, when the failure of said lock mechanism is judged by said lock failure judgment means, the variable valve timing adjuster operating normally, so that the exhaust residual ratio in the cylinder of the internal combustion engine may become the lower, and so that the exhaust recirculation by said exhaust recirculation system may be reduced.

41. A control system for an internal combustion engine, comprising:

variable valve timing adjusters mounted individually on the intake valve and the exhaust valve of the internal combustion engine, for making the valve timings variable, at least one of said variable valve timing adjusters including a lock mechanism for locking the valve timing at a substantially intermediate position of its adjustable range when the variable valve timing control is not made; and an exhaust recirculation system for recirculating a portion of the exhaust gas of the internal combustion engine to an intake line, wherein the improvement comprises:

lock failure judgment means for judging whether or not said lock mechanism fails; and abnormal condition control means for making a control, when the failure of said lock mechanism is judged by said lock failure judgment means, to reduce the exhaust recirculation by said exhaust recirculation system.

* * * * *